US012663347B2

(12) United States Patent
DeWald et al.

(10) Patent No.: US 12,663,347 B2
(45) Date of Patent: Jun. 23, 2026

(54) SYSTEMS AND METHODS FOR ANALYSIS OF MATERIAL PROPERTIES OF COMPONENTS AND STRUCTURES USING MACHINING PROCESSES TO ENABLE STRESS RELIEF IN THE MATERIAL UNDER TEST

(71) Applicant: Hill Engineering, LLC, Rancho Cordova, CA (US)

(72) Inventors: Adrian T. DeWald, Sacramento, CA (US); Michael R. Hill, Davis, CA (US); Eric Summer, Sacramento, CA (US); Brett Watanabe, Sacramento, CA (US); Teresa Wong, Sacramento, CA (US)

( * ) Notice: Subject to any disclaimer, the term of this patent is extended or adjusted under 35 U.S.C. 154(b) by 339 days.

(21) Appl. No.: 18/440,970

(22) Filed: Feb. 14, 2024

(65) Prior Publication Data

US 2024/0264060 A1     Aug. 8, 2024

Related U.S. Application Data

(63) Continuation-in-part of application No. 17/841,652, filed on Jun. 15, 2022, now Pat. No. 11,906,488, (Continued)

(51) Int. Cl.
*G01N 3/58* (2006.01)
*G01B 7/16* (2006.01)
(Continued)

(52) U.S. Cl.
CPC ................. *G01N 3/58* (2013.01); *G01B 7/18* (2013.01); *G01B 11/161* (2013.01); (Continued)

(58) Field of Classification Search
None
See application file for complete search history.

(56) References Cited

U.S. PATENT DOCUMENTS

| | | | |
|---|---|---|---|
| 3,943,758 A | 3/1976 | Wolf et al. | |
| 4,750,850 A | 6/1988 | Husted | |

(Continued)

FOREIGN PATENT DOCUMENTS

| | | | | |
|---|---|---|---|---|
| CN | 106033040 A | * 10/2016 | ............... | G01N 1/28 |
| WO | WO2016/140091 | 9/2016 | | |

OTHER PUBLICATIONS

Vishay RS-200, Tech Note TN-501-2, TN-503-6, Vishay Precision Group, Strain Gauges and Instruments, Document No. 11053, Revision: 01, pp. 19-33, Nov. 1, 2010.

(Continued)

*Primary Examiner* — Peter J Macchiarolo
*Assistant Examiner* — Jermaine L Jenkins
(74) *Attorney, Agent, or Firm* — Leopold Lueddemann; Kang Lim

(57) ABSTRACT

Analysis of residual stress in materials is often done in static conditions in a laboratory. Accurate systems and methods for performing these analyses in a dynamic, non-laboratory environment are notoriously difficult and can be very inaccurate. A method using a portable, field deployable apparatus having greater accuracy than currently available is disclosed whereby accurate and repeatable residual stress analysis may be implemented in non-laboratory environments leading to greatly improved diagnostics, maintenance and life limit prediction. A laser cutting system is provided to cut through hardened surface layers to minimize machining stresses from mechanically cutting through a hardened layer.

18 Claims, 31 Drawing Sheets

Related U.S. Application Data which is a continuation of application No. 17/124,248, filed on Dec. 16, 2020, now Pat. No. 11,609,169, which is a continuation-in-part of application No. 16/201,994, filed on Nov. 27, 2018, now Pat. No. 10,900,768.

(60) Provisional application No. 62/592,240, filed on Nov. 29, 2017.

(51) Int. Cl.
  *G01B 11/16*     (2006.01)
  *G01L 5/00*     (2006.01)
  *G01N 3/06*     (2006.01)

(52) U.S. Cl.
  CPC ............ *G01L 5/0047* (2013.01); *G01N 3/066* (2013.01); *G01N 3/068* (2013.01); *G01N 2203/0053* (2013.01); *G01N 2203/0647* (2013.01); *G01N 2203/0676* (2013.01)

(56)            References Cited

U.S. PATENT DOCUMENTS

| | | | |
|---|---|---|---|
| 6,908,766 | B2 | 6/2005 | Nien |
| 7,295,307 | B2 | 11/2007 | Naka |
| 8,443,545 | B2 | 5/2013 | Deppermann |
| 9,897,523 | B2 | 2/2018 | Bellemare |
| 10,156,506 | B2 | 12/2018 | Okita |
| 10,261,495 | B2 | 4/2019 | Ishii |
| 10,274,407 | B2 | 4/2019 | Kim |
| 10,551,258 | B2 | 2/2020 | Okita |
| 10,712,151 | B2 * | 7/2020 | Borgstrom ......... B23K 26/1494 |
| 10,900,768 | B2 | 1/2021 | DeWald et al. |
| 11,609,169 | B2 | 3/2023 | DeWald et al. |
| 11,906,488 | B2 | 2/2024 | DeWald et al. |
| 2004/0066503 | A1 | 4/2004 | Hubner et al. |
| 2004/0083024 | A1 | 4/2004 | Wang |
| 2013/0319135 | A1 | 12/2013 | Okada et al. |
| 2016/0258852 | A1 | 9/2016 | Bellemare et al. |
| 2016/0265989 | A1 | 9/2016 | Packirisamy |
| 2016/0273979 | A1 | 9/2016 | Yamada |

OTHER PUBLICATIONS

Olson, DeWald, and Hill, Precision of Hole-Drilling Residual Stress Depth Profile Measurements and Updated Uncertainty Estimator, Experimental Mechanics, ISSN 0014-4851, Exp Mech, DOI 10.1007/s11340-020-00679-1.

Designation: E837-08 (the "ASTM E837-08 Standard")—Standard Test Method for Determining Residual Stresses by the Hole-Drilling Strain-Gage Method, Copyright, ASTM International, 100 Barr Harbor Drive, PO Box C700, West Conshohocken, PA 19428-2959, Edition approved Feb. 1, 2008. Published Apr. 2008. Originally approved in 1981. Last previous edition approved in 2011 as E837-01.

Designation: E837-13a (the "ASTM E837-13a Standard")—Standard Test Method for Determining Residual Stresses by the Hole-Drilling Strain-Gage Method, Copyright, ASTM International, 100 Barr Harbor Drive, PO Box C700, West Conshohocken, PA 19428-2959, Edition approved Sep. 15, 2013. Published Oct. 2013. Originally approved in 1981. Last previous edition approved in 2013 as E837-13 DOI: 10.1520/E0837-13A.

Designation: E837-20 (the "ASTM E837-20 Standard")—Standard Test Method for Determining Residual Stresses by the Hole-Drilling Strain-Gage Method, Copyright, ASTM International, 100 Barr Harbor Drive, PO Box C700, West Conshohocken, PA 19428-2959, Edition approved Oct. 1, 2020. Published Nov. 2020. Originally approved in 1981. Last previous edition approved in 2013 as E837-31a DOI: 10.1520/E0837-20.

Schajer, Hole Eccentricity Correction for Hole-Drilling Residual Stress Measurements, Experimental Mechanics, Aug. 24, 2022.

Wang, Refined Analysis of the Relieved Strain Coefficients for the Off-center Hole-drilling Case, Experimental Mechanics, pp. 367-371, Dec. 1990.

Sandifer and Bowie, Residual Stress by Blind-hole Method with Off-center hole, Experimental Mechanics, pp. 173-179, May 1978.

Monaca et al., Surface integrity in metal machining—Part II: Functional performance, International Journal of Machine Tools and Manufacture, 164 (2021) 103718, pp. 1, 14, 15, 36, 39.

European Patent Office, "Communication pursuant to Article 94(3) EPC", in European Application No. 18884004.5, Oct. 17, 2022, 8 pages.

Ersoy Nuri et al.: "Measurement of Residual Stresses in Layered Composites by Compliance Method", Apr. 30, 2000 (Apr. 30, 2000), XP055968725, DOI: 10.1177/002199830003400703 Retrieved from the Internet: URL:https://www.researchgate.net/publication/241652986_Measurement_of_Residuai_Stresses_in_Layered_Composites_by_Compliance_Method [retrieved on Oct. 6, 2022].

European Patent Office, Communication—The extended European search report pursuant to Rule 62 EPC, in European Application No. 22207969.1, Feb. 10, 2023, 13 pages.

Canadian Application No. 3,080,749, Office Action mailed Oct. 13, 2023, 4 pages.

Japanese Application No. JP2023-053316, Office Action mailed Apr. 9, 2024, 8 pages (include English translation).

European Patent Office, Communication pursuant to Article 94(3) EPC, Examination report in European Application No. 22207969.1, Jun. 26, 2024, 15 pages.

ISA/US, "Notification of Transmittal of the ISR and the Written Opinion of the International Searching Authority, or the Declaration," in PCT Application No. PCT/US2018/062910, Apr. 29, 2019, 13 pages.

European Patent Office, "Communication pursuant to Rule 164(1) EPC", in European Application No. 18884004.5, Jun. 9, 2021, 14 pages.

Venancio Martinez-Garcia et al: "Residual Stress Measurement with Laser-Optical and Mechanical Methods", Advanced Materials Research, vol. 996, Aug. 1, 2014 (Aug. 1, 2014), pp. 256-261, XP055552083, DOI: 10.4028/www.scientific.net/AMR.996.256 *pp. 257,258 *.

Gadow R. et al: "Residual Stress Analysis in Thermally Sprayed Layer Composites, Using the Hole Milling and Drilling Method", Journal of Thermal Spray Technology., [Online] vol. 14, No. 1. Mar. 1, 2005 (Mar. 1, 2005), pp. 100-108, XP055806381, US ISSN: 1059-9630, DOI: 10.1361/10599630522756 Retrieved from the Internet: URL:https://link.springer.com/content/pdf/ 10.1361/10599630522756.pdf> [retrieved on May 21, 2021] * p. 100.103 * * figure 9 *.

Edited by: Schajer, Gary S., Practical Residual Stress Measurement Methods: John Wiley & Sons Ltd. 2013; cover (2 pages); Chapter 2, "Hole Drilling and Ring Coring" by Gary S. Schajer & Philip S. Whitehead, pp. 29-64; Chapter 4, "The Slitting Method" by Michael R. Hill, pp. 89-108.

Schajer G.S., Roy, George, Flaman, Machael T. (Edited by Lu Jian); Hole-Drilling and Ring Core Methods; Handbook of Measurement of Residual Stresses; Society for Experimental Mechanics, Inc.; 1996; cover (2 pages); pp. 5-34 & pp. 64-67 ; The Fairmont Press, Inc., Lilburn, GA.

Procter E. and Beaney E. M., Advances In Surface Treatments; cover (1 page); The Trepan or Ring Core Method, Centre-Hole Method, Sach's Method, Deep Hole Technique; 1987, pp. 165-198, Pergamon Press.

Measurement of Residual Stresses by the Hole-Drilling Strain Gage Method, Vishay Precision Group, Micro Measurements, Nov. 1, 2010, pp. 19-33.

Valentini E. Benincasa A. and Bertelli L., An Automatic System for Measuring Residual Stresses by the Ring-Core Method, AIAS—Italian Stress Analysis Association, 40th National Convention, Sep. 7-10, 2011, University of Palermo.

Steinzig, M. and Ponslet, E., Residual Stress Measurement Using the Hole Drilling Method and Laser Speckle Interferometry: Part 1; cover (1 page); Experimental Techniques, May/Jun. 2003, pp. 43-46.

(56)                     References Cited

OTHER PUBLICATIONS

Keil, S., Experimental Determination of Residual Stresses with the Ring-Core Method and an On-Line Measuring System, Experimental Techniques, Sep./Oct. 1992, pp. 17-24.

* cited by examiner

190

195

272

285

280

277

275

270

233

230

235

510

SYSTEMS AND METHODS FOR ANALYSIS OF MATERIAL PROPERTIES OF COMPONENTS AND STRUCTURES USING MACHINING PROCESSES TO ENABLE STRESS RELIEF IN THE MATERIAL UNDER TEST

CROSS REFERENCE TO RELATED APPLICATIONS

This application, is a Continuation-in-Part of, and claims the benefit and priority of application Ser. No. 17/841,652, filed on Jun. 15, 2022, entitled "Systems And Methods For Analysis Of Material Properties Of Components And Structures Using Machining Processes To Enable Stress Relief In The Material Under Test", the contents of which are incorporated herein in its entirety by this reference.

Application Ser. No. 17/841,652 is a Continuation of, and claims the benefit and priority of application Ser. No. 17/124,248, filed on Dec. 16, 2020, entitled "Analysis Of Material Properties Of Internal Surfaces Using Machining Processes To Enable Stress Relief In The Material Under Test", now U.S. Pat. No. 11,609,169 issued Mar. 21, 2023, the contents of which are incorporated herein in its entirety by this reference.

Application Ser. No. 17/124,248 is a Continuation-in-Part of, and claims the benefit and priority of application Ser. No. 16/201,994, filed on Nov. 27, 2018, entitled "Systems And Methods For Analysis Of Material Properties Of Components And Structures Using Machining Processes To Enable Stress Relief In The Material Under Test", now U.S. Pat. No. 10,900,768 issued Jan. 26, 2021, which claims the benefit of U.S. Provisional Application No. 62/592,240, filed on Nov. 29, 2017, the contents of which are incorporated herein in its entirety by this reference.

BACKGROUND

A consequence of manufacturing is that when metals are formed, through any method or technique, residual stresses are created in the material that may affect its performance and may be difficult to quantify. It is common to find methods, such as heat treatment, that are used to reduce the magnitude of residual stresses but in general there are almost always some residual stresses after a process or treatment is completed. In some manufacturing processes, residual stresses may be deliberately created. As an example, mechanical surface treatments used to improve fatigue performance, such as shot peening using steel shot or laser peening, build residual stresses into the surface of a material. Chemical treatments such as nitriding, or case-hardening, heating in a nitrogen rich atmosphere so as to build a surface into which nitrogen has been diffused, are common processes. Surface treatment affects only a very thin layer of the metal but this is relied on to reduce or prevent the formation of cracks which become points of origination of failure; typically a crack is an area of extreme stress, or stress riser, which may propagate over time leading eventually to the destructive failure of the component.

Because the practical characterization of material residual stress is difficult, a routine engineering solution is to develop a process which ensures that failure modes or lifetimes are achieved on a statistically significant basis. One consequence of this is that the processes are often stochastic in nature and determined experimentally. It should be evident that building in safety factors supported by low-quality data is costly and fraught with uncertainty; using what are only believed to be representative samples in a laboratory is one example of an uncertainty leading to questionable data. It is clear, then, that an urgent need exists for systems and methods that improve such processes so that accurate residual stress measurements may be made on component parts that have been or will be in use. There is also a need for greatly improved accuracy of machining equipment normally used in analysis work at an economical price point. There is an advantage to being able to do the analysis work in the field, thus avoiding the costs and delays when parts must be shipped to a remote facility. This is especially true where critical components for high value systems are being considered. For example, the consequences of failure of a turbine blade can be catastrophic but detection of failure onset is difficult with current processes. Speed of development is compromised by delays introduced if a component part has to be moved to a remote facility for processing and so the opportunity to be able to bring the analytical process to the part quickly becomes beneficial. A further benefit is that the task of tracking a part is simplified since the part need never leave the facility where it is housed. In some cases, the effort to move a large part, such as a large pipe which may require excavation, is simply impractical and being able to bring the analysis to the part is a far better solution.

One particularly troubling and persistent problem, whether in the laboratory or in the field, is the difficulty of machining components to be tested which have a very hard surface. These surfaces present a unique challenge where the forces needed to penetrate the hard surface layer using the usual mechanical drilling or milling approaches are sufficient to significantly alter the existing stress in the part so as to reduce the reliability of the technique as an analytical process. A hybrid approach that combines more than one machining method without compromising performance is useful to resolve difficulties with components that have very hard surfaces.

SUMMARY

The current invention relates to systems and methods for analysis of material properties of components and structures using machining processes to enable stress relief in the material under test.

Fixed laboratory facilities for the analysis of the residual stress condition of a component are capable of yielding exceptional measurement results, but these are usually expensive to implement, requiring permanent housing coupled with costly handling and documentation processes to support a range of customers.

Measurement of surface residual stress of a material sample can be performed by mechanically removing material locally and then measuring a parameter which is related to the residual stress; typically a change in strain or deformation is measured as a function of the material removed. An embodiment of this is commonly achieved by attaching a strain gauge array to the region of interest on the component under test, drilling a small hole in the part and then measuring the effect of this residual stress release by measuring the change in strain using strain gauges that are radially disposed close to the hole. Although this measurement can be approximated with a single strain gauge, to achieve good quality measurements this typically requires three or more strain gauges to be applied to the material, recording accurate position and angle data for their location and then mathematically deriving the residual stress due to the resultant change in strain, relative to a predetermined axis in the material. Current technology incorporates these three strain gauges onto a single substrate that may be attached as a single part; the array generally has two gauges orthogonally positioned with a third at 45° relative to the other two. As is normal practice, each gauge element incorporates center-line marking that facilitates alignment and allows the residual stress to be calculated in any direction on the plane using known mathematics.

One of the better known and widely used techniques for measurement of near surface residual stress requires a small hole to be accurately drilled in the center of the strain gauge array, which relieves local residual stress and the resultant strain which is measured is related to the change in residual stress. The term "center" refers to the point of intersection of the marked axes of the gauge array's elements and in this case the strain gauge is sometimes referred to as a rosette. Accurate positioning of the stress relief hole relative to the center point for the strain gauge array is critical and is a major influence on inaccuracies generated in the stress calculations. The strain gauge elements in this case are either radially disposed around the center in a whole circle or else radially disposed in one quadrant of a whole circle. The hole is generally made to have a depth which is equal to one half of its diameter. Another technique involves cutting a slit of predetermined depth across a representative face of the material measuring the strain change due to slitting, and then calculating residual stress from measured change in strain.

Typically, a component part would be received at a laboratory and then be sectioned or cut so as to allow the element of interest to be accurately positioned on a machine that would be used to either drill a hole or cut the slit. The more that a part is handled, the greater the chance of altering the residual stress in the part to be tested. Further, jigging and clamping of the sample introduce other forces that apply stress to the part. In certain circumstances, such as when a part has a very hard surface, just the excess stress resulting from the extraordinary forces applied to mechanically cut through this hardened layer can lead to intolerable errors in the measurements. Prior to machining, the element or component that will be analyzed must have a strain gauge applied, which typically means that the location at which the gauge is to be applied must be cleaned so that the adhesive used to secure the gauge, or gauge array, will be effective. Wires are then connected to the strain gauge array so that the reference value may be measured and recorded. A typical measurement uses the strain gauge element as part of a Wheatstone bridge array with care taken to properly account for error factors such as temperature effects.

Once the initial reference values have been established, to establish the starting condition or zero reference, the part may be aligned in preparation for the cut. Once machining is completed, the part may be removed from the machine and the new strain gauge readings taken; in some cases this measurement may be done in situ. The differences between these new strain values and the reference values previously established correspond to the residual stress values before the machining process relieved the residual stress that was initially present.

It is clear that there is a need for an appliance that is not entirely dependent on a laboratory environment for producing very high quality results. There is also a clear need for improved accuracy of existing equipment. The objective of this invention is to improve the accuracy beyond what is currently available, to mitigate the need to cut larger test pieces so that they may be fitted to a machine for cutting the residual stress relief feature, to improve the quality of residual stress measurements through development of a single integrated appliance, to develop an appliance to perform slitting or slotting, hole drilling, ring core cutting of an annulus or more complex feature such as an intersection of slots (such as a plus sign) or to simplify or speed the measurement procedure. By taking advantage of the advancement in computer technologies and advanced materials for the creation of an appliance that may be moved to the part under investigation, a considerable benefit is realized. The appliance may be made highly portable for direct attachment to the test piece or can be used as a bench machine at the temporary location.

Note that the various features of the present invention described above may be practiced alone or in combination. These and other features of the present invention will be described in more detail below in the detailed description of the invention and in conjunction with the following figures.

BRIEF DESCRIPTION OF FIGURES

In order that the present invention may be more clearly ascertained, some embodiments will now be described, by way of example, with reference to the accompanying drawings, in which.

DETAILED DESCRIPTION

Figure 1A:
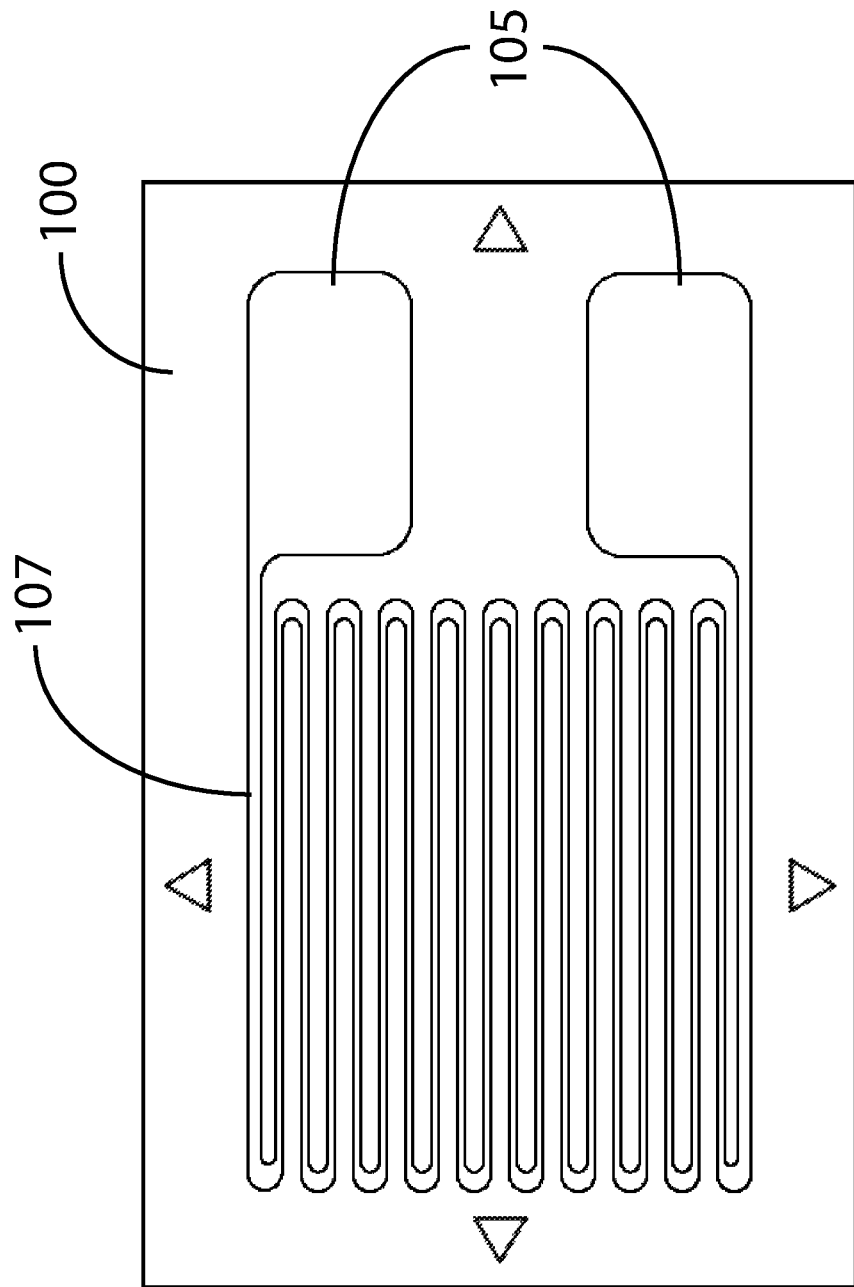
FIG. 1A shows the plan view of a single strain gauge with alignment marks.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary. Conversely, terms such as "can" or "may" are used interchangeably and are intended to describe alternative and/or optional features, i.e., may not be necessary or preferred, for the disclosed embodiments.

Methods and apparatus will now be described which facilitate automated residual stress measurement in a material sample in a laboratory or on site, without requiring the material to be relocated to another facility.

One or more locales may be selected at which measurements are to be made. In the case where strain gauges are to be used, after cleaning and attaching a strain gauge or strain gauge array to one or more measurement locales, appropriate to the measurements intended, the one or more strain gauges or arrays may be connected to a measurement device which allows the starting strain to be recorded. Because a newly applied strain gauge is not displaced from its starting value of resistance, this is effectively the zero point from which subsequent measurements may be referenced. In one embodiment, the strain gauge may be coupled to an analog to digital converter so that the measured data may be recorded as a machine readable file and used subsequent to the completion of any of one or more machining processes to yield a set of associated strains. The residual stress condition of the material may be calculated corresponding to each of the one or more machining steps and the results presented in numerical or graphical form. Other methods, such as laser interferometry, using optical technologies may be used to make strain measurements.

In some embodiments, a small slot can be cut into the surface of the material. This slot may have a predetermined form and be cut normal to the surface at the point of the feature. The plane of the slot is, preferably, aligned orthogonally to the sensitive direction of the strain gauge when a single gauge is used, but when a rosette array is used this is a lesser concern since mathematical methods can be applied to resolve errors due to angular positioning. In areas of significant curvature, the machined feature may be angularly offset by a small amount according to the compensation rules that an inspector assigns to the analysis.

In a simple embodiment, the apparatus comprises a linear slide, mounted to a base plate that may be accurately positioned relative to the strain gauge or relative to a particular feature on the test material. The slide may be moved with high accuracy relative to the base plate along the direction of the slide. This positioning may be done, preferably, using a linear actuator though other methods that are known to those having ordinary skill in the art may be employed.

A machining tool is mounted to the slide so that its position, normal to the slide which preferably moves parallel to the work surface, may be adjusted. In one embodiment the machining tool is a high speed motor and a cutting tool is coupled to the motor spindle, the tool being selected to cut the sample material appropriately. The motor mounting may be on a vertical slide whose position may be controlled by a linear actuator so that progressive cuts may be made under automatic control. Thus the cut width may be set by choosing the diameter of the cutting tool and the depth of cut set by advancing the slide upon which the motor is mounted. The slide which is attached to the base plate may be moved and, in this way, a linear slot of predetermined width and alterable depth and length may be cut into the material so that the residual stress present in the neighborhood of the gauge or gauge array is interrupted from the residual stress in the bulk material. Other methods may be used for material removal, such as electric discharge machining; EDM techniques allow for very fine feature erosion.

By adding a second slide that moves in the same plane as the base plate, and coupling the motor slide to this, instead of the first slide, the cutting tool may be moved in three dimensions and, provided the actuation steps are small enough, a slot having a complex profile may be cut. In one embodiment, a strain gauge is mounted and a circular or annular slot is cut so that the resulting island upon which the strain gauge array is now mounted is isolated from the bulk material. Of note, cutting an annulus in this way significantly reduces the tool chatter at the floor of an annular cut which is caused by the failure to adequately clear the material chips; the use of a fast milling cutter clears chip residue effectively. Other features such as an intersection of slots or slits or more complex shapes may be cut into the material. In one embodiment a cut geometry is formed from a symmetrical pair of intersecting cuts yielding a feature shaped like a "plus" sign.

To facilitate accurate positioning, an optical component may be used. In one embodiment a camera is located so that its view axis is in the plane of the cutting spindle and approximately parallel with the spindle. In this way, the distance offset between a point defined by an optical graticule attached to the camera and the center of the cutting tool may be determined and this offset calibration factor applied to the control electronics so that once a point is located, then the tool may be moved to the same point so that a cut may be performed based on that reference. Simple trigonometry may be used to compensate for misalignment errors using a test coupon to make this determination. The cutting tool may be aligned to the strain gauge center-point reference or to a feature on the test specimen by an operator or automatically using automated feature detection.

Being able to accurately determine the position of the cutting tool relative to the position of the strain gauges is essential to accurate assessment of the material stress state of the component under test, as is the ability to cut the stress release feature precisely. An important aspect is the ability to make very light cuts at high speed with the geometry of the slot or hole carefully controlled. The depth of the cut feature must be a definite distance below the surface and the floor of the cut should be parallel to the surface at that locale. Thus it is most important that the floor of the cut be square since round bottomed holes are indeterminate as to the mean or effective depth. Complicating matters is the difficulty that arises when a component under test has a very hard surface. Cutting into the surface is then troublesome and likely to damage a mechanical cutting tool so that the goal of a square bottom to the cut feature is uncertain. Changing a mechanical cutting tool is undesirable mid-process, because of the difficulty of maintaining positional registration of the tool so an alternative approach must be found that permits the tool to endure.

In certain applications, some components such as gears and bearings, for example, may have surfaces which have been processed so as to exhibit exceptional hardness. The goal may be to eliminate or mitigate wear or deterioration of the parts due to the environment in which they usually operate. Surfaces such as this can be resistant to penetration by a mechanical cutting tool, so machining a feature that allows disconnection of stresses, so that the stress state of the component may be assessed, becomes challenging. Consider, as an example, the use of a simple drill bit to cut a hole in the part. A rudimentary analysis shows that the cutting axis of the drill has only rotational motion and there is no linear cutting speed. By contrast, the edges of the drill tip move at the circumferential speed of the drill. The cutting performance is determined in no small part by the speed at which the cutting edge moves over the part to be cut, so the simple drill is an example of a cutting tool that has almost no ability to cut on the axis of rotation but as we move radially the increasing speed allows from fair to very good cutting performance; the cutting performance of the drill tip is poorer than the cutting edges further from the center line of the drill. Even simple drilling in moderately hard components, requires considerable pressure to be applied in the plunge direction of the cut.

The application of large pressures has the effect of altering the stress state of the material being cut and is undesirable because it affects the reliability of the resulting analysis. The objective is to minimize the effect of cutting the feature on the stress state of the component being cut. A common device to reduce pressure at the drill point is to offset the cutting edges of the point so that they no longer share a common diameter. The cutting edges are shifted slightly parallel to a common reference dimeter. This ensures that no part of the drill point is stationary and this split point geometry ensures that all the cutting tip has at least some cutting speed and reduces the pressure needed to progress the cut. Nonetheless, with very hard surfaces large pressures are still needed and the resulting mechanical load, coupled with the frictional heating created still results in stress altering conditions which in turn compromise the attempted analysis.

Traditional mechanical machining using a drill bit or end-mill is challenged by very hard surfaces that often require exceptional forces to be applied in the plunge direction. The inevitable effect of this is to create additional stress in the part being machined. The use of a drill bit with an angled tip is less desirable because it will not create the flat bottomed hole in the component under test that is desirable for this type of analysis. Changing tools for any reason during the cut, although practical, is not preferred due to the chance of introducing further errors into the process.

There are several techniques that can be used to penetrate a hard surface with minimal impact on the stress state of the component under test. Air abrasion, using a jet of air with abrasive particles, will cut a hard surface with relative ease, but is rather imprecise, leaving an arbitrary shape to the bottom of the hole created. The process is messy, because of the debris thrown about by the air blast. Electric discharge machining (EDM) using an electric spark cuts through most conductive materials easily, but because of the rather random distribution of the spark, poor control of the hole bottom is inevitable. The need for a dielectric fluid in the EDM process is a severe and messy limitation and a wet work environment is not preferred. Finally, laser ablation can be used to cut through most materials and is very attractive since it is relatively clean and the very fine debris produced as metallic condensate is easily vented using airflow already used in the application. Like the prior two methods of air abrasion and electric discharge machining, laser ablation also fails to produce a precise, flat bottomed hole that is needed to achieve the accuracy demanded by modern metrology, but does allow cutting of a sufficiently precise entry point that penetrates the hard surface so that a conventional mechanical cutting tool can be used subsequently for creating an accurately sized stress relief feature using the flutes of the machining tool to cut the sides of the feature yet allowing the flat bottomed geometry to be achieved without exceptional pressure.

In accordance with one embodiment of the present invention, a hybrid approach combines laser ablation with mechanical machining to achieve unparalleled accuracy in the analysis of components having extremely hard surfaces that cannot be achieved by any of these techniques in isolation. In addition to a mechanical machining head, a laser machining head is located on a common platform and their positions determined relative to a camera which information can be used to precisely locate their points of application. This means that the laser can be applied to cutting through a very hard surface layer thus avoiding the extreme pressure in the axial direction that would be required by a conventional mechanical cutter, allowing a mechanical cutter to be used subsequently to provide the dimensional accuracy required to achieve exceptional accuracy and repeatability in the resulting analysis work.

In a second embodiment, a fiber optic component is used so that the camera element may be remotely located. Modern camera components are highly miniaturized and, provided that the viewing lens is protected or shrouded from metal, abrasive powder or condensate debris that results from the cutting action of the tool combinations that may be used, may be located close to the cutting axis. Another camera may be attached so that the cut may be monitored live at the time of cutting.

A third embodiment incorporates a profiling tool that allows the machine to develop an accurate profile of the part to be machined so that the machining features may be complex and not limited to simple cuts in the z-axis. For reference, the x-axis and y-axis are defined to be in the plane of the base plate of the machine along which the horizontal movement of the machining platform is made, and the z-axis is that axis orthogonal to that plane which is the plane of the plunge direction when we refer to a mechanical cutter such as a drill or end-mill. It should be evident that the use of Cartesian (x,y,z) coordinates are purely for case of description and circular (r, θ, φ) coordinates may also be used if preferred. The profiling tool may be a conventional mechanical tool, or may be implemented using the automatic focusing function of a camera fitted to the appliance. This latter capability also allows very accurate control of the depth of a cut either relative to a particular feature or to the neighboring surface profile; for example in a test sample having a curved surface, the floor of the cut may be positioned at an exact dimension below the surface. In one application, a slot is cut having the material opposite the side on which the strain gauge is placed removed in a staircase fashion, so as to approximate a smooth sloping transition. A similar aspect allows a slot to be tapered at the ends. In both cases the transition may be linear or have exponential characteristics to the slope. It must be emphasized that the accuracy of positioning of the cut feature relative to the strain gauge center point, that is the point where the longitudinal axes of the strain gauges that comprise the array intersect, is key to achieving high quality measurements and thus stress values that are derived.

Refer first to FIG. 1A which illustrates a typical strain gauge 100. In this example the strain gauge is aligned lengthwise along the axis whose displacement is to be measured. Electrical connections are made to the two contact pads 105 and the resistance of the track between them is measured. Strain, the movement of a material, applied in the long direction stretches the conductor 107 joining theses pads, which increases its resistance. Similarly a strain that shortens the conductor, by compressing it, yields a reduction in resistance. These changes are small and often imperceptible to the unaided eye, but can be measured, electronically. This change in resistance may be related to the extension or contraction using calibration curves or calibrated using known forces applied to the material under test.

Figure 1B:
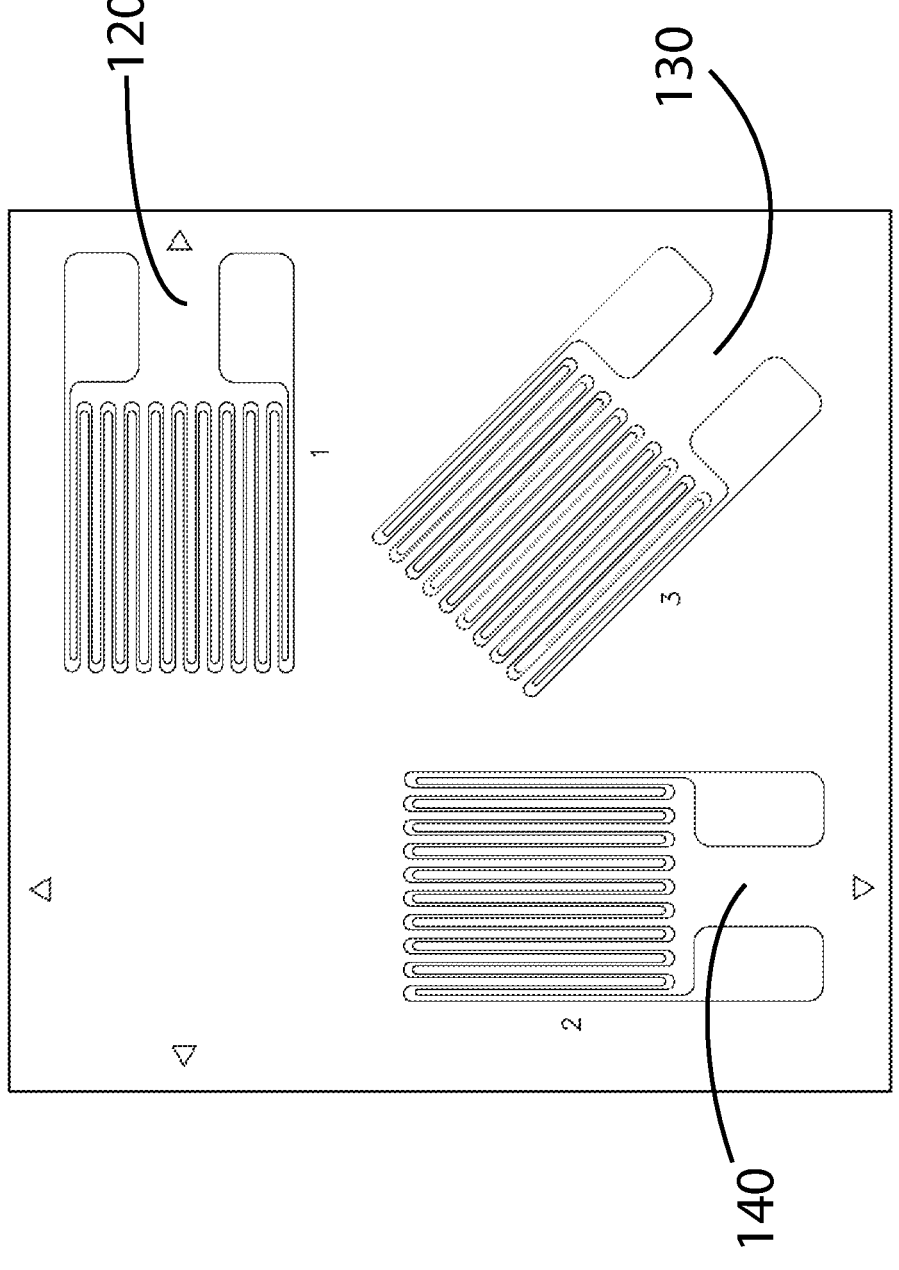
FIG. 1B shows a single quadrant rosette version of a strain gauge.

FIG. 1B shows an array of three strain gauges 120, 130 and 140 aligned so that the extension or longitudinal axis of each is along one of a 0°, 90° and 45° line, respectively 120, 140 and 130. By using an array of this type, having three independent gauges accurately aligned, the strain in any direction may be resolved mathematically. The strain gauges rely on the property that as a material is stretched, its resistance becomes greater in response to the material getting thinner. The reverse is true when the gauge element is compressed and the resistance gets less. Thus when a stress is applied to a material, there is a corresponding displacement (the strain) which displacement may be measured as a resistance change in a strain gauge. It is important to note that these changes, in a typical application, are very small changes indeed, commensurate with the tiny displacements that occur.

Figure 1C:
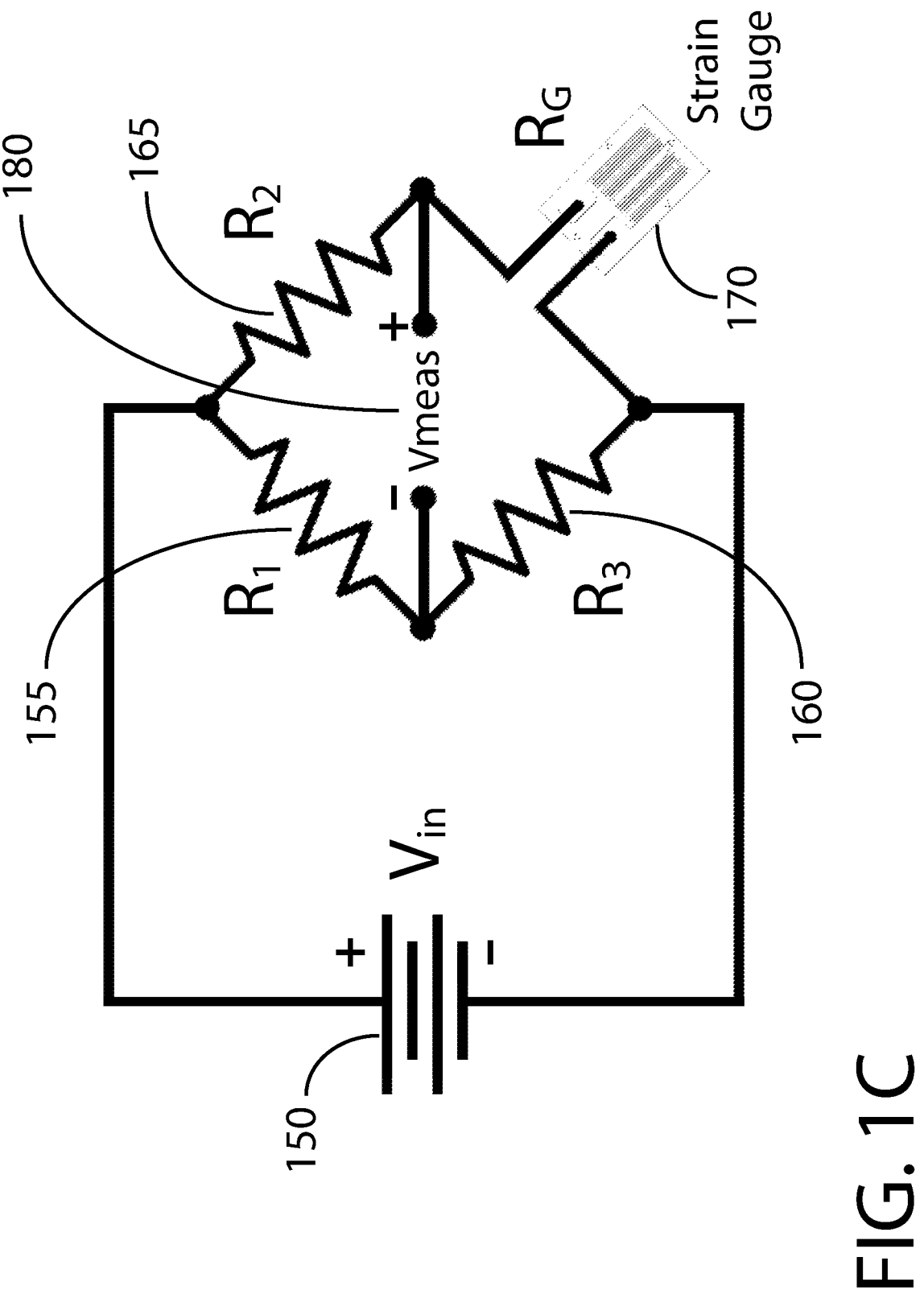
FIG. 1C illustrates a typical simplified Wheatstone bridge.

A Wheatstone bridge is used to determine the resistance of the strain gauge by measuring an imbalance that is caused when the bridge element changes its resistance. FIG. 1C shows such a bridge having a single variable element 170. A voltage 150 is applied to each of two resistive dividers that are nominally equal. Although the polarity of the applied voltage should have no effect upon operation, it is important to ensure that excessive current does not flow; heat is produced when current flows and causes a temperature rise in the elements which causes a change in resistance of the elements. This effect reduces the accuracy of the technique and so it is important to minimize variations in temperature between the elements forming the bridge, which is best achieved by keeping the driving voltage to a value that provides sufficient sensitivity without excessive drift along with some effort to hold a constant temperature between elements. The ratio of resistor R1 155 to R3 160 is set to be equal to the ratio of resistor R2 165 to the resistance of the strain gauge $R_G$ 170. The voltage at the junction of R1 155 and R3 160 will be equal to the voltage at the junction of R2 165 and $R_G$ 170 so the measured voltage $V_{meas}$ 180 will be zero; in practice, it is routine to have one of the fixed resistors alterable or able to be trimmed to account for discrepancies due to manufacturing tolerances and the resistance of the wires that are used to connect the strain gauge. A subsequent change in the strain gauge's resistance value will now unbalance the bridge so that a non-zero voltage will exist at 180. An amplifier may be used to make the bridge very sensitive to changes in the gauge resistance due to changes in strain. Exceptionally fine resolution may be achieved and temperature compensation components may be used to correct for the effects of temperature; these components may be integrated into the strain gauge construction.

In this embodiment, one or more strain gauges may be applied to the test site on the component that is intended for analysis. The strain gauges are usually applied to a cleaned area of the material under test using a good quality adhesive; strain gauge manufacturers will provide guidance on which adhesive should be preferred but perfectly adequate results are usually obtained using fast drying cyanoacrylate glues.

Figure 1D:
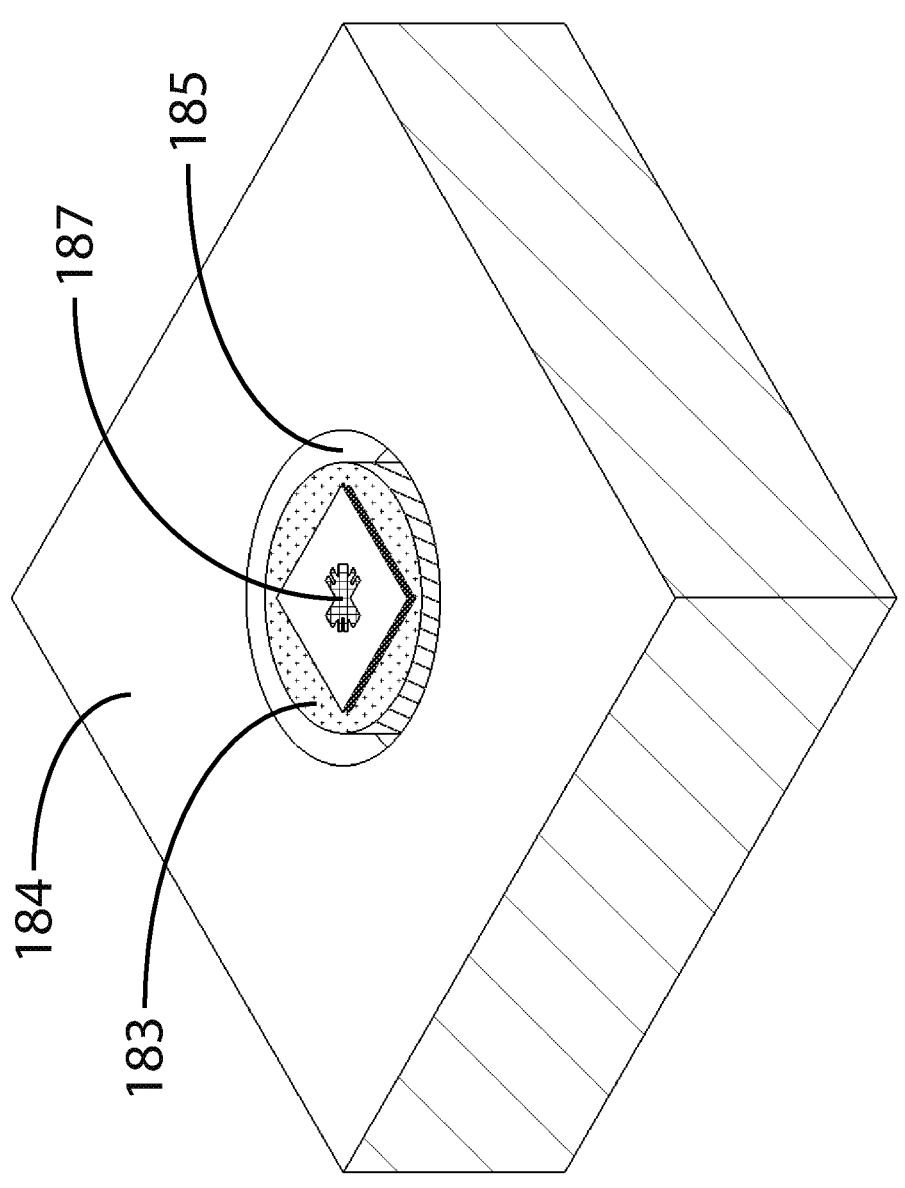
FIG. 1D illustrates a strain gauge attached to a test piece, where an annulus has been machined to isolate the gauge area from the bulk material.
Figure 1E:
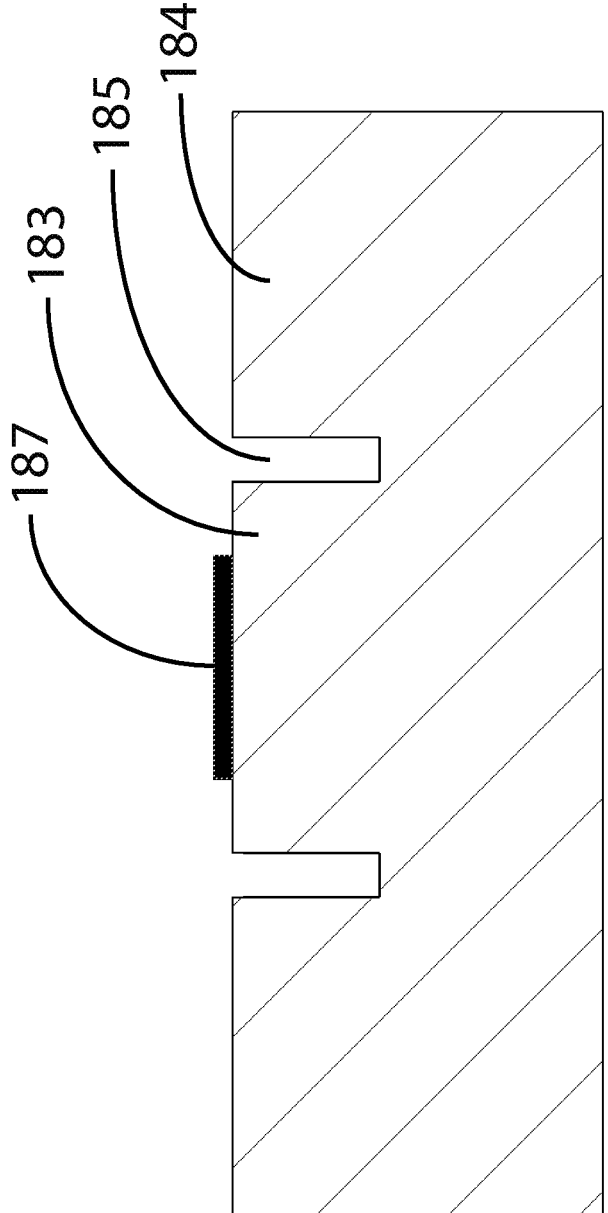
FIG. 1E illustrates the annulus of FIG. 1D in profile view.
Figure 1F:
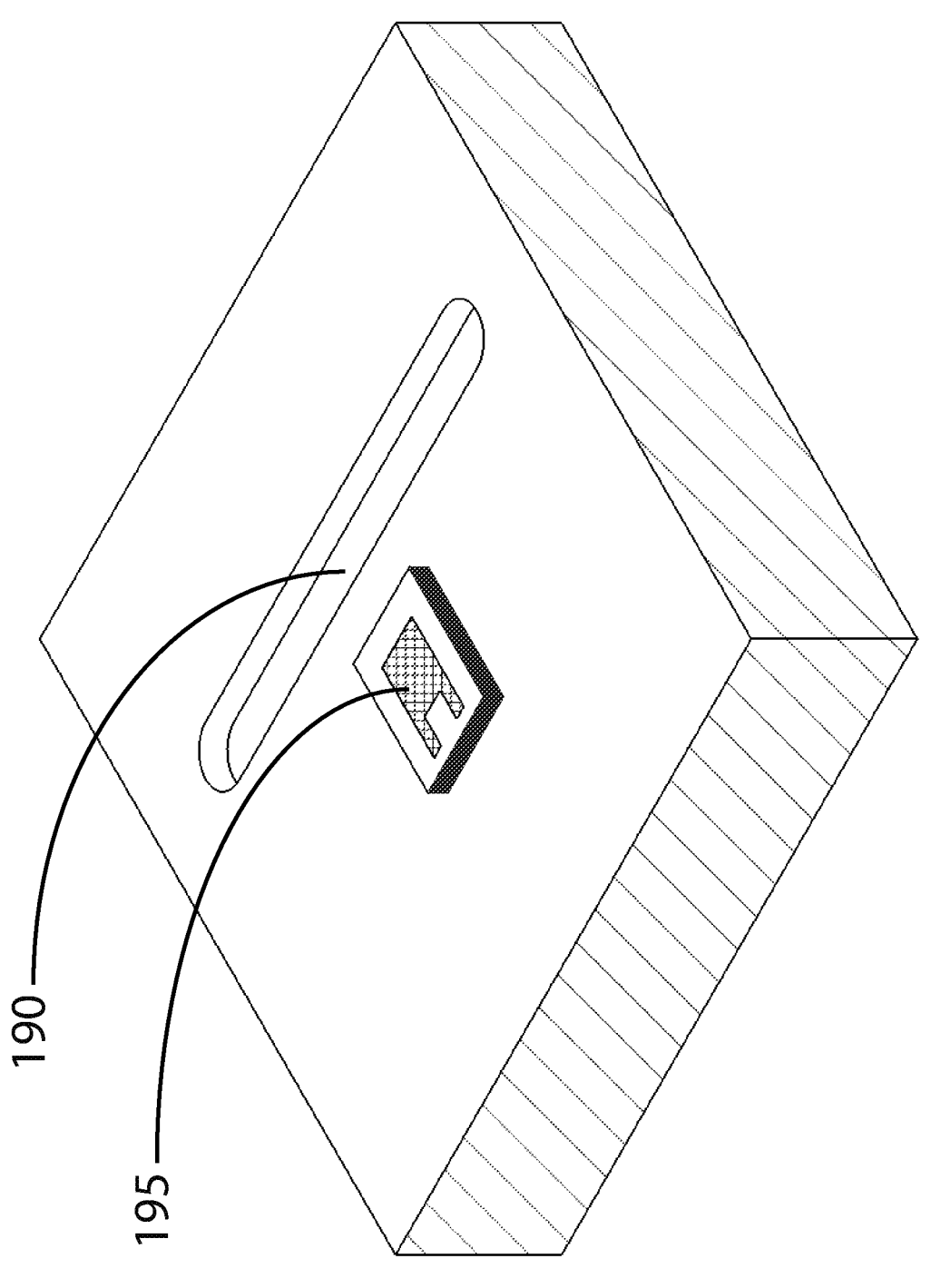
FIG. 1F illustrates the case where a strain gauge is attached to the test piece and a linear slot has been machined to release residual stress.

Turning to FIG. 1D, an exemplary annular slot 185 is shown machined proximate to the gauge array 187. For ease of viewing the illustration shows a representative gauge but this may be a gauge array allowing resolution of the strain in any direction. The machining releases residual stress that was stored in the material surface, as it is essentially disconnected from the bulk material 184, forming a small island 183 upon which the gauge is already mounted, and is now free. FIG. 1E shows the structure of FIG. 1D as a cross section; the vertical dimensions are exaggerated for clarity and are not representative of an actual sample dimension. FIG. 1F shows a second method of machining that interrupts stress in the area to be measured from the stress in the bulk where a linear slot 190 is cut so that the strain gauge 195 or gauge array records the change in strain as the residual stress near the slot is interrupted from the bulk material. Conventionally, residual stress release has been achieved by simply drilling a hole at the intersection of the three axes of a strain gauge array and this machine is capable of performing this operation as well; this is not illustrated because it is well documented in the art.

Figures 1G, 1H:
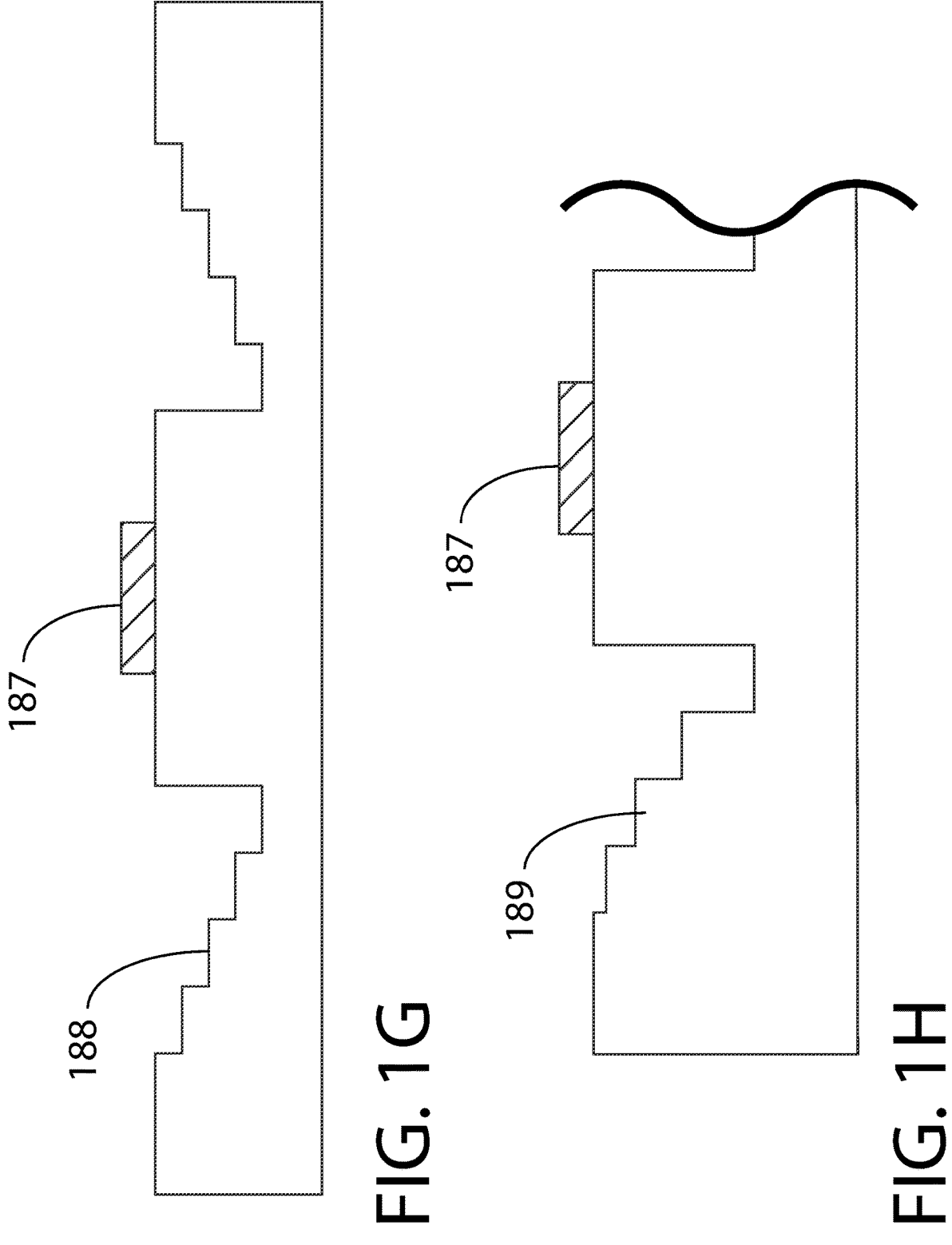
FIG. 1G illustrates a cut profile having a linear staircase appearance to facilitate chip clearing.
FIG. 1H also illustrates a cut profile having a non-linear staircase appearance.

FIGS. 1G and 1H illustrate a cut where the transition is only abrupt at the long edge of the cut proximate to the strain gauge 187. The opposite side of the cut is still in the mass of the component under test and can transition more gradually if desired; a staircase appearance 188 or 189, with two or more steps, is simple to machine and with a reasonable selection of step size very closely approximates a smooth transition. The step sizes may be equally spaced 188 or otherwise, e.g., a simplified exponential relationship 189 as shown in FIG. 1H. In similar fashion, not shown, the ends of a slot may also be cut this way. A significant benefit is that chip (machining debris) removal is facilitated and there is a greatly reduced tendency for the cutting tool to bind or spall in the cut, especially with softer materials. Although the figure illustrates a convex shape where the step-cutting depth increases as the transition is approached, it should be clear that it is equally practical to make the step cutting depth reduce as the transition is approached, giving a concave shape. Either method of producing an exponentially progressive transition is acceptable.

In one embodiment, strain measurements are made using an optical system comprising a well-defined light source such as a laser or array of lasers and one or more detectors. Other embodiments may use a system of digital image correlation to determine the change in strain, or displacement, or else electronic speckle pattern interference may be used. Other strain or displacement measurement methods may be used. The temperature of the sample under test may be measured using the characteristics of a thermistor, a thermocouple or else be sensed optically and incorporated as a function of a camera fitted to the appliance.

Figure 2A:
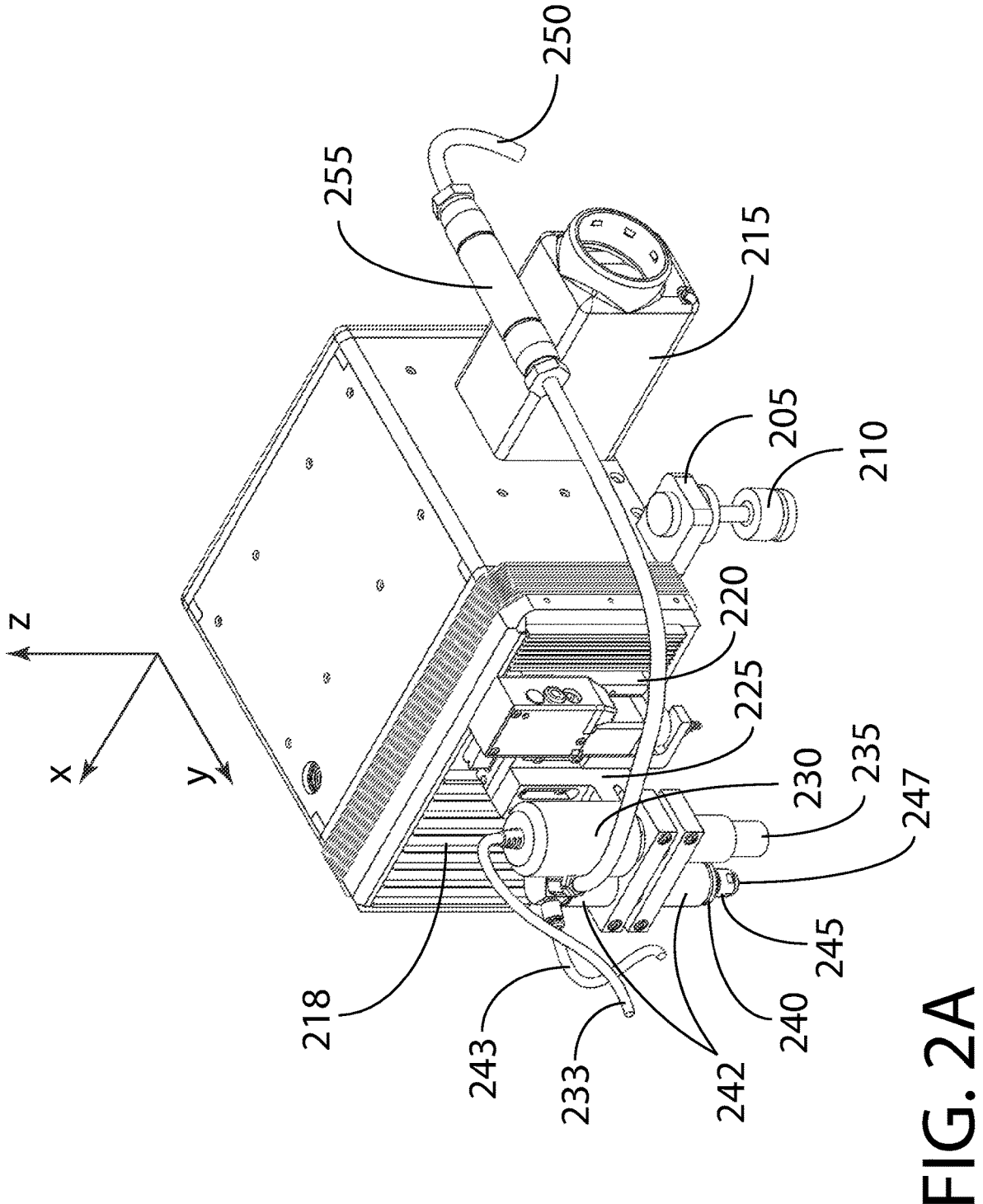
FIG. 2A illustrates one embodiment of a machine and identifies areas of interest in accordance with the present invention.

FIG. 2A illustrates one embodiment of a machining appliance in accordance with the present invention. The machine components are assembled to a base plate 205 which is equipped with typically three feet 210 so that it will be stable in most configurations. In one embodiment, all three of the mounting feet 210 may be adjustable so that the base plate may be made parallel to the part, or test sample, which is to be machined; although this is not strictly necessary, since in another embodiment the machine is able to accurately track the surface of the part, it is useful for simpler tasks having few if any complex curves. When the machine is able to map the surface of the part to be machined, two or more of the feet 210 may be adjusted automatically using suitable actuators so as to align the machine relative to the desired machining area.

The x-axis drive motor is shown at 215. This is a linear actuator and may assume any of a number of forms. Typically this will be a stepper or servo-motor that turns a ball screw, or lead screw, which in turn drives the platform that bears the movable parts of the machine along the x-direction. Drive motor 215 is selected for its ability to develop high torque coupled with accurate positioning. In the case that the motor 215 is a stepper motor, an electronic controller delivers properly phased power to drive the motor at the defined speed and direction so that the moving platform may be positioned as required. To protect the precision actuation mechanism used for any of x, y or z motion, it is preferred if such mechanisms are enclosed. To allow for free motion, sliding panels or bellows as shown at 218 prove effective for this purpose.

Not shown in detail in this figure, are the motors that drive the machine in the y and z directions. Linear precision slides are used to allow parts to move relative to one another. Typically these may be supported on ball bearings so as to minimize sliding friction and to reduce the stiction, or static friction which is undesirable because it compromises accuracy of small displacements. Well lubricated gibs are often used where rigidity is needed in a slide and permit an adjustment point to take up any wear but are less necessary in a miniaturized appliance because the loads are generally quite small. In practice, this appliance when properly adjusted at the factory should require little if any additional maintenance beyond lubrication. A component of the y-axis slide 220 is shown only in part. A section of a typical slide is shown later in FIG. 3.

The mounting assembly 225 which attaches the machining components to the three-dimensional motion platform may be adjusted in a series of predetermined steps. This allows the mounting assembly to be extended or offset in the z-axis so that the z-axis travel is not required to be extensive. Continuously variable mounting can also be used but provision must be made for limiting the risk of slippage or misalignment; one method for achieving this is to use a screw assembly for adjusting this position or adjusting a stop that prevents further movement of the mounting assembly. This is especially useful where a feature of the material to be machined might otherwise intrude and limit the z-axis motion. The mount may be attached in various orientations so that machining may be performed in other than normal positions and is illustrated in more detail in FIG. 4A. This might allow, for example, a feature to be cut in a vertical part of a test sample without having to re-orient the sample. A variety of mount configurations are possible and provided that they are not so massive as to tax the machine driving mechanisms allow for a good range of machine reach.

A camera 230 is mounted so that it is a defined distance from the machining location. Power and signal are delivered by means of a cable 233. The camera position offset from the machining point may be calibrated by machining a spot and then moving the camera under manual control so that the image of the machined spot is centered in a graticule. The difference between the starting position of the camera that corresponds to the machining action and the position where the aspect is centered in the camera visual field represents the camera offset. This offset may be stored as a computer constant and when a feature is identified visually, the machine tool may be moved to the point by simply adding or subtracting this stored constant as appropriate. To protect the lens of the camera, and to improve contrast in the image, a lens hood or shroud 235 may be fitted. Optionally a source of illumination may be collocated with the shroud or added externally. The light source may be monochromatic or polychromatic. By using light emitting diodes of various colors, the image quality may be optimized.

A high speed motor 240 which drives a cutting tool installed at 247 is mounted to the motion platform so that the cutting tool may be moved to the sample and a programmed cut made according to the intended feature. The spindle speed should be high; in one embodiment, this speed ranges from 10,000 to 100,000 rpm so that the optimal cutting rates may be achieved. A collet or other tool-mounting device 245 is located at the end of the spindle. In most applications a carbide-tipped end-mill is sufficient to perform the machining actions; the cutting tool will usually be determined by the application and the material to be cut. Motor power is supplied through a connection 243.

To avoid the need for coolant or lubricant at the point of cutting, very light cuts may be taken, in the neighborhood of a few ten-thousandths to a few thousandths of an inch (in one application the optimal cut is about 0.004 inches or approximately 100 μm) per cutting pass. This of course will mean that numerous passes will be required in order to achieve a reasonable depth to provide sufficiently accurate information. Working depths of approximately 5 mm are generally adequate for either a slot or a hole depth, though this may be determined by considering the material and other pertinent information. In the absence of or in addition to a coolant, chips, the debris resulting from cutting action, can be removed using an air blast from a nozzle that blows on the cutting tool; this is not shown in FIG. 2A to avoid cluttering the drawing with supporting detail.

At the high spindle speeds used in this embodiment, significant currents are applied to the motor when under load. This results in heat being generated in the motor itself from both the I²R losses in the windings as well as eddy current or iron losses. This heat, though not particularly injurious to the motor, presents a potential burn hazard for an operator, so the motor may be fitted with a shroud 242 to which airflow is directed. This cooling air 250 may be piped to a filter 255 to remove any contaminants that may be present. If other than dry clean air is passed over the motor, then a residue may be trapped or deposited on the motor housing and may act as an insulating barrier that would significantly increase the operating temperature of the motor and might cause accelerated failure. Typical contaminants from compressed air include water, oil and debris all of which are best removed. Although factory compressed air is often available, simple air pumps will also suffice in general, but these too will contain dust and dirt particulates that may hamper successful operation and so some simple cleaning action is preferred. The cooling air can be simply exhausted from around the motor shroud and does not have to be directed or channeled.

Strain gauge arrays as shown in FIGS. 1A and 1B have large connection pads that facilitate the attachment of wires for connecting the gauge element or elements to a measurement appliance. Typically, this connection is made by soldering the wires to the pads. To facilitate a good electrical connection between the gauge material and the point at which a user will make a connection to the measurement system, and also to prevent corrosion, the connection pads may be given a thin coating of gold during manufacture that prevents oxidation. Such coatings are not particularly durable and will not survive harsh treatment, but with reasonable care they may be suitable for use with automatic probing equipment. This leads to an opportunity for a probe station to be fitted to the machine of FIG. 2A so that, as machining progresses, the probes may be applied to the gauge and measurements taken and recorded at intermediate points in the machining. As machining progresses, the measured strain moves asymptotically towards a value where further machining causes no significant change in strain. At this point machining may be discontinued which leads to an efficiency improvement not seen elsewhere. The very fine cuts performed at high speed are minimally intrusive and generate very little additional stress in the part which makes this a good strategy, in contrast to the heavy cuts seen with traditional methods. Further, an annulus cut in this way is found to less intrusive than that cut using a coring drill. Tool chatter during machining is greatly reduced because a coring drill is quite inefficient at removing chips created as a result of the cut, in addition to the risk of spalling at the sides of the cut as chips get trapped between the tool body and the material being machined, even when the cutting edges have substantial clearance.

Figure 2B:
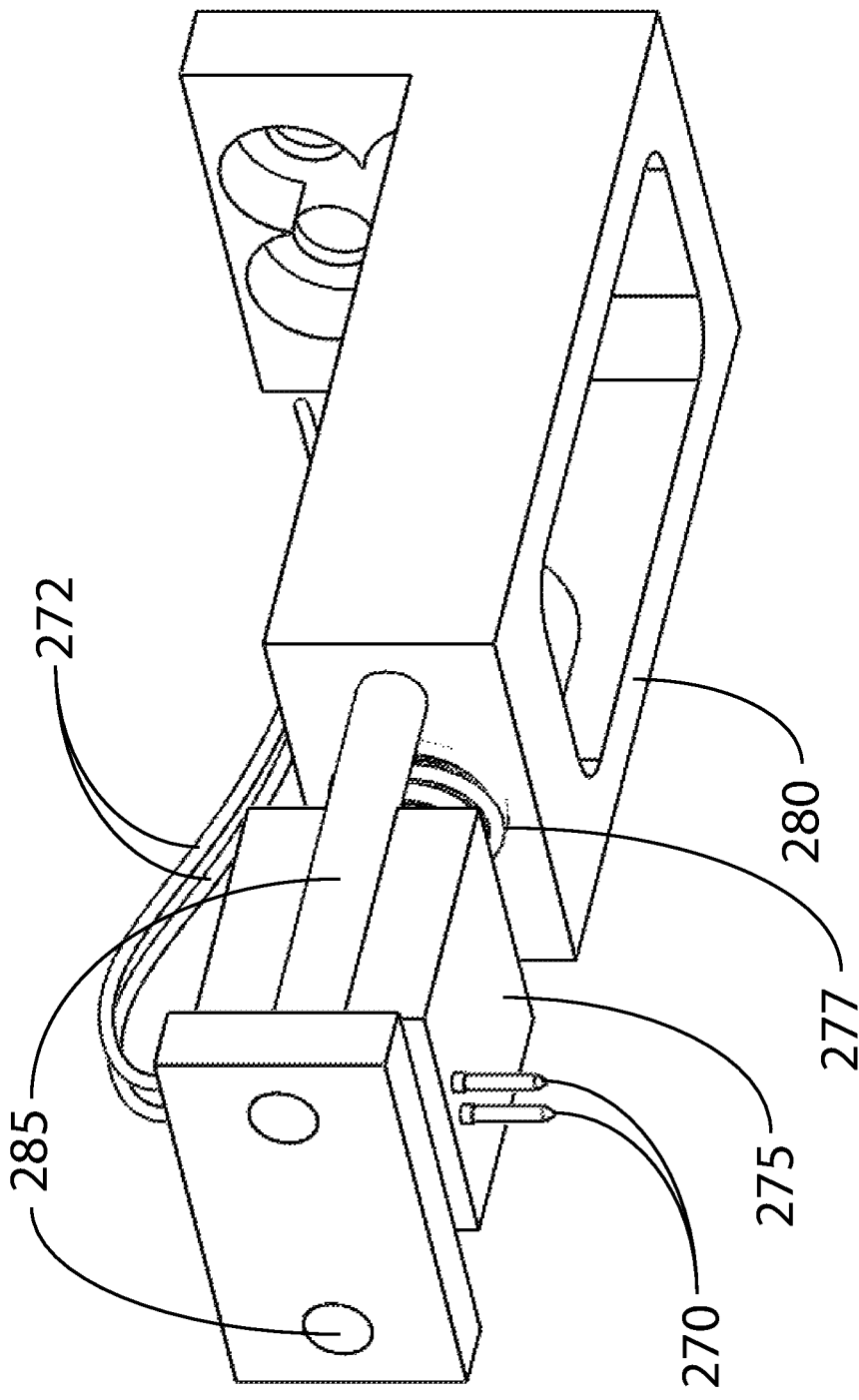
FIG. 2B shows a simplified view of a typical probe assembly having a single axis of adjustment.

The measurement probes may be of any suitable type. The semiconductor and measurement industry are consumers of such probes and these may be easily acquired. Ideally the probes are coated to reduce corrosion problems, e.g., gold-plated, palladium-plated or chrome-plated, and have changeable contact elements so that damaged parts may be replaced. The probe station may be attached to the same mount 225 as the camera 230 and motor 240. FIG. 2B shows an illustrative probe assembly for a single probe connection. The contact component 270 is made from a material that resists corrosion such as a palladium alloy or a gold plated conductor. A spring is normally incorporated in the contact pin assembly that allows pressure to be applied to hold the pin in contact with the contact pad on the strain gauge. The pin retainer 275 is made of a non-conductive material and is held to the mounting 280 by screws 285. Spring 277 ensures that the probe system remains secure in operation. The pins 270 are connected by means of wires 272 to the measuring apparatus. Not shown is a retraction system that allows the probe assembly (usually two or more probes are used depending upon the number of strain gauge connections to be made) to be lifted from the strain gauges whilst machining is in operation. In use, the probe contact system is moved into contact with the gauge contact pads and a starting measurement taken of the gauge starting value or values. A record is made of the position of the motion platform whilst the fine relative position is adjusted; this may be a manual adjustment which yields the simplest embodiment of this system. The probes are then retracted and the camera is used to center the gauge reference points. The offset between the camera and the probe position or positions may now be recorded and stored. Machining may take place as described earlier and, after a predetermined number of cutting passes, the probe station can be returned to its contact position over the gauge or gauge array, the probes extended to make contact with the gauge or gauges and a measurement taken. Absent any contamination, repeated measurements can be made; occasional errors in measurement which occur as a result of wear on the connection pads of the gauge from repeated contact by the probes are easily dispatched by indexing the probe position by a small amount so as to touch a different part of the contact pad.

Figure 3:
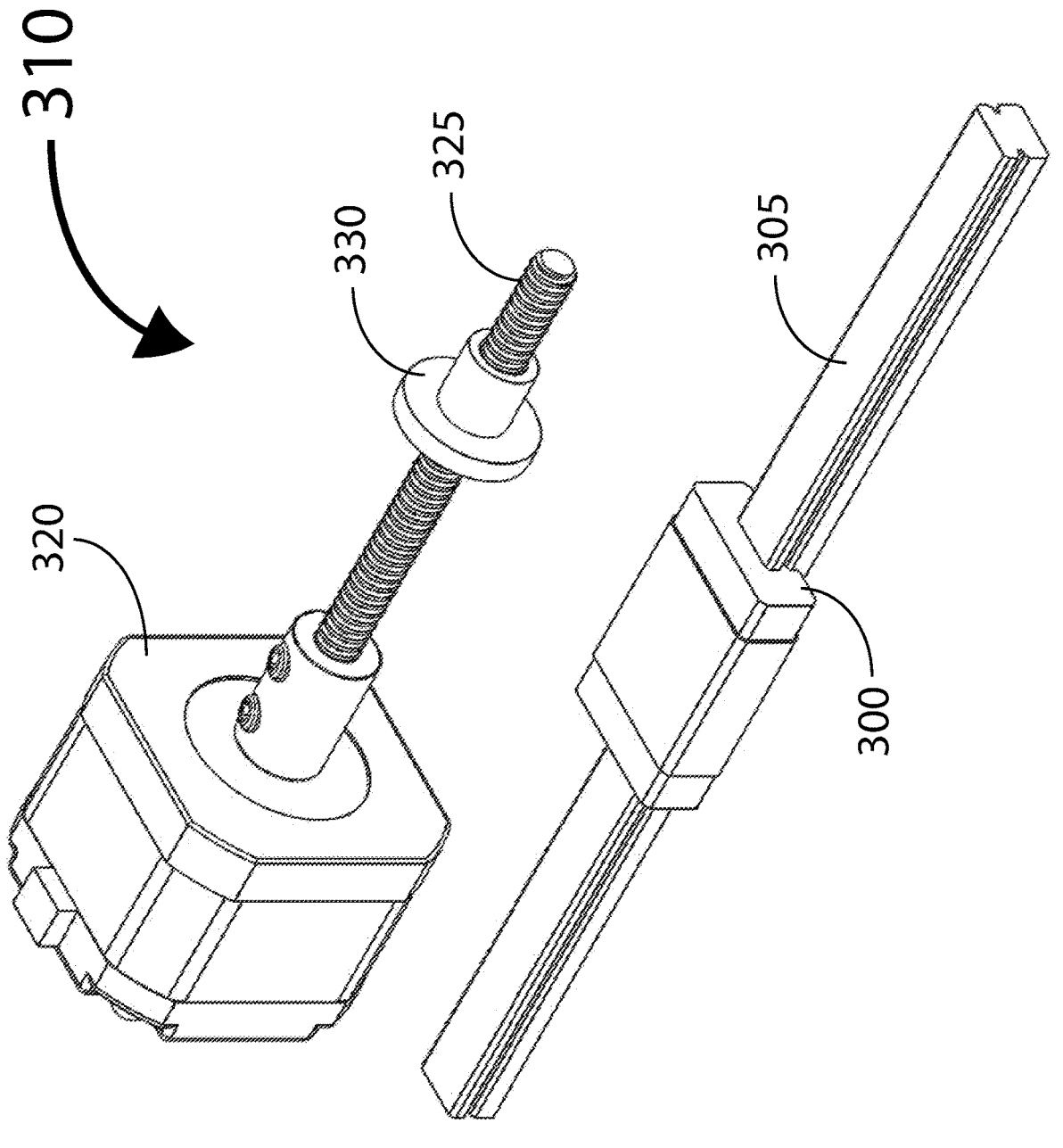
FIG. 3 illustrates one of the moving parts of the machine and its drive mechanisms.

FIG. 3 illustrates the construction of the slides 300 and the drive mechanism 310. The slides are designed to move freely in one axis and to resist motion in the other two axes. The slide 300 fits to a rail 305 using a tongue that mates to a groove; the slide can have tongues on both sides and the rail grooves may be on both sides. These can be augmented with adjustable components that enable wear to be taken up, but for precision machines such as this it is usual to replace worn parts with new parts. In one embodiment, the drive mechanism 310 is operated by a stepper motor 320 which is chosen to have steps of 1.8 degrees which corresponds to 200 discrete steps per rotation. The pitch of the lead screw 325 that drives the slide mechanism is chosen so that one complete revolution moves the slide 320 by 1.2192 mm or 0.048 inches. The drive nut 330 is attached to the slide assembly whereas the driving motor 320 is attached to the body of the machine. Not shown are bearings that can be fitted to stabilize the driving screw in either or both of position or thrust. The driving motor 320 can be selected to have bearings that can support sizable thrust loads and so the far end of the drive screw may need little additional support. Although both X and Y directions may have the same drive components, these do not have to be identical. The vertical or Z direction can also be of a dissimilar nature, except that it is preferred if it is of a fine pitch so that incremental cuts may be precisely managed.

Figure 4A:
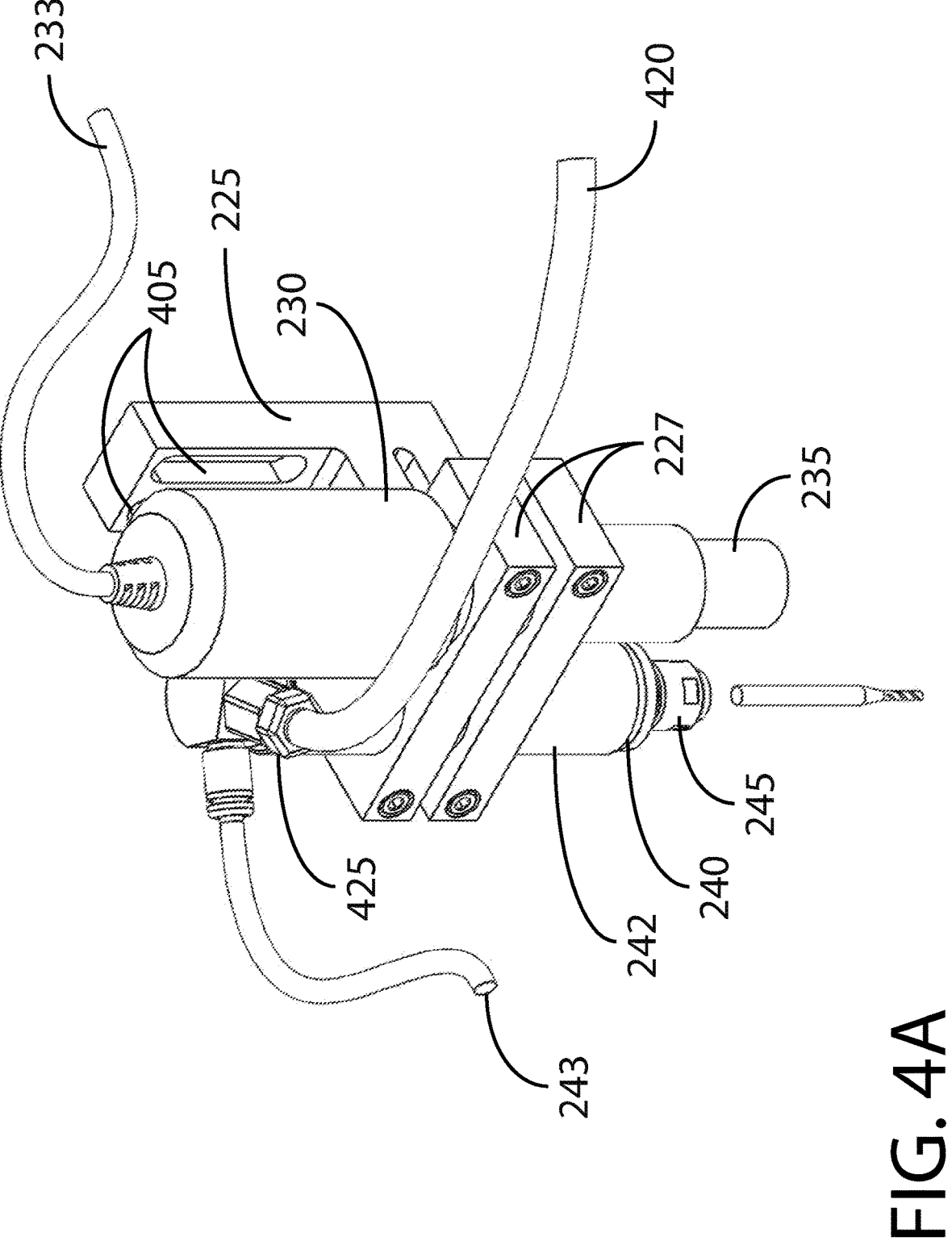
FIG. 4A illustrates the outline detail of the cutting motor, including the mounting and cooling provisions, as well as a camera system.

FIG. 4A illustrates the detail of the mounting of the electric cutting motor and its components seen in FIG. 2A. The mount 225 is designed so that it may be mounted to the three dimensional movement platform in one of several ways. The mount is indexed by two slots 405 so that in one embodiment it can be mounted in one of two ways so that it is possible to cut the feature from underneath as well as conventionally from above. Index pins are used and precisely located so that the mount position relative to the motion platform is always repeatable. In another embodiment the mount may be mounted in several positions displaced by 90° so that it is possible to cut into a vertical surface. In yet another embodiment the mount may be driven by a system that permits any selected angle to be used so that any orientation may be machined. This latter is especially helpful where a cut must be made at a radius in the sample under inspection that would otherwise be inaccessible without considerable set-up and jigging of a sectioned part.

Figure 4B:
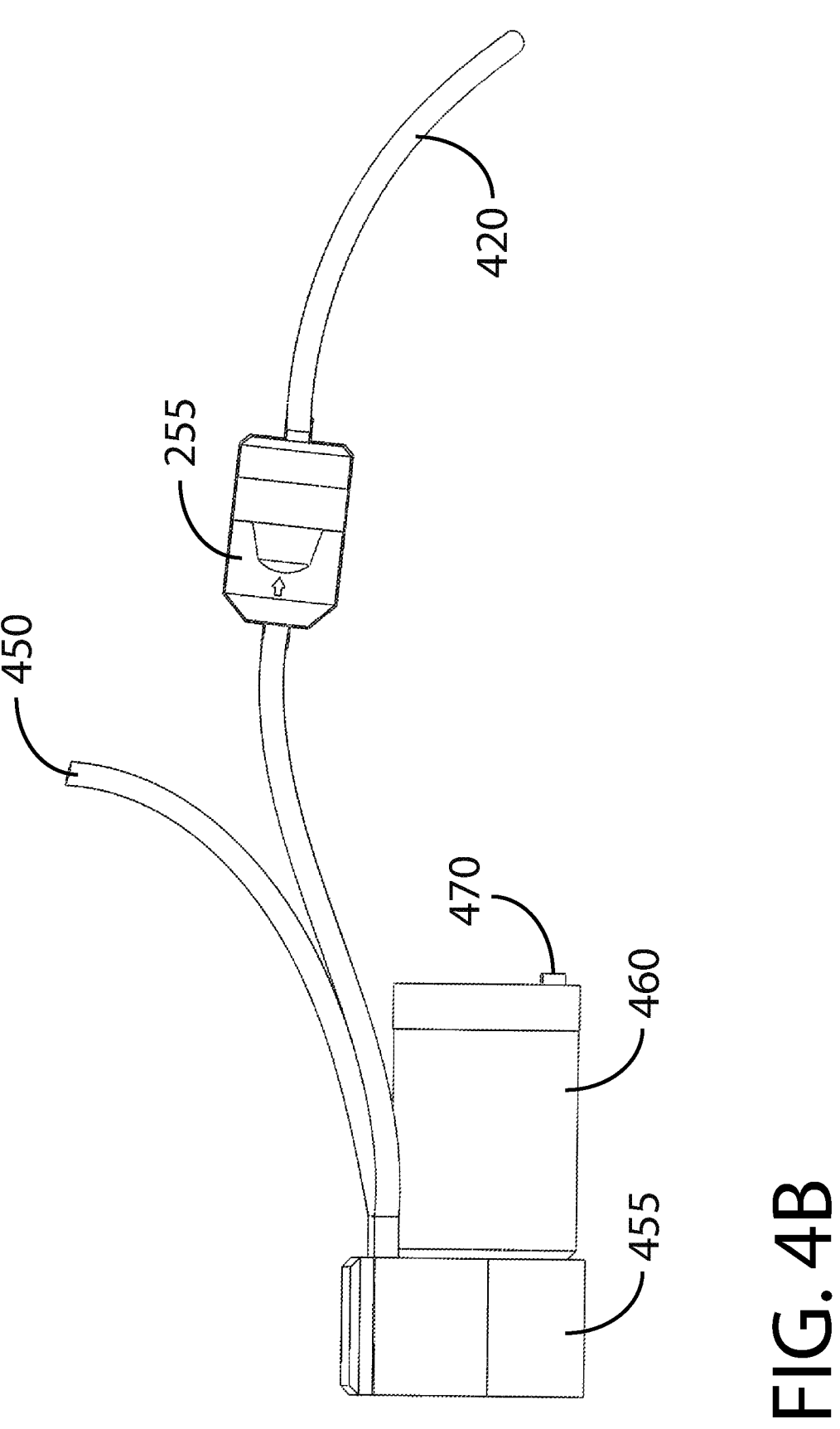
FIG. 4B shows a simple air supply including a pump and filter for cooling air.

The motor shroud 420 has an inlet connection 425 that allows an air supply to be attached. Air flow serves to remove some heat from the motor, but the primary effect is to limit the temperature rise of the shroud. This ensures that an operator does not inadvertently come into contact with a hot part and suffer injury. The air may be taken from a source of compressed air as shown in FIG. 2A or may be derived from a small pump local to the appliance as shown in FIG. 4B. This air is filtered by a filter 255 as seen in FIG. 2A so that moisture, oil and particulates are removed. The filter outlet may be connected to the shroud at the inlet 425 by a flexible pipe 420 and need not be a high pressure connection. A high flow rate is not required and the air may be simply exhausted from the base of the shroud. It may be advantageous if a screen (not shown) is fitted at the shroud base to prevent the ingress of debris or insects when the appliance is not in use. When the appliance is used in an orientation that is favorable to particulate accumulation under gravity, this screen or assembly of screens will help to prevent this. Air may be tapped from the filtered air supply using a simple T-fitting, installed in the flexible pipe or tube, for use elsewhere on the appliance. One embodiment bleeds air from this supply and, using a nozzle (not shown) blows it across a lens shroud 235 fitted to the camera to keep debris and contaminants away from the lens surface. Power for the motor 240 is provided through cable 243.

Continuing with FIG. 4A, an optical system comprising a camera 230 (may be used for locating the machining point or start of the feature to be cut. Power and signal transmission is supplied using a cable 233. A simple shroud or lens hood 235 may be attached to the optical system. This hood may be simple, being no more than a shield to reduce extraneous light that may cause shadowing or loss of contrast. A reticule may be physically attached to the hood that allows measurements to be made. Alternatively a computer-generated reticule may operate directly on the resolved image on a computer screen. The hood 235 may be provided with illumination components; in one embodiment the illumination is provided by one or more Light Emitting Diodes of various emitted wavelengths or color; by switching power to the diodes then the spectrum of the illumination may be changed from relatively long waves in the near infrared to relatively shorter wavelengths at the blue end of the spectrum. This may be used to advantage depending upon the material to be illuminated and its finish. In this way the illumination may be monochromatic or polychromatic which is beneficial to the camera image because modern image sensors have a working bandwidth that extends well into the infra-red spectrum, the temperature and the temperature profile of some or all of the area of the test sample may be measured and used as part of the analytical measurement data.

FIG. 4B shows an ancillary air system used to provide clean cooling air for the motor and an air blast to protect the camera optical system. Air pump 455 pulls ambient air through a tube 450 and pumps it to filter 255, which air is then distributed to the appliance via tube 420. The pump 455 is driven by an electric motor 460; the power for the motor is delivered using a cable that enters the motor via a cable gland 470.

Figure 5A:
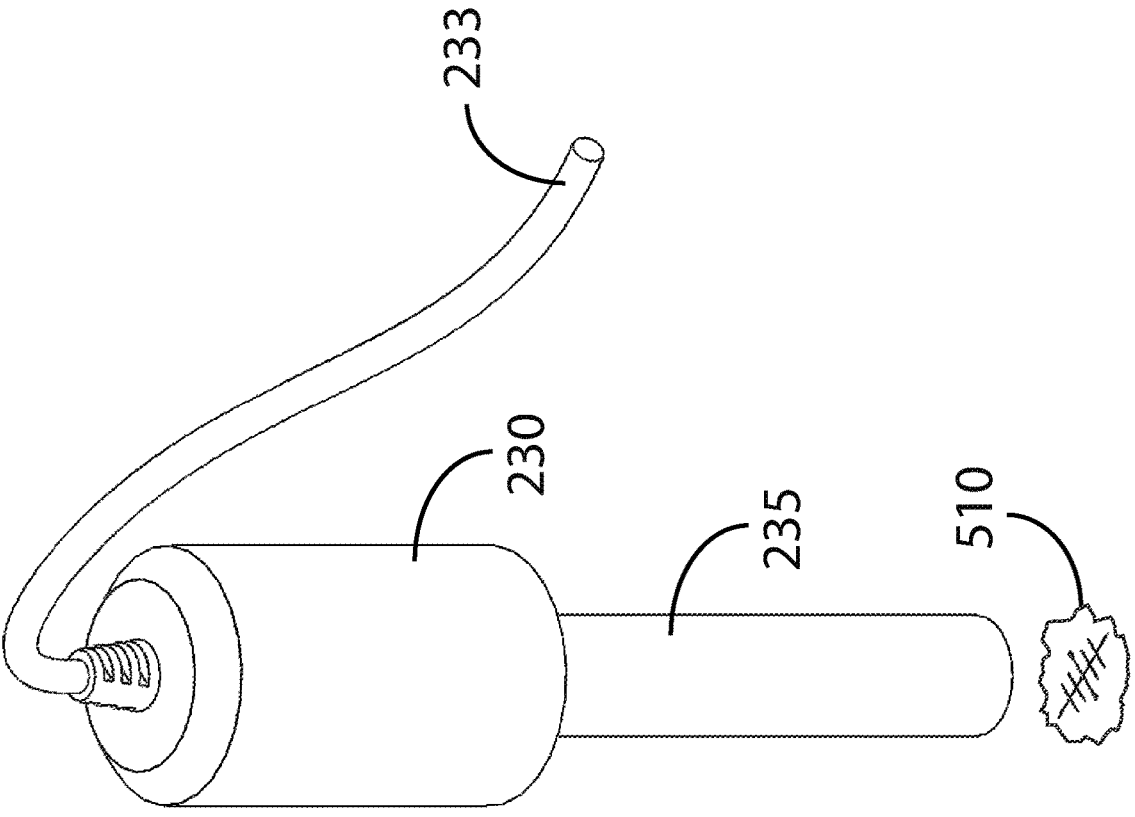
FIGS. 5A and 5B show the camera, its shroud, reticule and illumination devices.
Figure 5B:
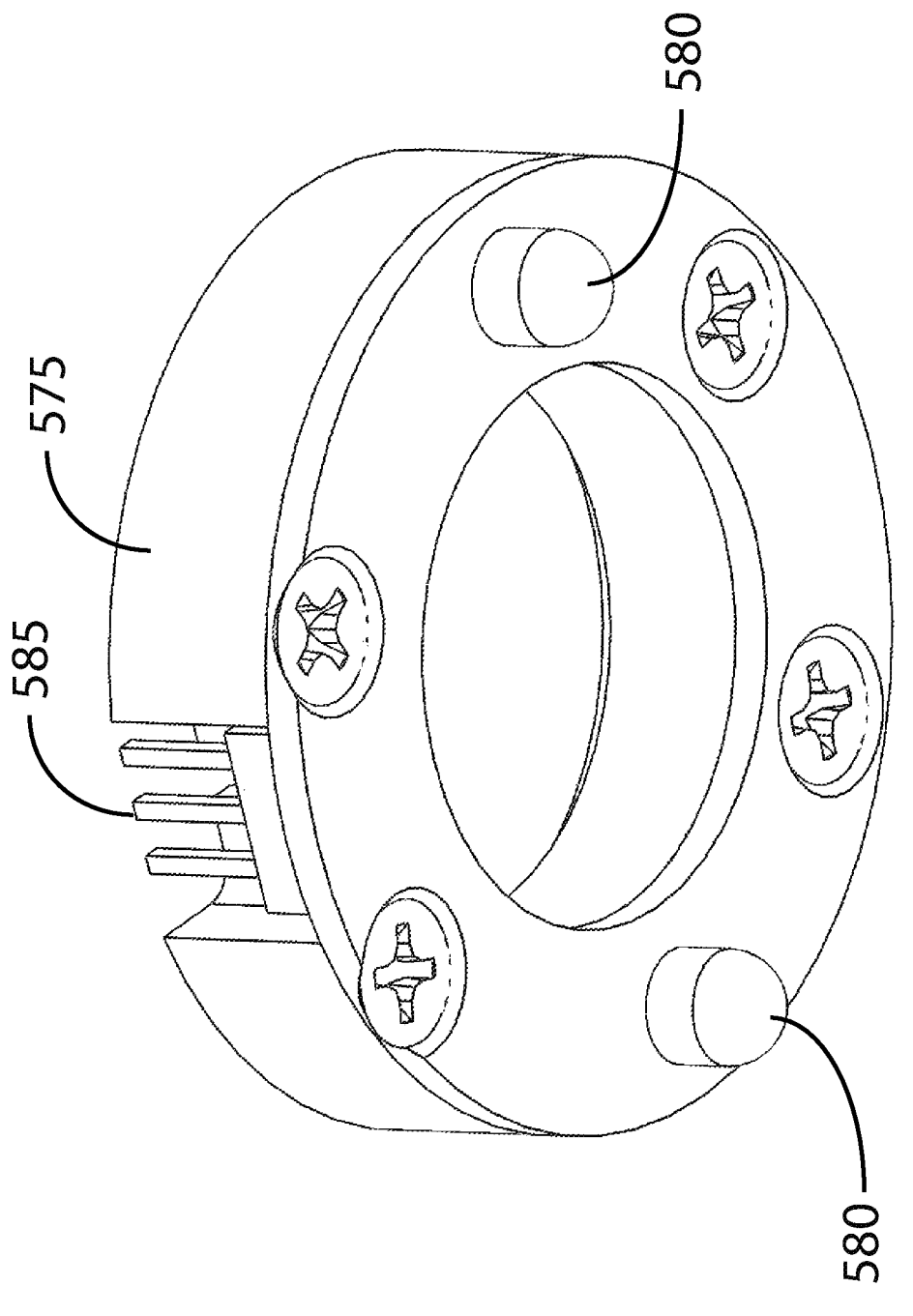

FIG. 5A shows the camera 230, its power and signal cable 233, the shroud 235 and a reticule 510. This reticule is a precision measurement reference and it may be either projected onto the workpiece as suggested by the figure, or else may be engraved onto an insert that is positioned within the shroud so as to give an accurate distance measure for the image. This is a relatively common method that is used in microscopy although, for metallurgical applications, methods such as specular reflection processing are also useful. In one embodiment, a computer generated reticule is displayed on the viewing screen where it overlays the workpiece image. FIG. 5B illustrates an illumination device that may be fitted to the camera shroud. The body 575 provides a housing for the illumination components 580. These may be light emitting diodes and can be selected to produce a monochromatic light, polychromatic light or even a selectable range of wavelengths. Power is applied through connector 585 mounted into the body. This means that this illumination component can be simply changed for different versions as required by the application. Modern camera components are highly miniaturized and so it should be clear that it is practical to embed the illumination elements into the camera sensor itself. The resolution of the camera is a design choice as is the illumination method. Camera cleanliness may be assured by taking some of the air supplied to the electric machining motor shroud and directing this as a jet across the camera lens area. This is advantageous when the appliance is configured and aligned so as to allow particulates and debris to fall proximate to the camera, as might be the case when the appliance is used to make inverted cuts from underneath a test piece.

Figure 6:
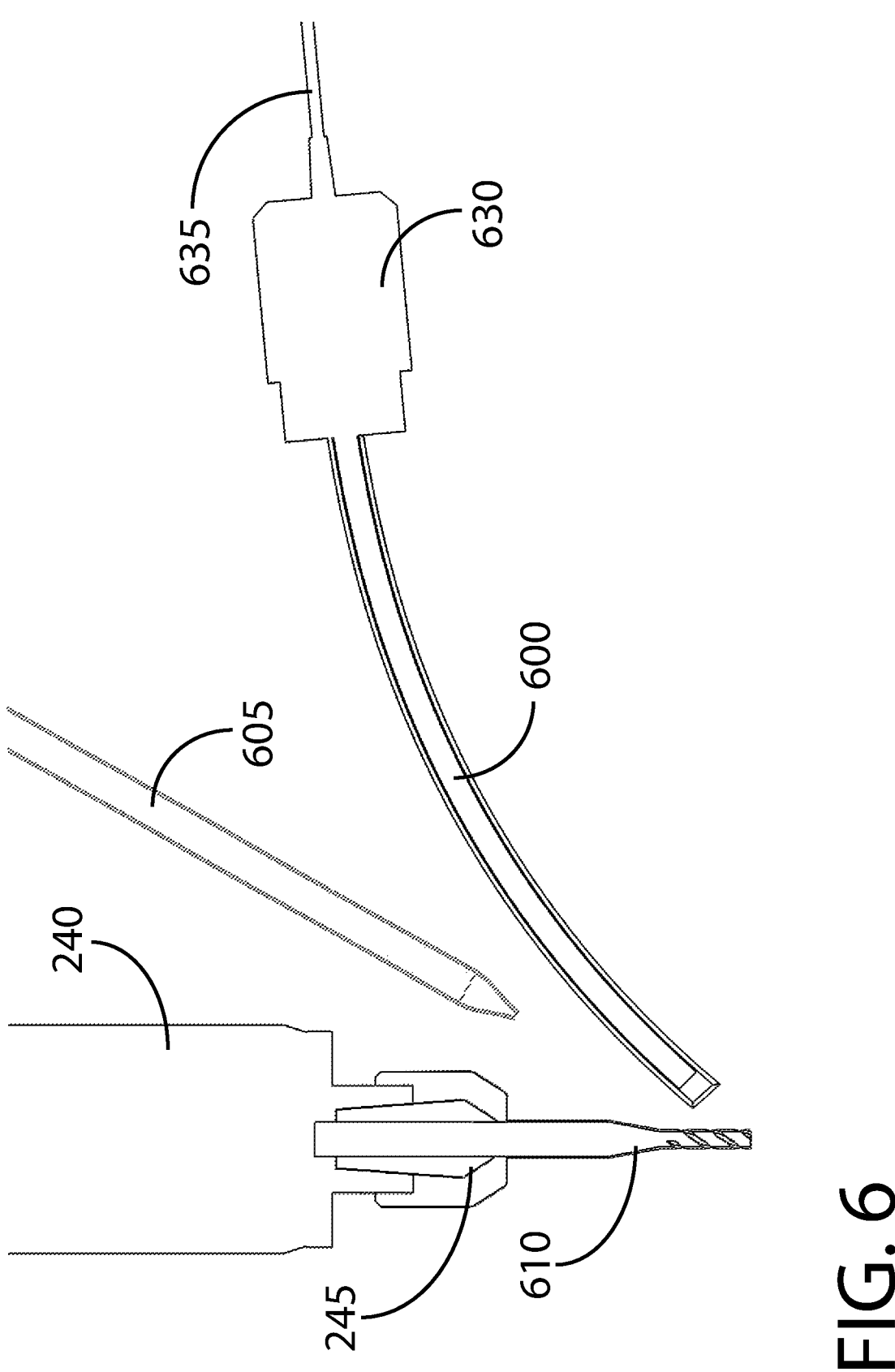
FIG. 6 shows an alternative visual system based on fiber-optic technologies along with an illumination system located proximate to the cutting tool.

In yet another embodiment, FIG. 6 shows how a fiber-optic cable 600 may be used, located in close proximity to the cutting tool 610 secured by collet 245 so that the appliance may be positioned directly by the operator. In the same way as an illumination source was used for the camera shroud 235 of FIG. 5A a user selectable monochromatic or polychromatic source may be provided for the target viewing site. It is important to understand that low light operation of a camera necessitates a wide aperture for a lens structure which has the effect of limiting the depth of field. By using a suitable illumination level, the lens aperture may be reduced which results in an improved, or greater depth of field. By using LEDs as the illumination source, good intensity may be achieved without excessive heat dissipation as generally exhibited by a typical incandescent source.

Further, LEDs offer the considerable advantage of being exceptionally robust and are relatively immune to mechanical shock or abuse.

The use of a fiber optic cable is also an opportunity to remotely position the illumination source 630, which can also include the camera sensor. By using a partially silvered mirror arrangement to reflect the illumination, the fiber optic cable puts the illumination directly to the viewing point while the camera sensor sees through the mirror directly to the viewing point. One advantage to this is the reduction of off-axis shadows and the method is comparable to the use of a borescope, used as an inspection device. The ability to deliver high illumination remotely is beneficial because there is no need to position electronic controls and excess wiring in an area where machining is occurring. The reduction in mass at the working point of the motion platform further improves its maneuverability and responsiveness. Although the camera may be the component 230 of FIG. 2A and FIG. 5A, the camera in FIG. 6 enclosed within housing 630 has the partially-silvered mirror as an integrated part of the camera component. Cutting tool 610 is held to the motor 240 by collet 245. Nozzle 605 directs an air blast that is intended to clear machining debris from the region around the cutting tool 610. The fiber optic cable may be mounted in place of the camera when the camera function is included in the housing 630 or else it may be secured so as to illuminate the required region, if it provides only illumination, in conjunction with a conventional camera.

Figure 7A:
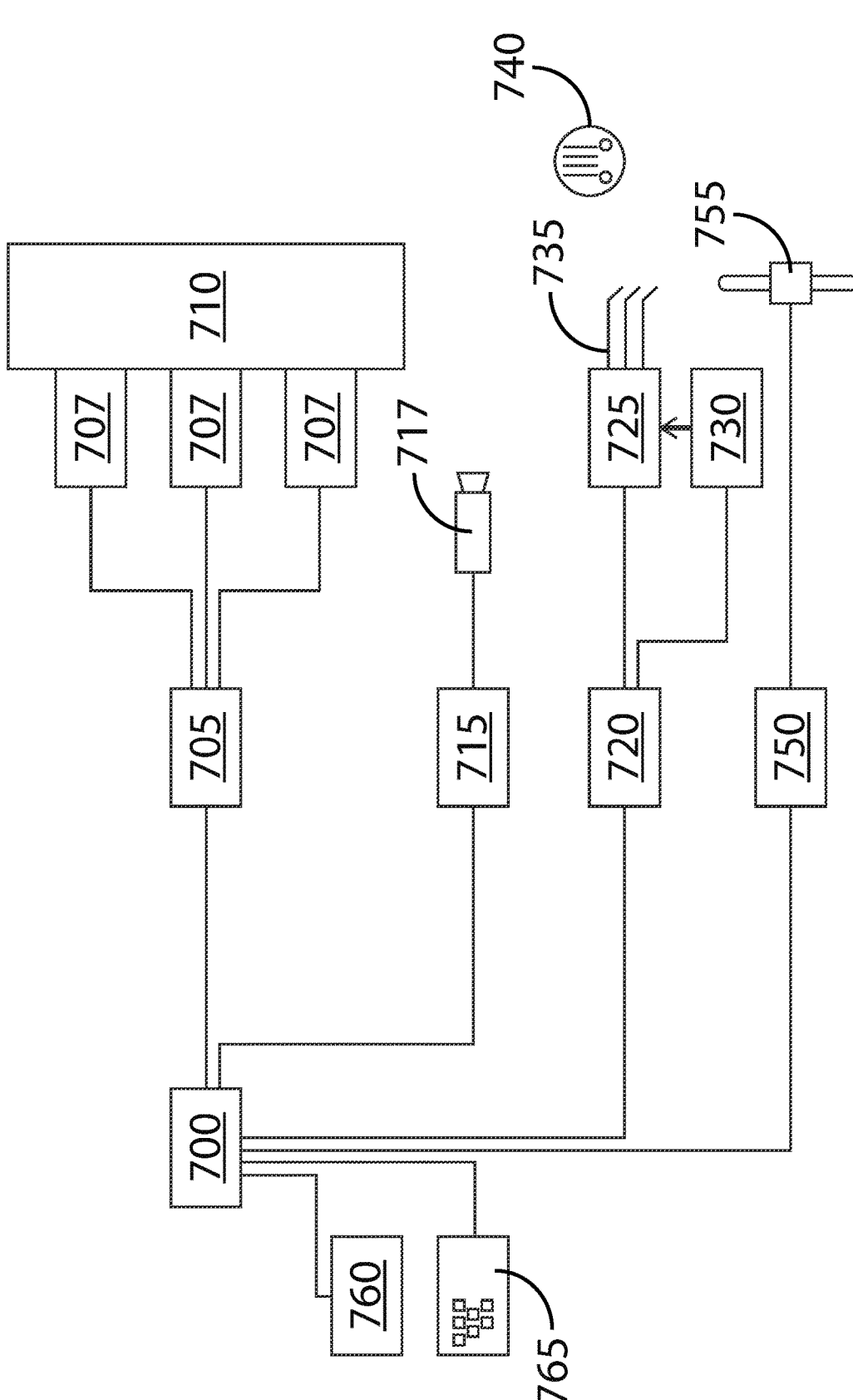
FIG. 7A is a block diagram of the appliance showing the interconnection of the parts of the basic machine.

A block diagram shown in FIG. 7A of the system shows a computer 700 connected to the control electronics 705 that manages the drive motors 707 for the motion platform 710. A camera interface 715 couples to a camera system 717 (230 of FIG. 2A or 630 of FIG. 6 in the case of the integrated camera and fiber optic cable) so that visual information can be stored and displayed. Precision measurement electronics 720 connect the computer to a probe station 725 and a positioning mechanism 730 is also provided so that the probes 735 may be extended or retracted. The probes are adjustable so that they can be positioned to connect to the strain gauge or gauge array 740 that is being used for the analysis. When wired directly, the strain gauge or gauges 740 may be connected to 720 without adjustable probes.

In one embodiment, a profiling system 750 is provided. In this embodiment, a position sensor such as a linear variable differential transformer 755 may be used to trace or map the surface of the test piece, coupon or sample and this mapping information recorded for subsequent use by the computer in the course of analysis. By way of example, mechanical features or differences in the profile may be used in conjunction with residual stress changes or differences to determine the effects of geometry on critical parts. A display 760 and a keyboard 765 may be provided for user interface needs. Pointing devices such as a mouse or a trackball as well as specialty interface components such as a joystick, touchscreen or haptic controller may also be provided according to the custom needs of a particular application.

Figure 7B:
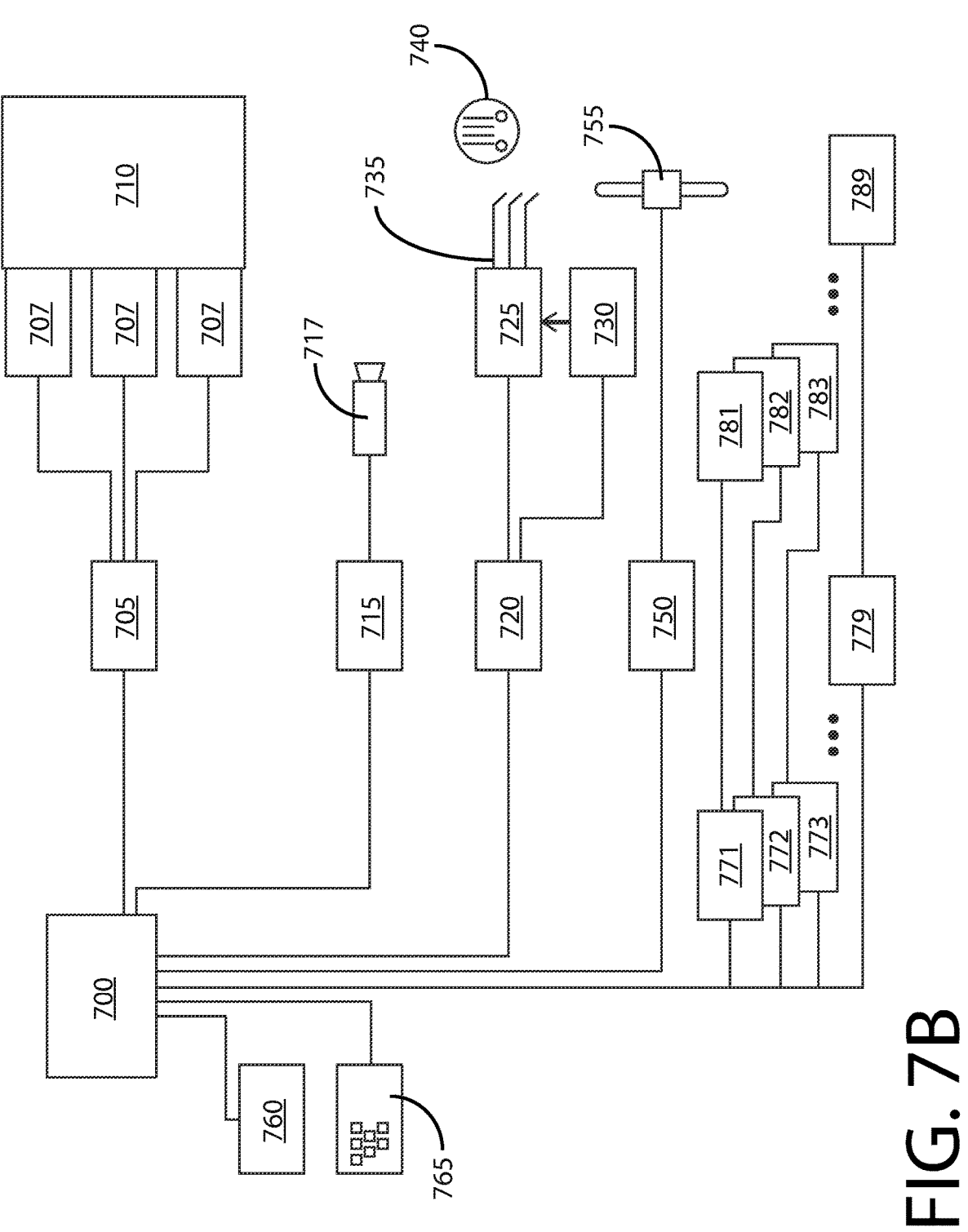
FIG. 7B illustrates how a basic machine may be augmented with multiple machining heads.

In addition to basic control of position and sensing components, control of cutting or machining elements is also directly controlled by the computer 700. In some embodiments as shown in FIG. 7B there may be one or more machining heads fitted and a matching interface controller 771, 772, 773 . . . 779 provided for each machining head 781, 782, 783 . . . 789. In this way the controllers manage the power needs of each type of machining head so that the system is easily adaptable and configurable. Power distribution is provided so that an adequate supply is available to each aspect of the machine or appliance.

Although a general purpose computing platform such as a laptop or desktop machine may be used, application specific computers offer the ability to completely customize and optimize the appliance. In one embodiment, the computer control, measurement and processing is performed in an embedded single card computer using external connections for display monitor and user interface elements. Computer software or firmware determines how user information is input and how it is used to control aspects of the appliance itself.

Figure 8:
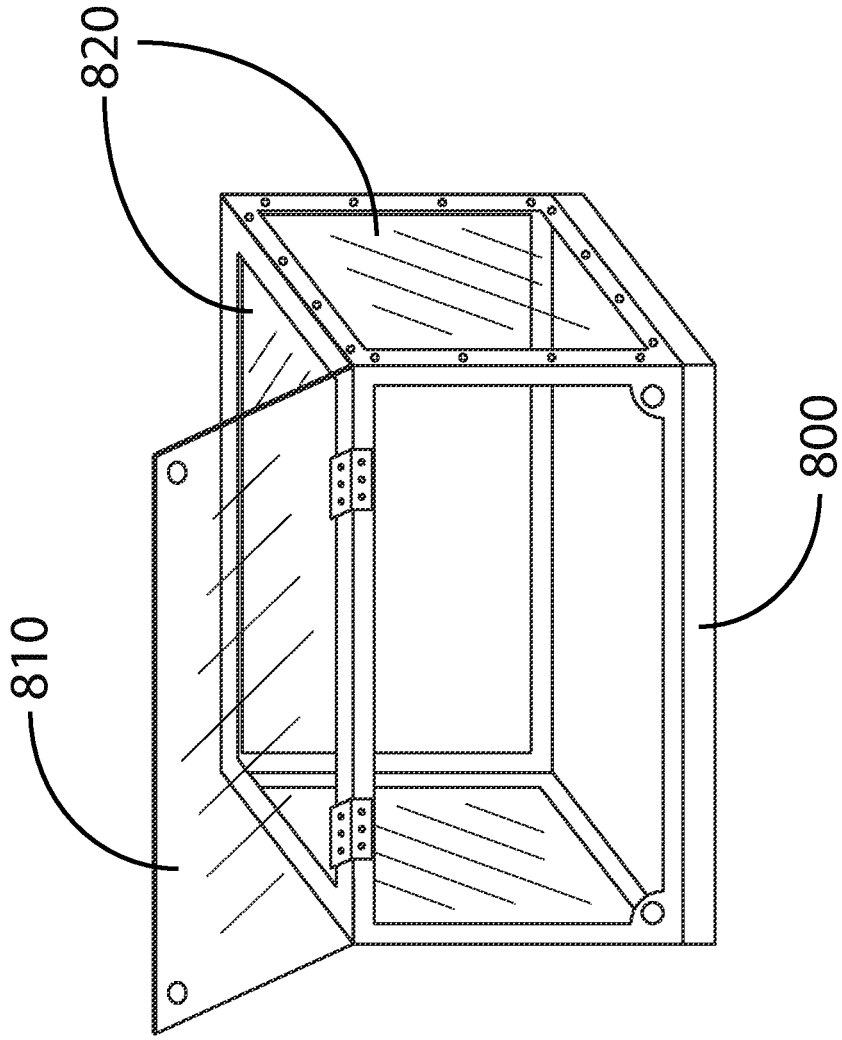
FIG. 8 illustrates a typical protective enclosure for the machine.

In another aspect of the appliance, an enclosure can be provided to protect the system from difficult or dirty working conditions. In addition, the enclosure provides a safety barrier for the user and personnel in the vicinity of the appliance. FIG. 8 illustrates a typical enclosure. The enclosure frame 800 provides the basic strength for the enclosure. One or more doors 810 facilitate access to the appliance. In one embodiment, translucent polycarbonate sheets 820 are used for the walls of the enclosure, but these may be replaced by opaque metal walls. The enclosure typically splits into two or three major parts for portable use in the field so that access to the appliance is facilitated, but for fixed use in a laboratory environment this demount-ability may be less important. The enclosure being modular allows for the design to be easily modified to accommodate large structures which might otherwise not be convenient.

In some embodiments, some of the walls 820 are made from heavily tinted translucent materials so that when a laser machining head is in use, accidental exposure to reflected laser energy is eliminated. Especially, the choice of materials should be considerate of the light frequency of the high powered cutting laser that is often not easily visible since it may be in the violet or ultra-violet region of the spectrum, and care taken not to confuse this with the less dangerous spotting or targeting laser which is often a low powered element with a frequency in the visible optical spectrum.

Many modifications and enhancements to the above described embodiments are possible and are contemplated within the scope and spirit of the present invention. For example, methods and apparatus will now be described which facilitate automated residual stress measurement in a material sample located within a pipe or channel, either in a laboratory or on-site, without requiring the material to be relocated to another facility. In particular, processes and measurements are described where access is limited and the region of interest may be other than flat.

Figure 9:
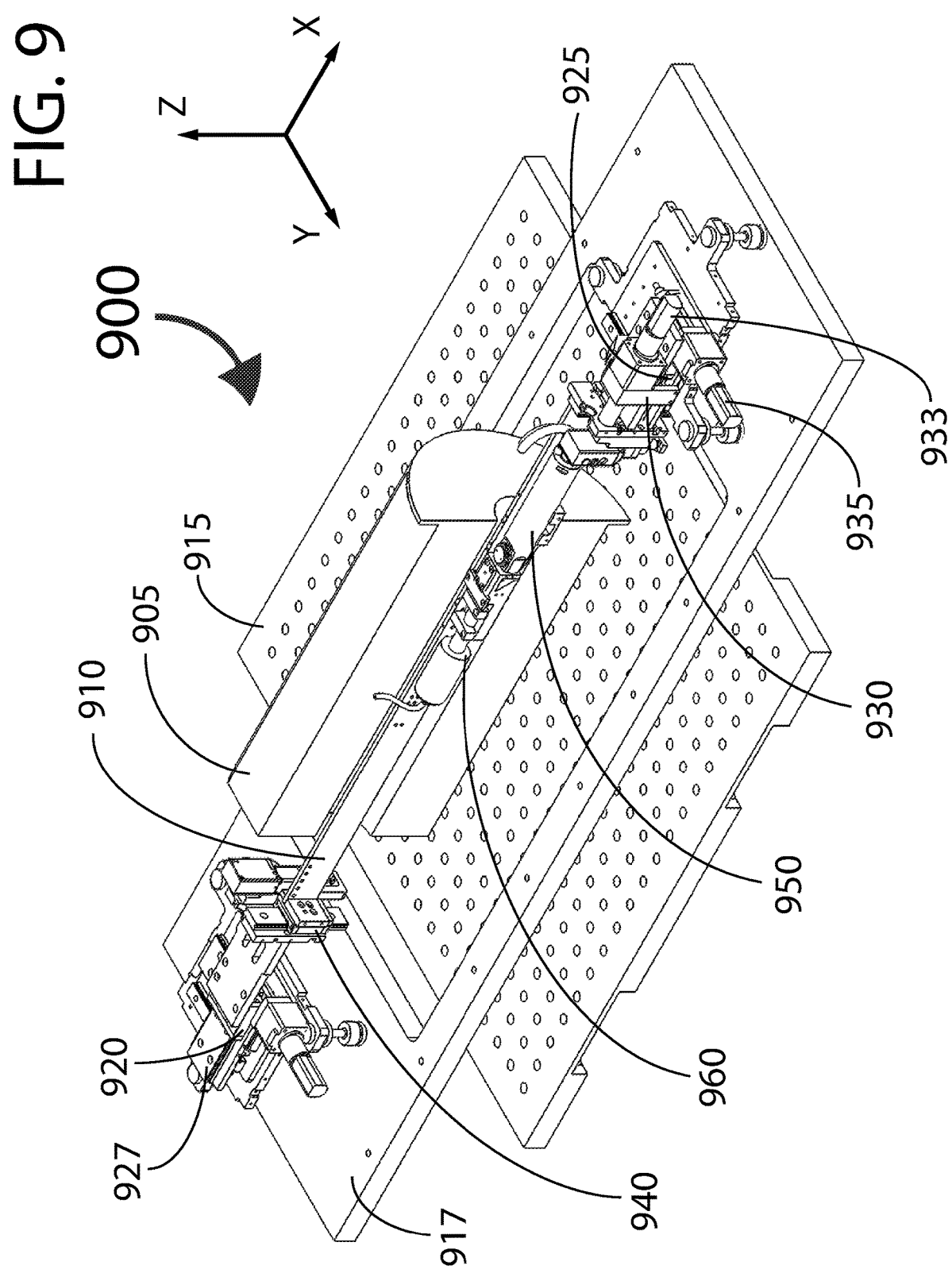
FIG. 9 shows an isometric view of the appliance with a sectioned part for machining.

Referring briefly to FIG. 9, two motion platforms are shown attached at either end of a support beam 910 that lies within a channel in a part 905 to be tested, a section of a pipe which the figure shows as a cutaway so as to reveal the positioning of the support beam and attached elements. Upon the support beam 910 is located a machining system that will be used to make cuts in the material of the part to be tested and also an imaging system that permits optical measurements to be made. It should be evident from this figure that access is potentially very limited depending upon the channel area and distance from the ends and so a strain gauge method may be unsuitable. Motion of the beam may be in any or all of the three axes that have been described; here these are three, mutually orthogonal axes that can be independently actuated. One or more locales may be selected at which measurements are to be made. In the case where strain gauges are to be used, after cleaning and attaching a strain gauge or strain gauge array to one or more measurement locales, appropriate to the measurements intended, the one or more strain gauges or arrays may be connected to a measurement device which allows the starting strain to be recorded. Because a newly applied strain gauge is not yet displaced from its starting value of resistance, this is effectively the zero point from which subsequent measurements may be referenced.

In one embodiment, the strain gauge may be coupled to an analog to digital converter so that the measured data may be recorded as a machine readable file and used subsequent to the completion of any of one or more machining processes to yield a set of associated strains. The residual stress condition of the material may be calculated corresponding to each of the one or more machining steps and the results presented in numerical or graphical form. When attachment of a strain gauge system is impractical or inconvenient, optical technologies are used to make strain measurements. In this case, after cleaning, the surface features are identified using a high-quality camera and lens assembly as well as a light source that is alterable so that features may be appropriately discerned.

Accuracy in the process requires that the location of the measurement area relative to the cut or cuts that are to be taken from the material be known and so a very light cut may be taken initially to mark the point from which measurements may be made. Generally, this first light cut may barely remove some of the surface roughness without touching the bulk material and so has minimal effect, if any, on the stress condition of the material of the part under test. In one embodiment the process relies entirely upon the optical system to determine position; in a second embodiment, position sensors are used to define the position of the cutting tool relative to a starting point. In the simplest case, once the cutting tool is in position, a hole is drilled by a succession of light cuts into the material of the part under test. The process may be interrupted at any point so that the strain condition of the part local to the machined feature can be assessed.

In some embodiments, a small slot may be cut into the surface of the material. This slot may have a predetermined form and be cut normal to the surface at the point of the feature. The plane of the slot is, preferably, aligned orthogonally to the sensitive direction of the strain gauge when a single gauge is used, but when a rosette array is used this is a lesser concern because the trigonometric relationship between the gauges that comprise the rosette is known and so the strain information may be discerned using that relationship. When an optical system is used, the alignment problem is less onerous because displacement or strain is measurable in all directions and does not require the resolution of components of movement in the same way as a strain gauge solution.

In areas of significant curvature, the machined feature may be angularly offset by a small amount according to compensation rules, if any, that an inspector assigns to the analysis. Especially in a pipe or channel, although the long axis of the pipe or channel permits a cut not dissimilar to a cut on a plane surface, an annular cut requires circumferential motion of the cutting tool in addition, which requires exceptional accuracy in placing a rotational axis of the machine tool relative to the longitudinal axis of the pipe or channel, or else any offset must be measured and a compensation plan developed prior to starting to cut to ensure adequate depth control of the feature.

The optical image used to perform measurements must also be compensated in a like fashion so that if the axis of rotation is not simply offset, but lacks parallelism, this too may be compensated during the measurement phase. In some embodiments the appliance has no rotational axis, but relies upon the fine definition of the three dimensional rectilinear positioning system to make cuts in a region of high curvature. In other embodiment, the support beam is attached to a rotating mechanism that allows the tool and imaging system to be moved circumferentially to aid in cutting areas of high curvature.

The apparatus comprises a pair of linear slides at each end of the support beam 910, mounted to a base plate 917 resting on a more substantial work table 915 upon which the part 905 containing the internal channel or pipe is mounted and that may be accurately positioned relative to the location of a strain gauge or optical feature in the channel that will be used to measure strain. The first of the pair of slides 920 and 925 may be moved with high accuracy relative to the base plate along the direction of the slide ideally parallel with the longitudinal axis of the part to be machined. This positioning may be done, preferably, using a linear actuator at each slide, though other methods that are known to those having ordinary skill in the art may be employed. The slide 940 and its twin on the other end of the beam controls movement of the beam along the z-axis and moves the cutting tool closer to or further from the surface to be machined and positioning control may be automated so as to relieve the operator of excessive burden during the cutting process.

A high speed motor 950 is mounted to a beam that passes through the pipe or channel and which is attached at either end to the slide assemblies so that its position, relative to the slides, which preferably move parallel to at least one plane locally tangent to the work surface, is fixed. A cutting tool is coupled to the motor spindle, the tool being selected to cut the sample material appropriately. The motor mounting on the supporting beam is preferably fixed in one of several pre-determined positions to minimize play. Thus the cut width may be set by choosing the diameter of the cutting tool and the depth of cut set by advancing the vertical slides upon which the beam supporting the high speed motor is mounted. The pair of slides which are attached to the base plate may be moved and, in this way, a linear slot of predetermined width and alterable depth and length may be cut into the material so that the residual stress present in the neighborhood of the gauge or gauge array is interrupted from the residual stress in the bulk material.

By adding a third slide that moves in the same plane as the base plate, the y-axis, and coupling the vertical slide of the motor support beam to this, instead of the first slide that moves along the x-axis, the cutting tool may be moved in three dimensions and, provided the actuation steps are small enough, a slot having a complex profile may be cut without significant penalty to the accuracy of the strain measurement.

In some embodiments, the vertical z-axis slide is coupled to the x-axis slide which is coupled to the y-axis slide; this slide arrangement can be configured in whatever order best suits the task at hand and is preferably arranged to reduce as much un-necessary cantilever load as possible to minimize play in the system and wear on the precision slides; typically the z-axis slide is supported by the other two so as to minimize un-necessary load on the z-axis slide. In another embodiment, a strain gauge is mounted and a circular or annular slot is cut so that the resulting island upon which the strain gauge array is now mounted is isolated from the bulk material. In yet another embodiment, light indexing cuts are made on the surface to create reference points that can be used by an optical strain measuring system and the annulus cut around this prepared region. When a laser cutting attachment is in use, laser scribing is preferred to create the reference points or markings since this is practical on materials of any hardness and does not create wear on a mechanical cutting tool.

Although a simple support beam can be used, it should be understood that stiffness of the support beam is essential to ensure good quality machining. Accordingly a stiffened beam is preferred. A T-shaped beam provides an improvement and a Z-shaped version is better. If an I-shaped beam is preferred it is important to ensure that the cutting tool and optical system are not affected unduly. Machined slots or holes may be required to clear the tool and provide a sight line for the imaging system. In practice a series of holes or slots may be required to allow for flexibility in the mounting positions for these elements of the system. When the support beam is of significant length, a twisting moment may be present from the action of a mechanical cutting tool in some circumstances and an unhelpful resonance will prevent accurate machining. In this case, a rectangular tube can be used as the support beam for its improved stiffness in twist and one external surface used to mount the system components.

Referring to both FIG. 2A and FIG. 13, in some embodiments, an optional laser cutting module 1320 can be operatively coupled to mounting assembly 225 as described in detail below. Optional laser cutting module 1320 does not create a mechanical vibration and so laser machining can be accomplished so as to reduce the work demanded of a mechanical cutter where possible, leaving only the precision finishing of any cut feature to the mechanical tool.

To facilitate accurate positioning, an optical system can be used. In one embodiment a camera 960 with an appropriate lens system is located so that its viewing axis is in the plane of the cutting spindle and approximately parallel with the spindle. In this way, the distance offset between a point defined by an optical graticule attached to the camera and the center of the cutting tool may be determined and this offset calibration factor applied to the control electronics so that once a point is located, then the tool may be moved to the same point so that a cut may be performed based on that reference. Simple geometry and trigonometry may be used to compensate for misalignment errors using a test coupon to make this determination. These compensation factors may then be stored and subsequently applied to the measurements made on the part under test.

If an optional laser cutting module 1320 is installed, it is helpful if this can be adjusted so that the laser cut is as parallel as reasonably practical to the mechanical cutting axis. The relatively small distances that the laser is required to cut into the component under test and the fact that this laser cut will be enlarged by the mechanical machining apparatus means that a small deviation from being exactly parallel will not be a critical factor in most applications.

In yet another embodiment, a fiber optic component is used so that the camera element may be remotely located. Modern camera components are highly miniaturized and, provided that the viewing lens is protected or shrouded from metal debris that results from the cutting action of the tool, may be located close to the cut axis. A second camera may be accommodated so that the cut may be monitored live at the time of cutting; this is preferable to complexity resulting from having to switch the optical path using mirrors or other systems and aids the placement of views if the desired viewing features exceed the viewing field of the system.

Some embodiments incorporate a profiling tool that allows the machine to develop an accurate profile of the part to be machined so that the machining features may be complex and not limited to simple cuts in the z-axis. For reference, the x-axis and y-axis are defined to be in the plane of the base plate of the machine and the z-axis is that axis orthogonal to that plane. It should be evident that the use of Cartesian (x, y, z) coordinates are purely for ease of description and circular (r, θ, φ) coordinates may also be used.

Referring again to FIG. 9, the appliance 900 is shown with the machining tool support beam 910 inserted through a test part 905; this latter is shown sectioned so as to expose the internal detail of the appliance. The support beam or bar 910 is secured at both ends to slide assemblies 920 and 925 which in this figure enable movement in the x-axis along the longitudinal axis of the tube or channel that lies within the part under test 905 and the y-axis that moves the support beam 910 radially within the tube or channel approximately parallel to the base plate of the work table 915 to which may be secured the base plate of the appliance 917. The support beam can also be moved vertically in the z-axis by a vertical slide 940 at each end that allows accurate control of the cutting depth. Movement in the y-axis is controlled by a motor 935 and in the x-axis by motor 933. The mount 930 for the x-axis motor 933 is shown for illustration. The component or part under test 905 must be secured relative to the appliance 900 and this may require fixtures and fittings such as clamps and screws which will be specific to the part under test and are therefore not shown in this figure to avoid unnecessary detail. The cutting tool itself is normally secured to the cutting motor using a collet assembly so that it can be changed or replaced easily. Thus the support beam can be moved so as to position the cutting tool in a way that allows the intended cut feature to be created.

The laser cutting module 1320 can be located on the opposite side of the support beam 910 from the mechanical cutting elements to minimize the traverse distances required for multiple cutting systems. Camera 960 can be used to locate features or marks made by the laser cutting module using exactly the same procedure used for determining the relative offset for the mechanical cutting tool and does not need to be duplicated. In general, except for locating the aiming point for the laser cut which may be done in cooperation with the appliance operator observing the visible spotting laser point, the laser cutting action does not need to be monitored live for there is no mechanical debris that may affect the cutting process, and it is a simple task to cut for a given period, pause the cutting action of the laser and re-position the camera viewing point to observe the progress of the cut before returning the laser tool to continue the cut. If live observation is desired, a changeable filter may be attached to the viewing component so as to protect the camera sensor from damage by the high intensity cutting laser beam.

The illustration of FIG. 9 shows that the x-axis slide 927 is free moving and the drive along this axis can be provided only from one end by motor 933. This reduces the cost and the mass of the assembly. In an alternative embodiment the drive may be provided from both ends but requires that the two drive control systems be carefully synchronized or else one of the motors be disengaged while the other is in use. By making sure that the drive along the x-axis is always done with one end of the support beam unconstrained, compressive forces which may induce buckling or distortion are avoided; beam forces along the length of the beam are comparatively small, being comprised of frictional effects in the slides at the proximate and distant ends and the resolution of cutting forces that are deliberately kept small.

Secured to the support bar or beam 910 are two or more subsystems. The cutting drive motor assembly 950 includes a transmission system that, if required, alters the direction and/or speed through which the driving force that is used for the cutting tool is applied. The transmission or gearbox is arranged so that the output shaft to which the cutting tool is coupled is equipped with a cutting tool securing device, such as a collet, as well as provision for handling the loads generated while cutting. A bearing arrangement allows for side-loading as well as end-loading and is preferably a sealed assembly that is permanently lubricated to reduce wear on the gearing that allows the change in direction and/or speed from the motor rotation to the rotation of the cutting tool.

A second subsystem is a camera 960 coupled to an optical system that permits the acquisition of images from the surface or surfaces to be machined. In some embodiments a lighting system separate from that provided as an integrated part of the camera system is used. Piping or ducting may also be provided to permit air flow to be steered to remove debris from the cutting process as well as to minimize the impact of such debris upon the optical system. Included in the debris from any of the cutting processes may be vaporized material from the cutting action of the laser and the possibility that this vapor will condense and potentially obstruct the extraction passages should be borne in mind and changeable filtration elements may be included to mitigate this effect.

In some embodiments, optical fibers are positioned on the support bar or beam 910 to allow illumination and/or image transport. In a further embodiment, a second camera and any required optical system is provided to allow additional information to be gathered. In yet another embodiment, position sensors such as Linear Variable Differential Transformers, LVDTs, or Time of Flight laser based transducers are secured to the beam so as to allow for precision in locating the beam so that its travel along the x-axis is locally parallel to the surface to be cut in the neighborhood of the cutting tool. The advantage of precision measurement of position rather than a reliance solely upon the open-loop accuracy of the drive motors is that in the case of a long beam, the corrections for distortion due to uneven heating or the load distribution along the beam will not now require predetermined correction but will be able to be done at the point of the operation. The use of z-axis drives at the ends of the support beam permit the adjustment of the beam so that it is locally parallel to the surface that is to be cut. Further, the addition of vibration sensors to the beam 910 permit the cutting speed to be altered to avoid unintended resonances.

Figure 10:
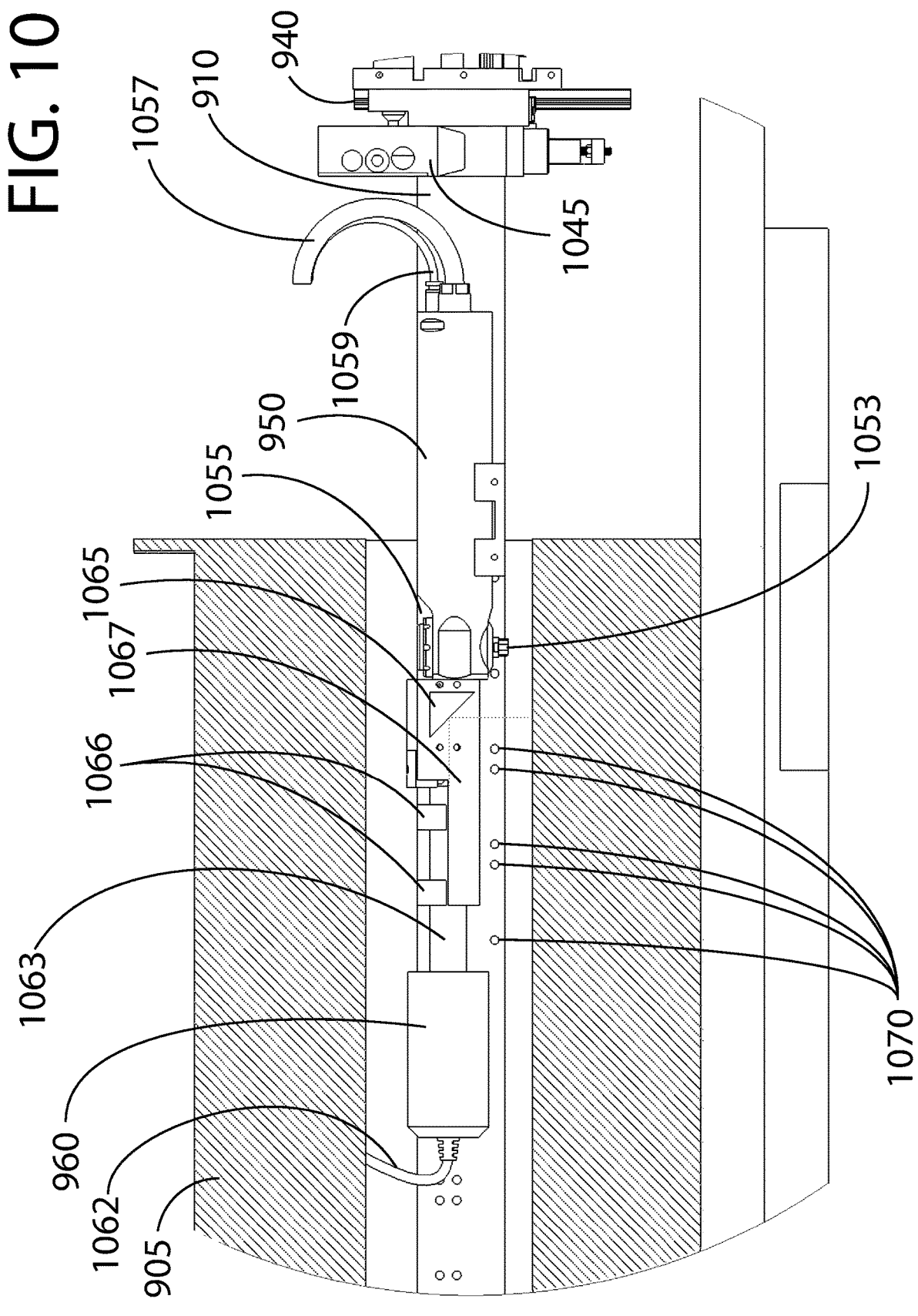
FIG. 10 illustrates a side view of the beam assembly in the neighborhood of the camera and cutting sub-system in accordance with the present invention.

FIG. 10 illustrates an enlarged part of FIG. 9 so as to show inside view some of the detail of the machining systems that are secured to the support beam 910. The support beam is attached to the vertical slide 940 that enables motion along the z-axis driven by a motor assembly 1045. In a fixed system this controls the height of the support beam 910 to which the cutting tool (not shown) is coupled by a collet assembly 1053 that secures the tool to the output shaft of a gearbox or transmission 1055 located at the drive output end of the motor 950. The support beam 910 is attached to a controlled vertical slide at both ends of the support beam to allow it to be positioned accurately in the z-direction so that the cutting action is always orthogonal to the surface at the point of the cut.

The location of the machining sub-assembly components as well as the imaging system is normally defined by the part that is under test 905 since this is the part that is to be machined and the machining location may be at one or more different points within the channel or passage within the part. Because the linear slides that define the motion axes are of limited travel, a characteristic of precision slides manufactured to an economical profile, provision must be made so that the combination of the position of the components along the beam coupled with the travel capability of the slides allows any of the intended points of machining to be accessed without having to relocate the part under test 905 which may be exceptionally massive and unwieldy. Locating holes 1070 may be provided at predetermined positions along the beam that can engage with locating dowels or screwed fixtures to permit accurate, reliable attachment of the component parts in the overall appliance. Thus, once the position to be machined has been identified, the reach of the appliance is determined and the suitable location points can be identified and the machining tool drive assembly comprising the motor 950, its gearbox 1055 and the cutting tool inserted and secured using the collet 1053 can be attached. Power for the motor 950 is delivered using a cable 1057 while air, which is used to cool the motor as well as to clear machining debris from the feature being cut, is provided through hose 1059.

The laser cutting module 1320 of FIG. 13, described in greater detail below, can be attached either to the existing structure so that the cutting point of the laser is aligned with the x-axis and in the plane of the mechanical cutting tool, which cases some applications, or else may be attached to the opposite side of the support beam so that the cutting axis is parallel to the mechanical cutting tool in the plane of the y-axis. In one embodiment, the motion platform is used only to position the central position of the laser module and the laser module itself uses gimbaled mirror and lens assemblies to move the beam in the area to be cut. Although it is not critical that the two cutting tools be aligned precisely in this way, a minor reduction in system motion may be achieved. It should be noted that an orbital cutting action is preferred for both cutting means as a way of casing debris removal, and this may be applied equally to other cutting techniques such as air abrasion or electric discharge machining if desired. Power for the laser cutting module is supplied through a cable in the same way as for the motor 950.

In some embodiments, an imaging system is used to verify the location accuracy of the feature to be machined. The parent application, application Ser. No. 16/201,994 which is herein incorporated in its entirety, describes in detail how this is done when the camera and lens system can be installed vertically. The current invention is unable to accommodate structures or components of extensive height, due to the restrictions inherent in many internal passage structures. Therefore, this invention makes use of optical components to alter the view direction. A camera 960, powered by cable 1062 is fitted with a lens system 1063 that focuses the image being viewed. The figure shows the lens assembly and camera secured by clamps 1066 to a mounting cradle 1067 that is fitted with a reflector, shown here as a prism 1065 having a front-silvered surface, that yields a 90° deflection of the viewing beam. The mounting cradle is secured to the support beam upon which the machining sub-system is mounted. The distance between the cutting tool mounted in the collet 1053 and the center of the image seen by the camera 960 can be accurately determined and so the position of the feature to be cut into the part under test can be accurately located relative to any other feature in the plane of the cut within the channel. Similarly, the laser cut may be accurately located using the spotting laser that is provided coaxially with the cutting laser beam. Depending upon the capability of the optical system, it may not be possible to view both the measurement reference points and the cutting tool simultaneously in a single image. To avoid the complexity of switching the optical path or repeated repositioning of the machine, supplementary camera systems may be provided that permit simultaneous viewing of aspects of the machining process and results.

The drive motors which control each of the slides with which the appliance is equipped, are preferably linear actuators and may assume any of a number of forms. Typically these will be stepper or servo-motors that turn a ball screw, or lead screw, which in turn drive the platforms that bear the movable parts of the machine along the respective axis. The drive motors are normally selected for their ability to develop high torque coupled with accurate positioning. In the case that the motor can be a stepper motor, an electronic controller delivers properly phased power to drive the motor at the defined speed and direction so that the support beam 910 may be positioned as required to place the selected cutting tool or imaging system appropriately.

Not shown in FIG. 10 are the motors that drive the machine in the x and y directions. Linear precision slides are used to allow parts to move relative to one another. Typically these may be supported on ball bearings so as to minimize sliding friction and to reduce the stiction, or static friction which is undesirable because it compromises accuracy of small displacements. Well lubricated gibs are often used where rigidity is needed in a slide and permit an adjustment point to take up any wear but are less necessary in a miniaturized appliance because the loads are generally quite small. In practice, this appliance when properly adjusted at the factory should require little if any additional maintenance beyond routine cleaning and lubrication.

Figure 11:
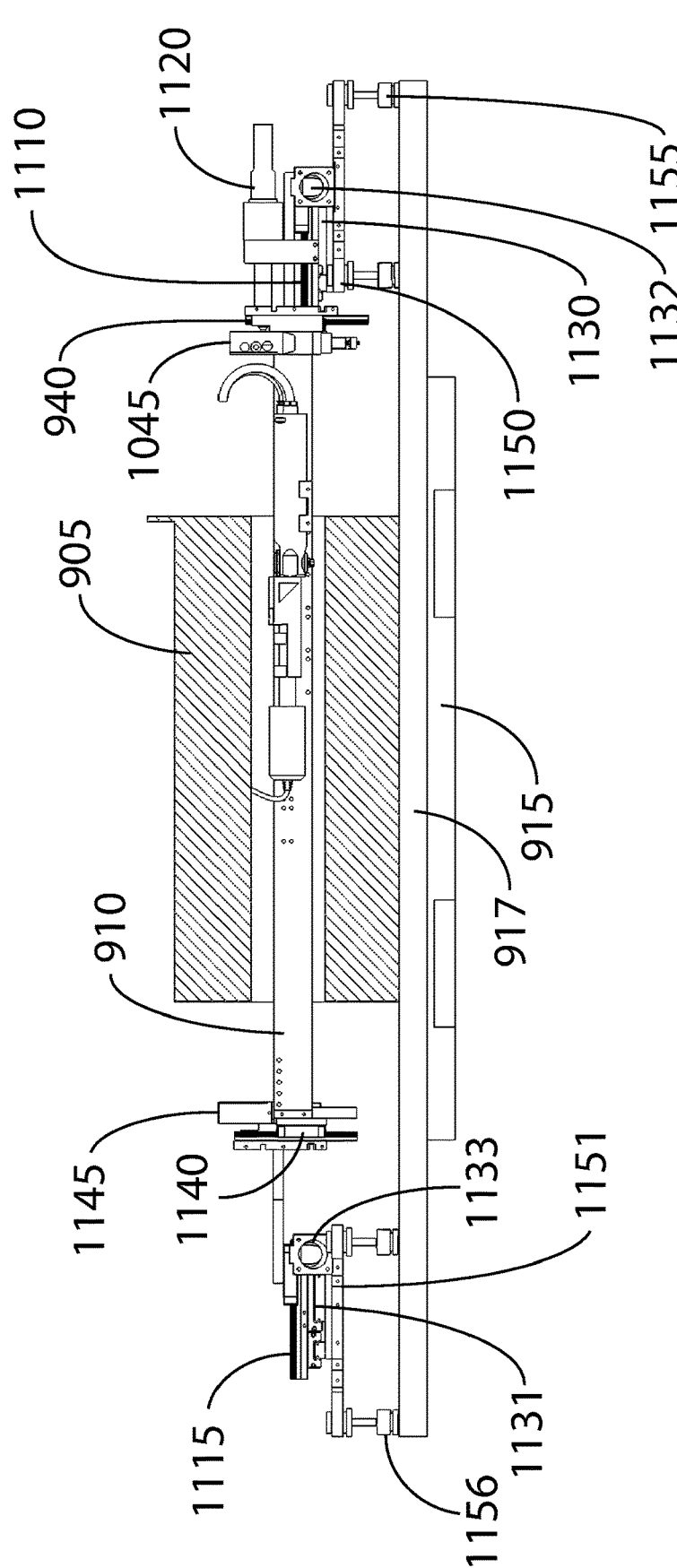
FIG. 11 illustrates a side view of the appliance showing the relative positions of the parts, where the part under test is sectioned for clarity and to show the internal view.

FIG. 11 shows the appliance in a side view. The workpiece 905, also referred to as the part or component under test, is shown as a sectioned part so that the construction of the appliance is more readily visible. The support beam 910 is shown with the attached machining sub-system and the imaging sub-system inserted into the part under test 905. The beam is fastened at either end to the vertical slides 940 and 1140 each driven by a motor and drive assembly 1045 and 1145. The vertical slides are each attached to a corresponding slide 1110 and 1115 that permits motion in the x-axis, the longitudinal axis of the support beam 910. In this embodiment, only slide 1110 is driven by a motor and drive assembly 1120, while slide 1115 is free to move. For short support beams this is perfectly adequate, but if a particularly long beam is being used, then it may be beneficial to restrain the free slide 1115 to maintain tension in the beam to manage vibration.

In some embodiments both slides 1110 and 1115 are driven with a motor and drive assembly. In other embodiments slide 1115 is fitted with a brake that allows tension to be developed in one direction and is released in the other. This limits the cutting only to tension-side strokes, but confers the benefit of better vibration control than when the beam is in compression or unloaded. The brake can be a mechanical brake or an electric/magnetic brake according to the application. If a spring is used to preload the axis, proper consideration should be given to the preload force which will increase with increasing displacement of the spring and which must be overcome by the positioning motors on the slide.

The x-axis slides are mounted on slides 1130 and 1131 and are driven respectively by motors and drive systems 1132 and 1133; for clarity, the y-axis represents movement into and out of the plane of the figure and is nominally parallel with the plane of the work table 915 and the mounting base 917 for the appliance. The three axis platforms 1150 and 1151 are each fitted with three adjustable feet 1155 and 1156 respectively so that the appliance can be leveled and adjusted.

In some embodiments, one or more laser pointers can be attached to one of the slide assemblies to aid in preliminary alignment of the system by ensuring that both sides are level so that the support beam is properly aligned. In use, the slide assembly of one side of the appliance is installed and the opposite side then adjusted until the laser spots line up with targets marked on the first side. Bubble levels are incorporated in the slide assembly base plates to allow the initial leveling of the individual slide assemblies. The support beam must, of course, be able to be positioned so that it lies within the channel in the workpiece 905 which, may be in any position. Adjustable fastenings are provided on the support beam or as additional components so that the required initial vertical position can be achieved. Because of the uncertain vibration characteristics of structures with significant overhang or offset, in one embodiment the mounting plates for the platform are provided with a range of heights in addition to having adjustable feet. These are then selected for any particular requirement and allow sufficient motion in the driven z-axis slide to perform the machining process on a wide range of parts under test.

The camera 960 is mounted so that its focal point is a defined distance from the machining location. The camera position offset from the machining point may be calibrated by machining a spot, lifting the cutting tool and then moving the beam 910 supporting the camera under manual control so that the image of the machined spot is centered in a graticule, which may be either a permanent part of the camera or lens assembly or else electronically generated. The difference between the starting position of the camera that corresponds to the machining position and the position where the machined aspect is centered in the camera visual field represents the camera offset. This offset may be stored as a computer constant and, when a feature is identified visually, the machine tool may be moved to the point by simply adding or subtracting this stored constant as appropriate. When more than one machining component is present, the offset of that component, relative to the camera, is stored as a calibration constant.

To protect the lens of the camera, and to improve contrast in the image, a lens hood or shroud may be fitted. If the feature being cut by a laser cutting module 1320 is being observed during cutting, a filter may be required to protect the image sensing element from accidental damage by exposure to reflected energy from the target being cut. Optionally a source of illumination may be collocated with the shroud or added externally. The light source may be monochromatic or polychromatic. By using light emitting diodes of various emitted colors in suitable combination, the image quality may be optimized. The reflecting element that rotates the optical path through 90° is subject to contamination so shrouding of this component, including the provision of an air blast to exclude droplets, condensates or particulates, is an aspect of some embodiments.

Returning to FIG. 10, for the mechanical cutting tool, a high speed motor 950 drives a cutting tool in collet 1053 is mounted to the support beam 910 along with a nominally 90° gearbox 1055. The gearbox may be integral with the high speed motor to reduce the number of parts and keep the mass as low as practical. The cutting tool is moved to the intended operating point and a programmed cut made according to the intended feature. The cutting depth is controlled by operation of the z-axis drive when the intended cut lies in the plane of the x-y axes. Preferably the spindle speed should be high; in one embodiment, this speed ranges from 10,000 to 100,000 rpm so that the optimal cutting rates may be achieved. In most applications a carbide tipped end-mill is sufficient to perform the machining actions; the cutting tool will usually be determined by the application and the material to be cut.

To avoid the need for coolant or lubricant at the point of cutting, very light cuts may be taken, in the neighborhood of a few ten-thousandths to a few thousandths of an inch (in one application the optimal cut is about 0.004 inches or approximately 100 µm) per cutting pass. This of course will mean that numerous passes will be required in order to achieve a reasonable depth to provide sufficiently accurate information. Working depths of approximately 5 mm are generally adequate to allow for the release and measurement of surface stresses for either a slot or a hole depth, though this may be determined by considering the material and other pertinent information.

At the high spindle speeds used in this appliance, significant currents are applied to the motor when under load. This results in heat being generated in the motor itself from both the $I^2R$ losses in the windings as well as eddy current or iron losses in the core. This heat, though not particularly injurious to the motor, presents a potential burn hazard for an operator, so the motor may be fitted with a shroud to which airflow is directed. This cooling air may be piped through a filter to remove any contaminants that may be present in the supplied air. If other than dry clean air is passed over the motor, then a residue may be trapped or deposited at the motor surface and may act as a thermal insulating barrier that would significantly increase the operating temperature of the motor and might cause accelerated failure. Typical contaminants from compressed air include water, oil and debris, all of which are best removed.

Although factory compressed air is often available, simple air pumps will also suffice in general but these too will contain dust and dirt particulates that may hamper successful operation. Because the air being used to cool the motor is being heated, it is important to consider the effects of this on the part under test; for massive parts this is usually not problematic but if the part under test is of light construction, then careful design of the exhaust shroud can ensure that the minimum amount of the part is exposed to this warm air blast. In one embodiment a plastic shroud limits the flow of heated exhaust air onto the part whilst channeling a part of the cooling airflow, piped to the motor inlet, to the cutting area to clear the debris produced during the cut.

When optional laser cutting module 1320 is in use, significant energy may be dissipated in the form of heat from the laser generating elements. Solid state lasers use semiconductor diodes and use may be made of the same compressed air flow as is used for cooling the electric motor in order to better dissipate the excess heat. A shroud may be fitted to the laser module as a means to allow connection for an air supply and to route the heated air away from the module and the workpiece as well as the molecular condensate that results from ablating the material being cut.

For larger channels where access is comparatively easy, strain gauge arrays are often simple and suitable but as the dimensions of the channel get reduced there comes a point where the installation of a strain gauge assembly becomes quite difficult, especially when the surface to be cut exhibits small radius of curvature. The addition of wiring to bring the signals to the measurement equipment complicates matters since limited access makes soldering difficult or unreliable. In this case, the preferred solution is to use an optical system and reliance on the natural roughness of the surface to provide unique, distinguishable reference points. Interferometry is an established technique well known to those skilled in the art. Modern, miniaturized optical devices make the provision of coherent illumination coupled with fine optics a practical and economical solution to making precision measurements in a small or confined space. Such components may form part of the imaging or camera system or may be included as additional components, secured as appropriate.

Accurate positioning of the support beam so as to position the cutting tool normal to the surface at the intended point for the feature that will be cut is relatively important and so, in addition to the equipment or sub-systems already described, a means of determining that the beam travels parallel to the local area of interest is needed. In one embodiment a linear variable differential transformer is fitted to the beam and the profile of the local area is measured.

Figures 12A, 12B:
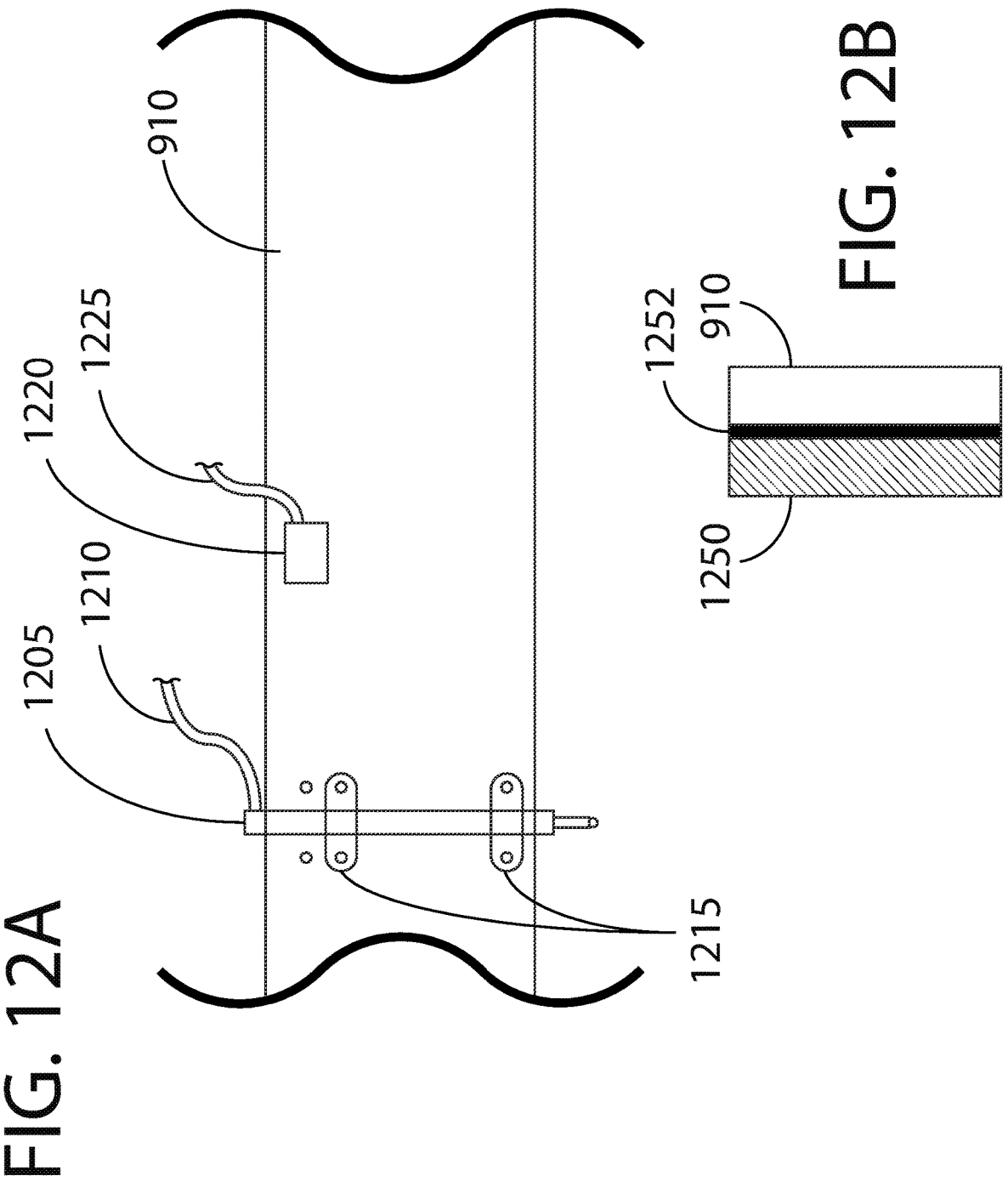
FIG. 12A shows how position and vibration sensors can be fitted.
FIG. 12B illustrates the attachment of a damping material.

FIG. 12A shows a typical LVDT 1205 secured to the beam 910 by clamps 1215. The LVDT sensor is coupled to the control electronics by cabling 1210. Ideally the sensor should be fairly close to the cutting tool location and in practice may be simply mounted on the opposite side of the beam from the tool itself. This does introduce some additional lower limit on the size of channel that can be treated because the offset introduced is a clearance factor. In use, the beam is lowered using the z-axis controls until the LVDT is in good contact with the surface to be machined. Then the beam is moved in the x-axis direction and profile of the surface is mapped relative to the beam position. The start and finish point for the profiling pass should include the region that has been designated for machining the feature for the test. If the profile shows increasing or decreasing distance of the surface to be machined from the proximate surface of the support beam, the support beam angle may be finely adjusted by altering either or both z-axis slide positions so that the average profile change along the profiling path approaches zero, which indication implies that the cutting tool will be approximately orthogonal to the surface.

In some embodiments, the imaging sub-system may be used to determine the flatness of the region by measuring the focus change over the selected region and then compensating by altering the z-axis slides so that the region remains in close focus along the predetermined path. In both cases a control system computer is able to perform these actions automatically and without requiring manual intervention. When automatic operation is selected, it is important that coarse alignment be completed so that no hard contact results from the system being grossly misaligned or else travel limited by being set to one extreme end of the z-axis slide travel. Interference contact between the apparatus and the component under test is undesirable and must be avoided. If the machine strikes the component under test, recalibration may be required or at very least the alignment must be checked.

The mechanical cutting process, though quite fine by normal standards, is a fairly violent action whereby cutting flutes on the cutting tool sequentially cut or tear the metal surface of the part under test. Although the support beam that carries the cutting and imaging apparatus is quite stiff, and relatively massive, it may be prone to vibration at certain frequencies. Because the beam may be quite long, the resonant frequency can be quite low. Because the resulting oscillations can cause uneven cuts as well as excessive pulsating side loads on the cutting tool, it is preferred if this is minimized. Accordingly, a vibration sensor 1220 is attached to the beam and coupled to the control electronics by cable 1225. The primary source of excitation of any resonant vibratory modes is the machining sub-system. The drive motor, its gearbox and the pulsating load from the cutting tool provide a source of excitation that may prove troublesome so by monitoring the vibration an indication of the condition is received by the control electronics. In one embodiment, a motor controller is used to adjust the cutting speed within a predetermined range so as to reduce the in-phase excitation and thus move the excitation forces out of the resonant range of the mechanical assembly.

FIG. 12B shows an example of another preventive method whereby the resonance effect is diminished. Here, a layer of rubber 1250 is bonded to the support beam on the opposite side from the machining and imaging components using a suitable adhesive 1252. Natural latex is quite durable and is dead-beat, meaning that it will simply absorb vibration energy rather than return it to the system so as to sustain vibration. In one embodiment using a closed rectangular form tube, a latex is used to fill the inner volume of the tube to limit vibration.

Figure 13:
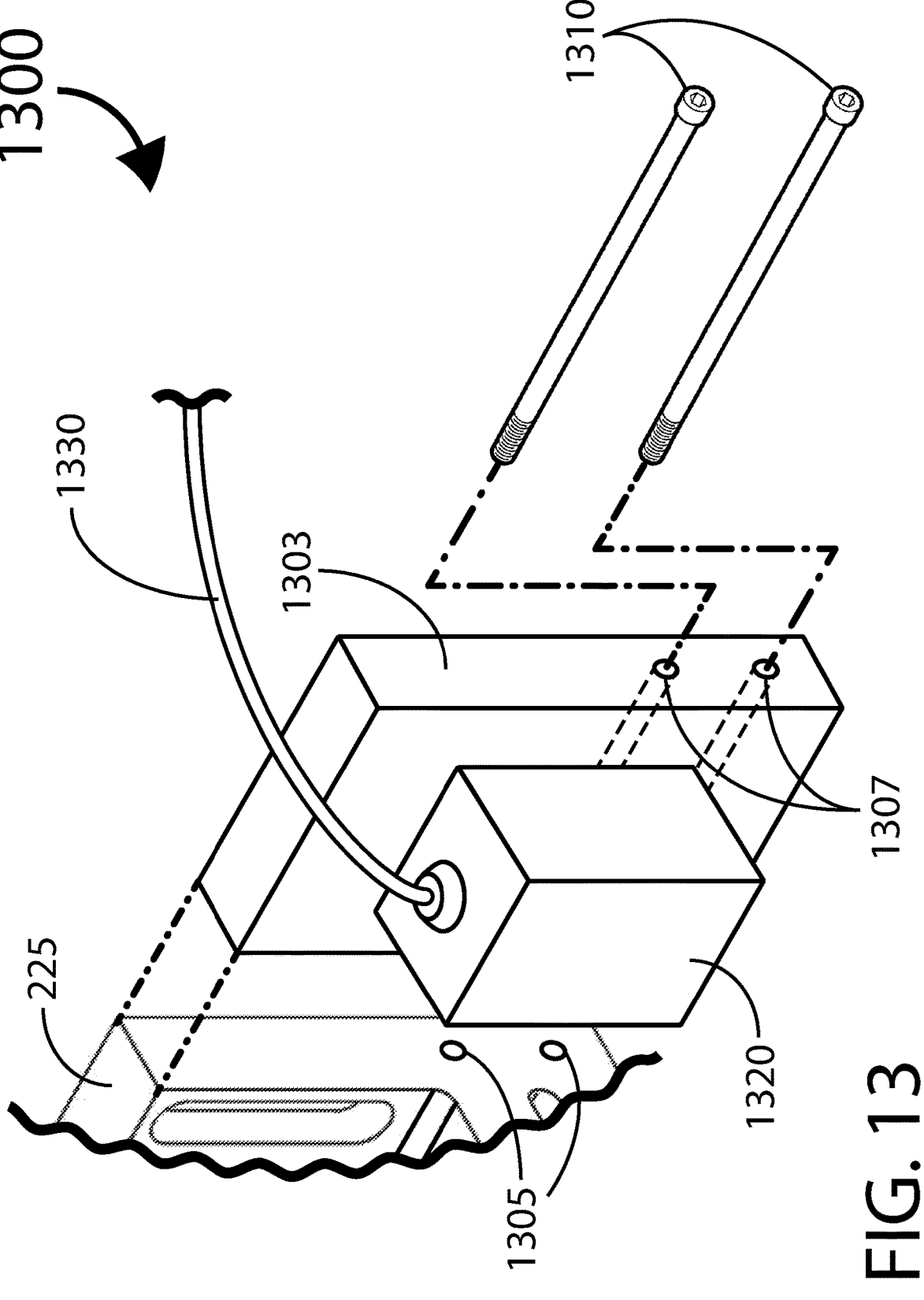
FIG. 13 shows a laser cutting module attached to the common platform that attaches both the camera and the cutting motor of FIG. 6 to the moving platform.

FIG. 13 shows a representative scheme for attaching optional laser cutting module 1320. A mounting block 1303 may be drilled 1307 to allow securing screws to be inserted through the block. Matching holes 1305 are drilled into the subassembly to which this block is to be attached and these holes are threaded to accept the mounting screws 1310. A laser cutting module 1320 is secured to the mounting block 1303 using the mounting points designated by the module manufacturer. Power for the laser cutting module 1320 is supplied through cable 1330, which cable may be secured using clamps to suitable attachment points on the appliance. In this exemplary drawing, the motor mount 225 is shown but any convenient mounting point depending only on the requirements of the cutting task to be undertaken may be used. In one embodiment, mounting block 1303 is fabricated from two plates, having a matched machined labyrinth through which cooling air may be ducted, connected together. In this way the block can be used as a heat sink for cooling the module without a direct blast of exhaust air, vented instead to a more convenient location. In another embodiment, a coolant fluid is used to fill the labyrinth and then routed to a heat exchanger radiator for improved cooling.

Figure 14:
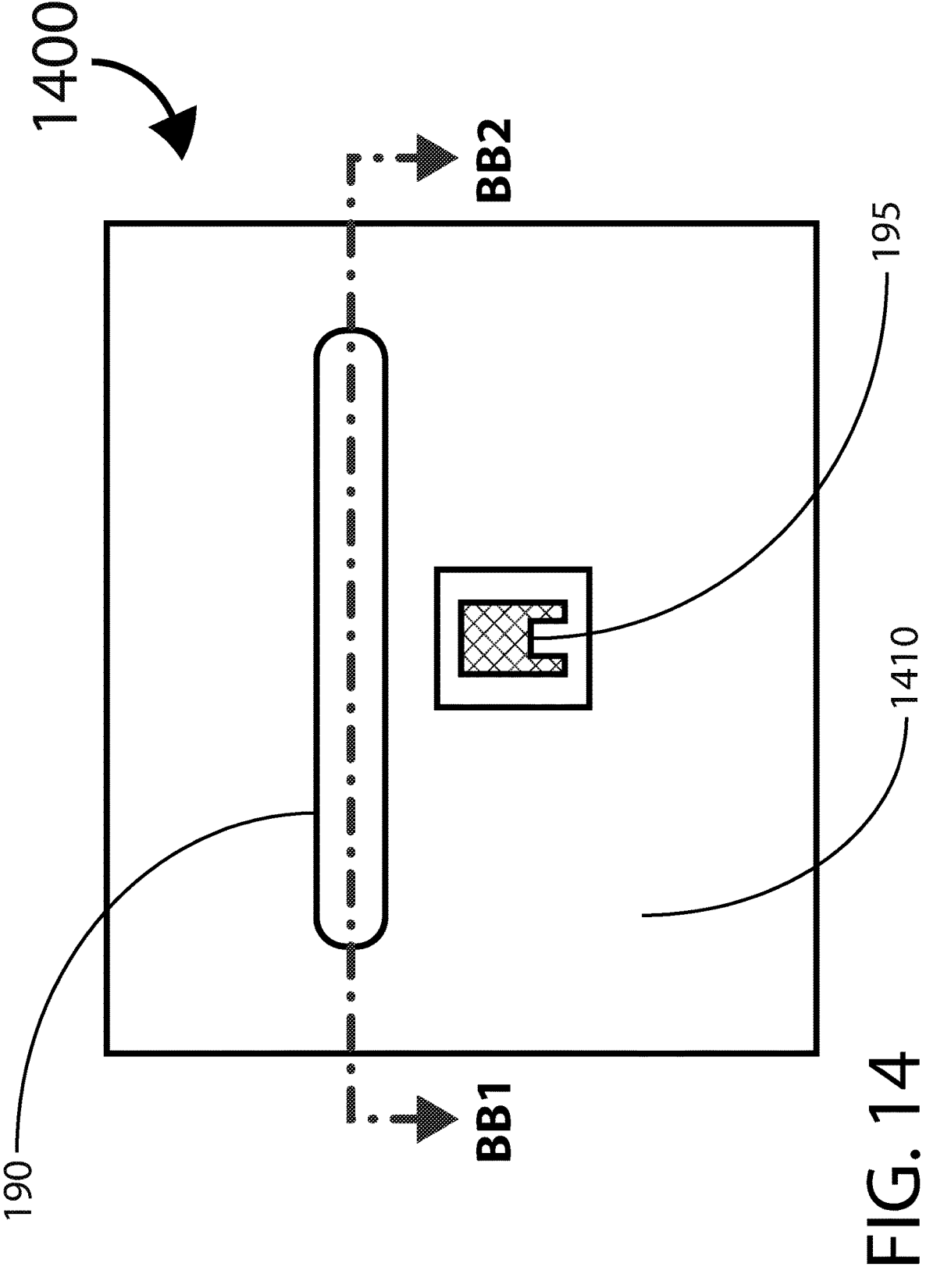
FIG. 14 is a plan view of FIG. 1F with a section line drawn for reference.

Turning now to FIG. 14, this shows a top plan view of part of the component under test 1400 as originally shown in the perspective view of FIG. 2A. A section line BB1-BB2 dissecting intended feature 190 lengthwise aids explanation of the sequential steps illustrated by cross-sectional views of FIGS. 15A-15E, prior to and during machining or cutting of feature 190 described in detail below. Initially the fragment of the component under test 1400 is shown as a flat plate and the slot depicted 190 is the intended finished feature to be cut.

Figure 15A:
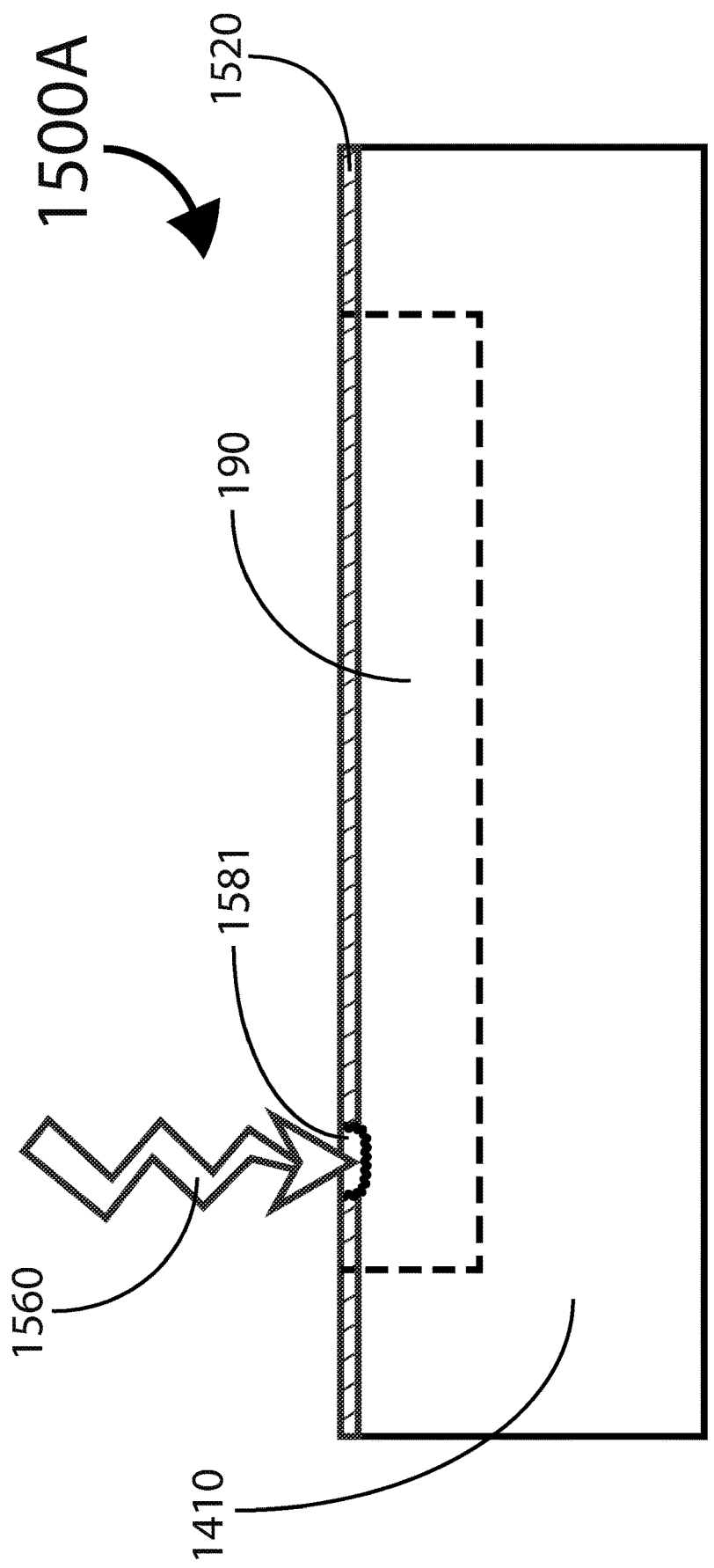
FIG. 15A is a cross-sectional view illustrating the initial cut made by a laser cutting tool through a hardened surface layer.

At FIG. 15A, the strain gauge 195 will not be visible at the section line. The bulk material 1410 of the sample 1500A is capped by the hardened surface layer 1520, which layer may be created by any of a number of processes such as, for example, shot peening, nitriding or carburizing. This hardened surface layer is intended to be very durable and resist wear in the intended application, such as turbine blades. The exceptionally hard surface is usually very difficult to penetrate using mechanical processes and, for stress analysis work, the extreme forces required to cut through this layer create additional stress which makes it very difficult to determine the original stress state of the sample. Chemical methods to etch the surface are messy and hard to control with any degree of precision and electrochemical methods such as discharge machining are not much better. The mitigation of added stress is offset by the poor definition and inconvenience of these messy processes.

A laser beam 1560 is used to ablate the material locally to a predefined starting point and the focal point of the laser is moved proximate to this starting point by moving the laser cutting module 1320 using the appliance's driven axes. Each pulse of the laser cutting beam ablates or evaporates a small amount of the material at its focus and as the laser cutting module moves along its defined path, a small, approximately circular region is slowly etched into the hardened surface with no externally applied stress to the part. The cutting action is continued until the hardened layer 1520 is penetrated and this leaves a small blind hole 1581 in the sample. The hole is relatively rough and may have a matte appearance because the laser beam is incapable of machining evenly and thus a flat bottom to the hole, to the accuracy desired for the task of stress relief, is impractical using a laser cutting tool alone. The lateral dimensions of the hole are only required to be slightly larger than the mechanical cutter which will be used to finish the cutting, so that the mechanical cutter does not have to be forced through the hard layer 1520, with its attendant induced stresses.

Figure 15B:
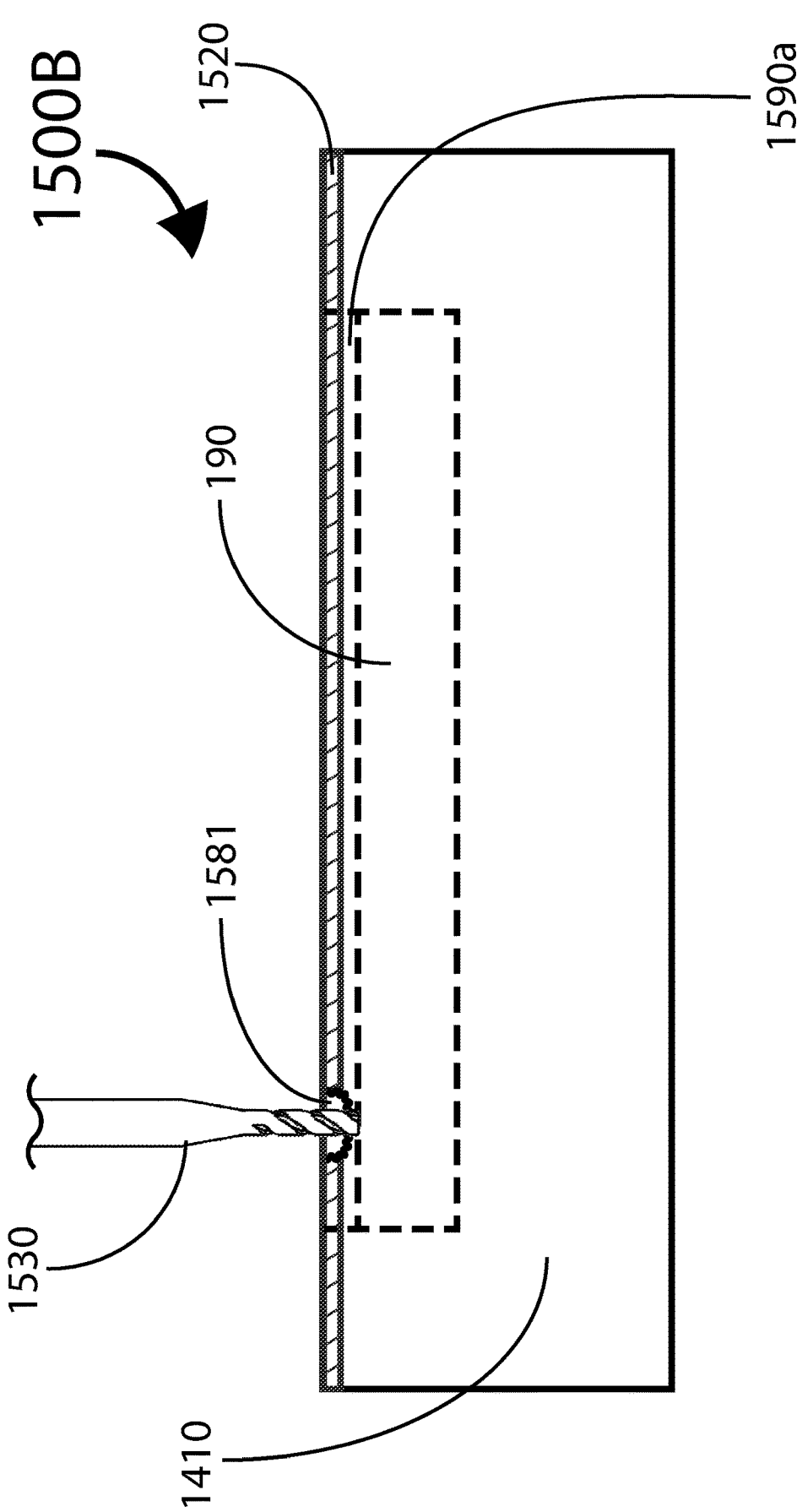
FIG. 15B shows a mechanical cutter being lowered into the region ablated by the laser cutting action.
Figure 15C:
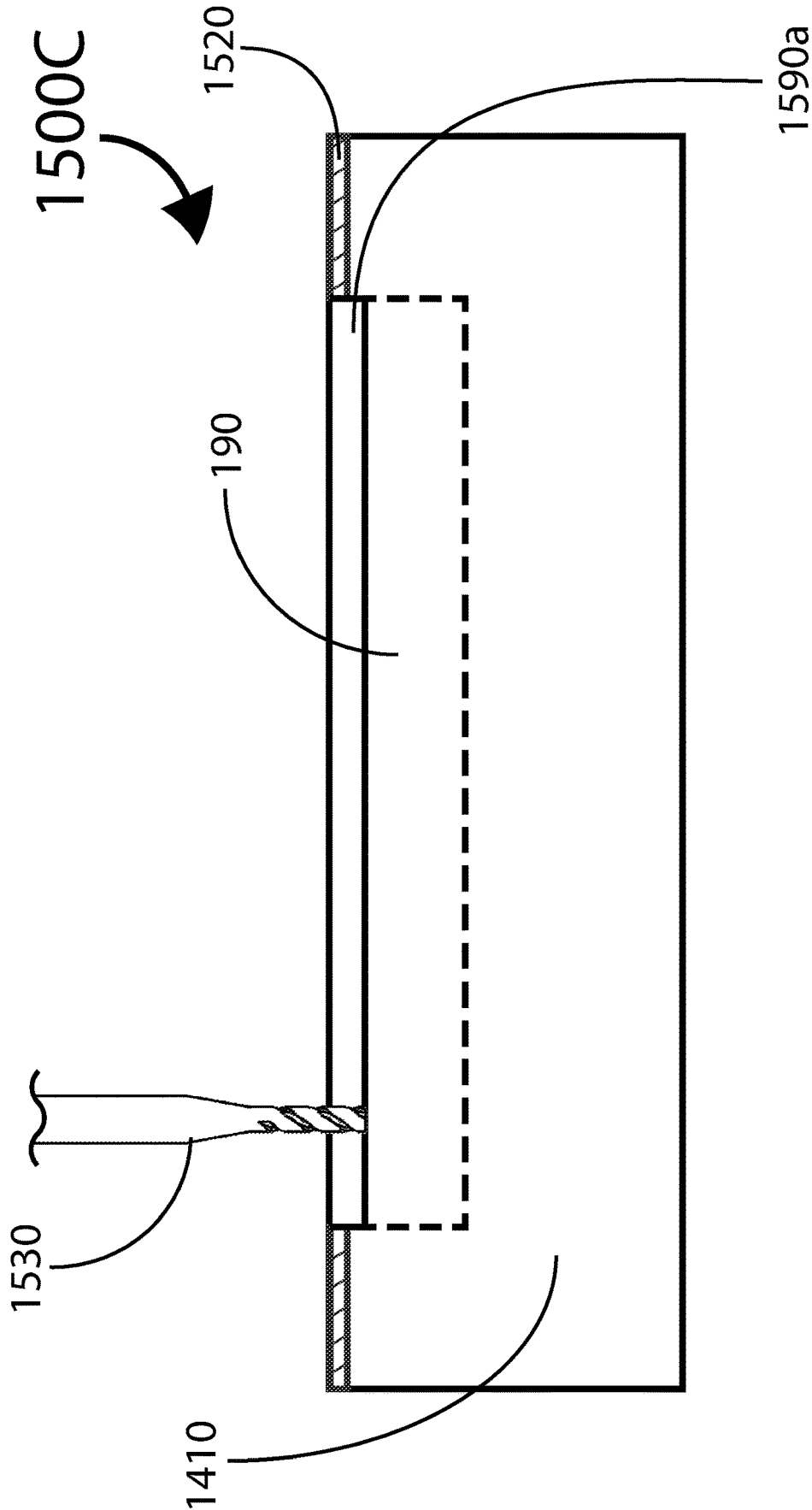
FIG. 15C illustrates the mechanical cutter plunged to a predetermined depth in the material below the hardened surface.

FIG. 15B shows the approach of a mechanical cutter 1530, which may be an end-mill, having the ability to cut at the tip, to the part machined sample 1500B orthogonal to the rotational axis of the cutter so as to allow the creation of a flat bottomed feature and also be able to cut on the sides of the cutter using its flutes. Cutter 1530 is plunged a predetermined distance into the base material 1410, which distance is chosen to minimize the stress applied by the tool to the component under test commensurate with acceptable wear on the tool itself. Once the plunge or drilling cut is taken, the cutter is then traversed along the feature path, tracing to and fro as it removes material being cut by its flutes. In one embodiment the cutter traces a linear cutting path and the depth of cut is increased incrementally once the feature has been cut at the predetermined level. This incremental cutting using small cuts at high tool speed is key to managing the applied stress to the component under test. In another embodiment, the cutter 1530 is moved orbitally and traversed along the path that defines the feature. The region to be cut to form the finished feature is shown by a dashed line that contains the material to be removed. The material to be removed 190 to form the feature is removed incrementally. The initial cutting pass will remove the material to form a slight trench or slot, i.e., cut 1590*a* (not depicted to scale). Note that this initial cut uses the flutes of the cutting tool to increasingly remove a portion of the hardened surface layer 1520 until eventually entering the softer base material 1410, as shown in FIG. 15C.

Figure 15D:
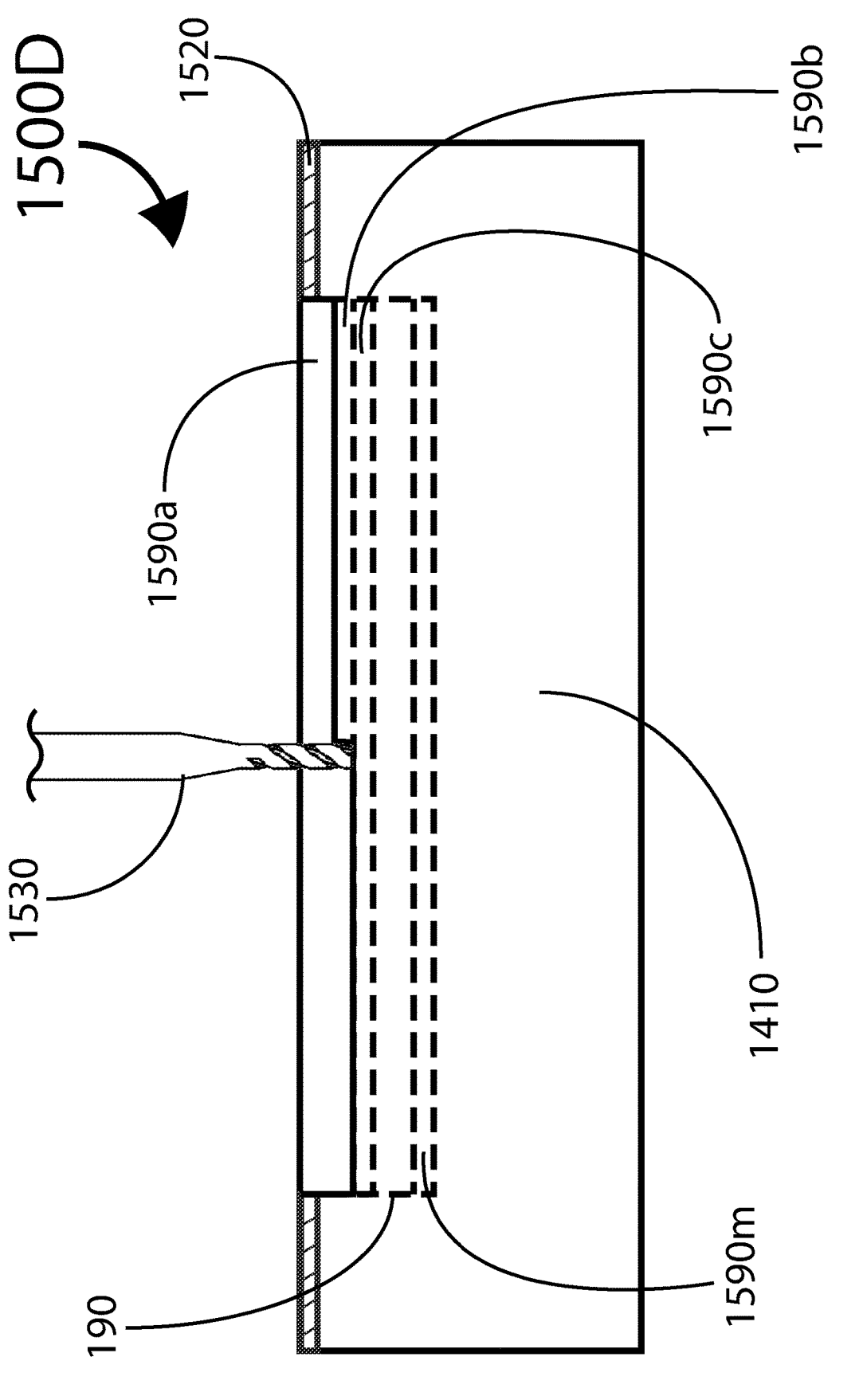
FIG. 15D shows the mechanical cutter having traversed a portion of the intended feature where the end of the cutter creates a flat bottom and the flutes of the cutter are used to cut the layers during the machining operation.

FIG. 15D illustrates the machining of the subsequent increments of the cut 1590*b* then cut 1590*c* and so on through cut 1590*m* (not depicted to scale). Note that depending on the requirements of the component under test, the depth of the first cut 1590*a* may be less than or more than the thickness of the hardened layer 1520 below the surface of the part sample at 1500D. The cut for this first increment may be made using primarily the cutting surfaces of the flutes on the cutter 1530 with the end cutting surface of the tool removing only a very small amount of the material where the floor of the starter feature is irregular. In some materials the plunge direction cutting action into the base material may not be substantial until later cutting passes. The cutting speed will be high at the circumference of the cutter, whereas as previously mentioned the cutting speed close to the rotational axis is much slower. Once the cut at this initial increment is complete, the cutter is plunged to the next increment, but cutting orbitally on the end of the tool 1530 and the cutting path repeated to remove material with the flutes and so the end cutting surfaces avoid encountering hard material and so compressive forces along the rotational axis of the tool are minimized. A representative example of the plurality of layer increments is shown as the sequence of dashed lines, each representing an increasing depth into the base material until the predetermined depth of the finished feature is reached. Material removal rate may be very slow in some materials to avoid creating additional stress which detracts from the accuracy of the analysis. There may be many more cutting depth increments than the small number of exemplary increments. Because the cutter is an end-mill, the corners of the feature, where the floor of the cut intersects the vertical walls of the slot, are square and the slot is flat bottomed as desired. The ends of the slot do not require particular attention as to shape, provided that they are far enough away from the measurement point so that the locked in stresses have been adequately released.

Figure 15E:
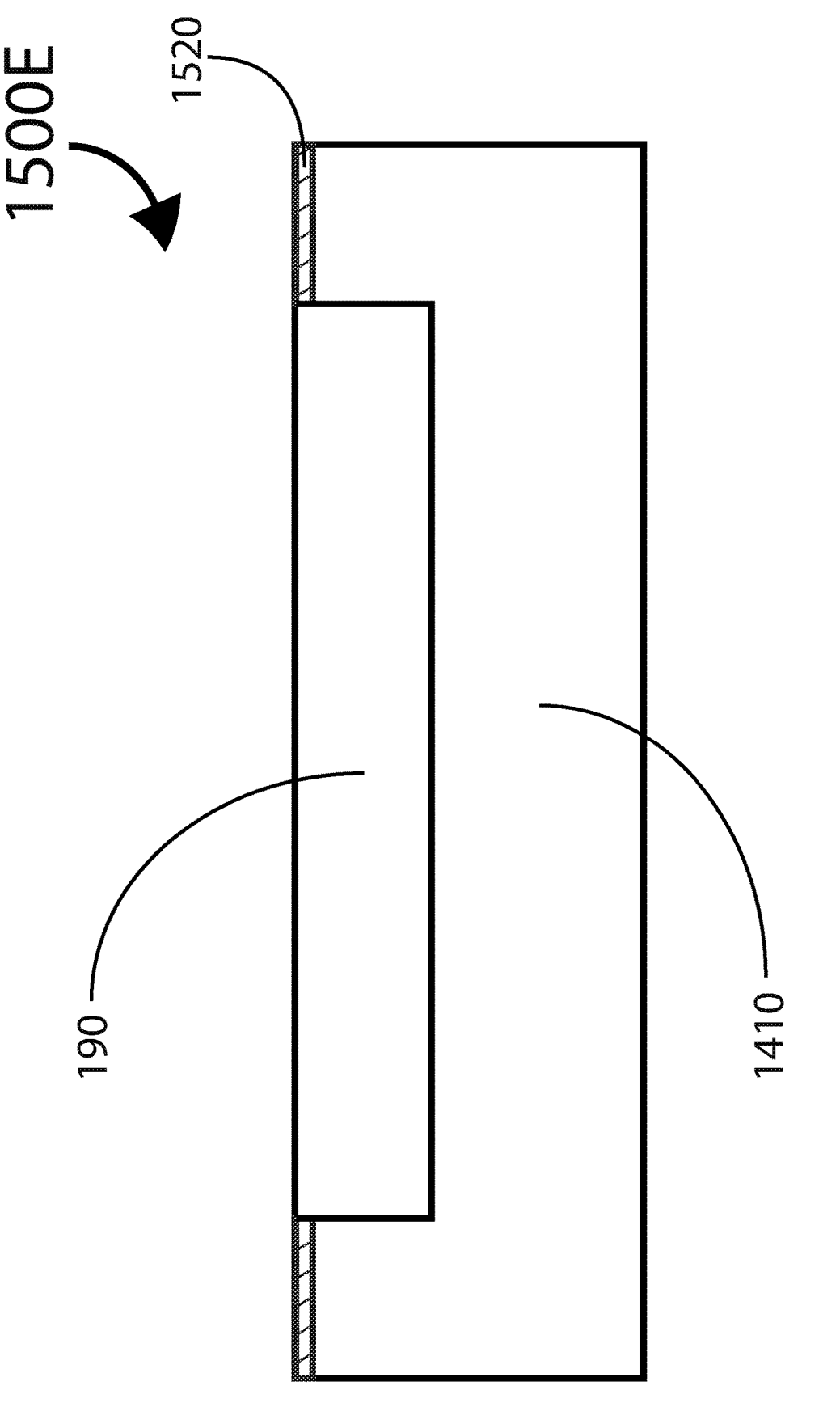
FIG. 15E is a cross-sectional view depicting the finished slot after the cutting tool is withdrawn.

FIG. 15E shows a finished slot 190 cut into 1500D. The hardened surface 1520 is still in place outside the domain of the slot but the surface stress across the slot's short dimension will have been released and quantified as strain using strain gauges 195 for each increment of the vertical depth of the slot.

In some test cases, it may be desired to record the stress data within the hardened layer itself as part of the overall test protocol. In the case that a single hole is to be cut, then the laser module is used to cut an initial incremental depth of the hardened layer rather than penetrate the whole layer. A mechanical tool is then used to further cut this starter hole so that it complies with the need for a flat bottomed hole as well as to enlarge the radius of the hole to the predetermined size. This process may then be repeated until at least the data in the hardened layer has been gathered for each increment of depth. Once the hardened layer has been completely penetrated, then the mechanical cutter can be used to cut each subsequent depth increment without further use of the laser cutting action.

When the feature to be cut is a slot or trench, then the entire starter hole may be cut as described above to the full depth of the hole. The mechanical cutting increments may then be executed as described above, so that the increments include the hardened layer as well as the softer bulk of the material.

Figure 16A:
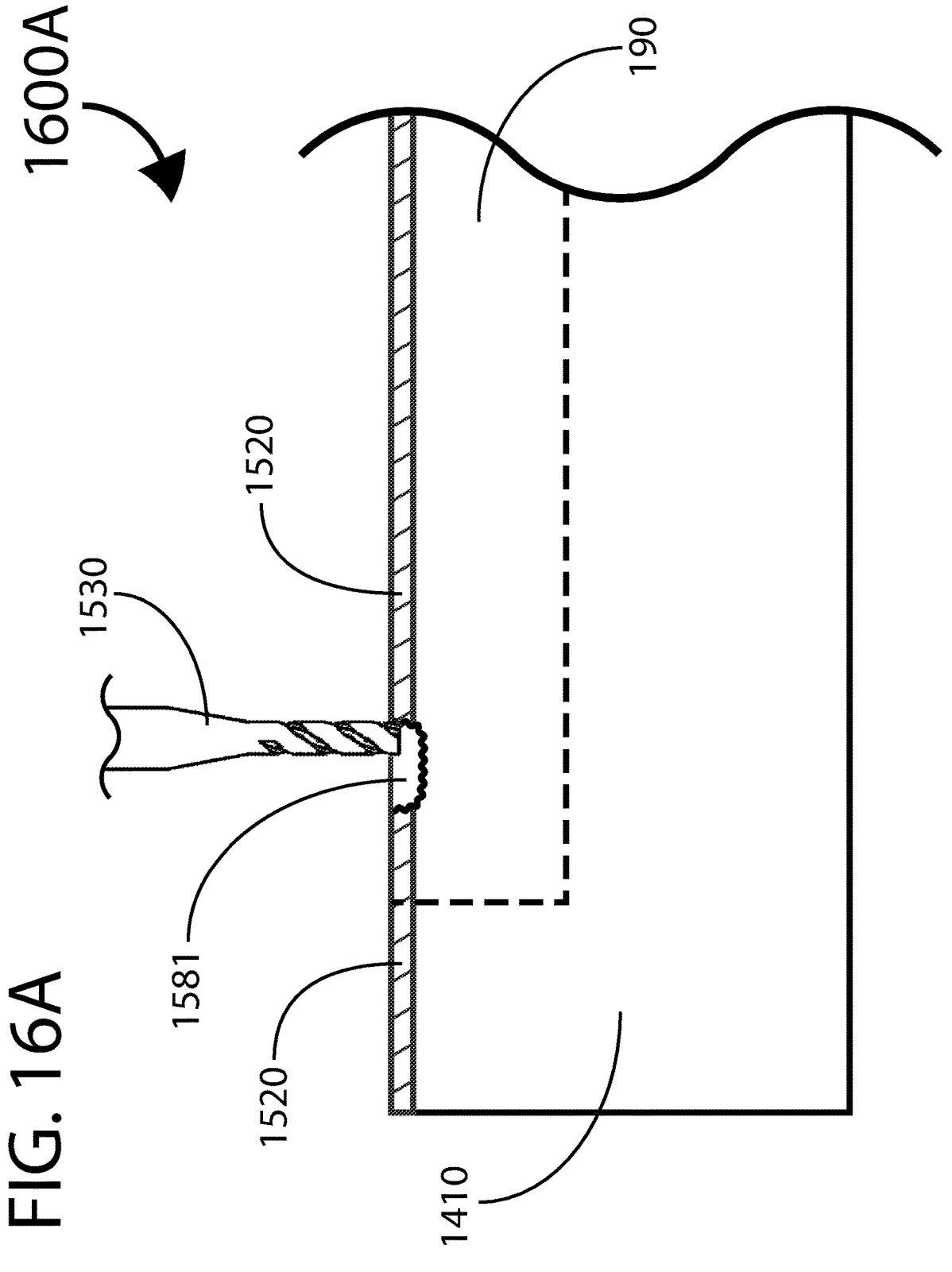
FIG. 16A shows how mechanical machining may be applied to a very hard surface when the starting point is distant from the region of interest so that the effect of induced stress is minimized.

Provided that an elongated feature to be cut can be started sufficiently far from the measurement point at the region of interest, the effect of the application of excess stress due to mechanical cutting is greatly reduced and a starter hole may be mechanically cut to allow the entry of the milling cutter, whereupon a full depth and diameter hole may be completed. FIG. 16A shows the material bulk 1410 overlaid by a hard surface layer 1520. A starter hole 1581 which penetrates the hardened layer into the bulk may be done using a separate drilling machine at the time of preparation of the component to be tested. This separate drilling machine may be a far more robust machine with less stringent demands on accuracy and precision than the milling machine, of FIG. 2A for example, used for doing the analytical precision cuts. Its sole purpose is to allow a drilling bit to be applied under sufficient force to form the starter cut. Once this is done, the part is then relocated to the milling machine, of FIG. 2A for example, and a precision milling cutter or end-mill 1430 used to modify the starter hole by being able to cut primarily on the flutes of the cutter and having a suitable end to permit the cutting of a flat bottom to a feature as required.

Figure 16B:
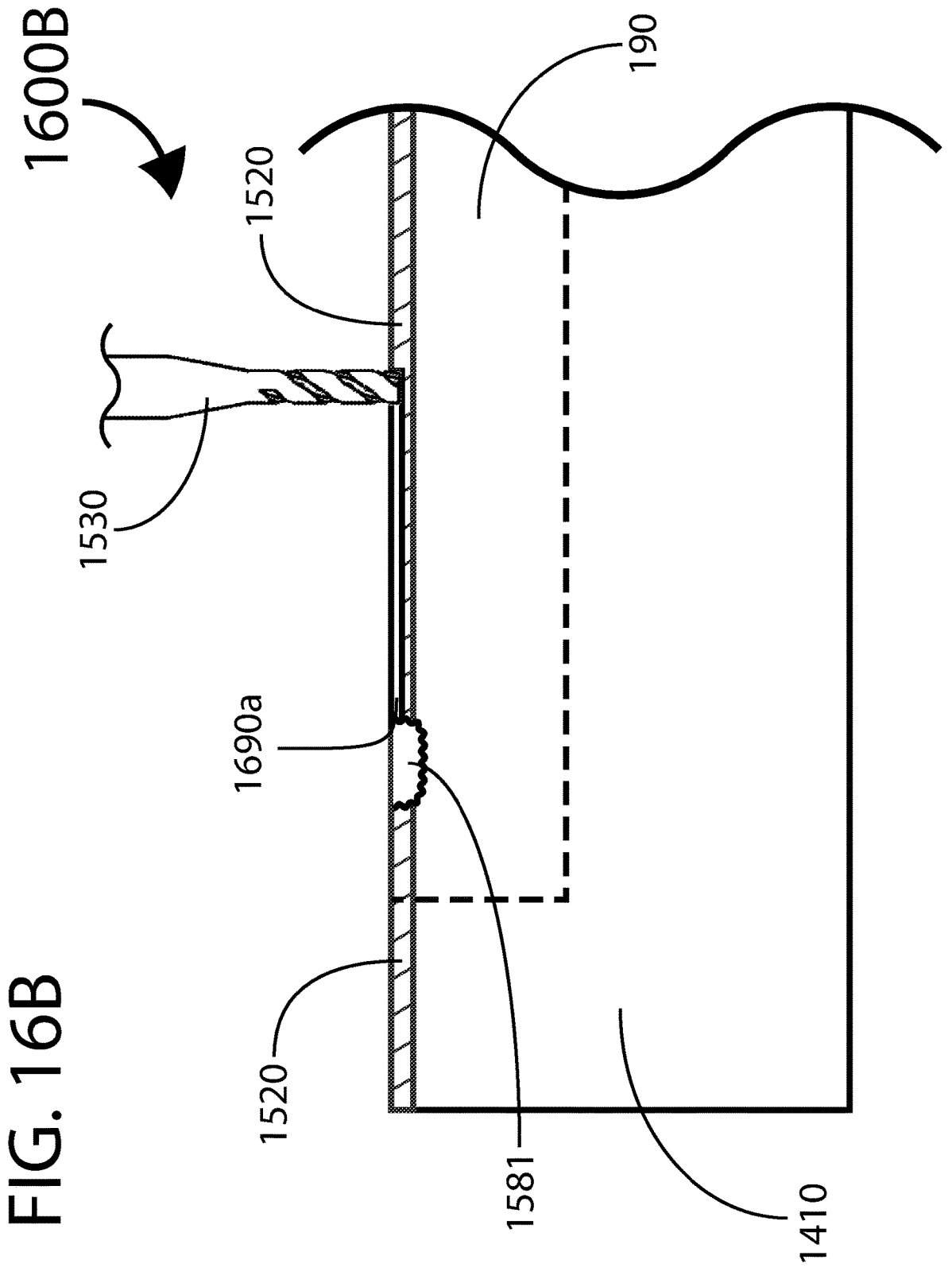
FIG. 16B shows the machining of an incremental layer within a hardened region.

In some embodiments, following the formation of blind hole 1581, the milling cutter 1530 may now, starting at blind hole 1581, be passed along the length of the intended feature machining an initial incremental cut 1690a within hardened region 1520, as shown in FIGS. 16A & 16B. The machining process using cutter 1530 is repeated by removing material at predetermined depths until the feature, e.g., slot 190, is fully defined, recording the stress changes at each depth increment so as to complete the analysis as specified in the testing protocol. In this way, the cutting process in the region of interest takes place on the flutes of the milling cutter 1530 and has a flat floor due to the cutting surfaces at the tip of the milling cutter. Cutting effort at the tip in the plunge direction, by the milling cutter 1530, is thus avoided in the hardened surface layer 1520 and even in the bulk material mitigates the stress that would be developed by a drilling cutter operating only in the plunge direction. Note that there are several ways to form blind hole 1581 through the hardened region 1520, including using a laser cutting module 1320 as described above or using a machining tool (not shown) optimized for making plunge cuts.

As configured, the appliance 900 of FIG. 9 is suitable for cutting slots and holes appropriate for measuring strain and determining stress. More complex structures, such as an annulus or a cross are possible but, because of the radius of curvature of an inside channel which may be quite small, even machining requires a knowledge of the actual profile. For the small regions of interest typical of the application described for this invention, an LVDT may be used to determine this as well. Once the reference profile along the longitudinal direction has been created, the beam may be raised, or lifted from the surface being profiled and then simply offset by a few millimeters to each side in turn and the differences measured in the transducer displacement used to determine the topography of the region. Because this profiling task can be automated, the required position of the cutting tool can then be computed from the profile data and the control program executed to generate the cut. Provided that the profiling data points are sufficiently close, the tool path can be specified sufficiently accurately to cut an annulus or a cross or indeed any specific feature.

In use, the appliance as shown in FIG. 2A or 900 of FIG. 9 is coupled to a control system that comprises electronics for controlling the positioning motors, the machining motor 950, the laser cutting module 1320 and interfacing with the sensors used to measure position and vibration as well as the imaging components. A computer is coupled to this array of interfacing electronics and usually a display and a keyboard may be provided for user interface needs. Pointing devices such as a mouse or a trackball as well as specialty interface components such as a joystick, touchscreen or haptic controller may also be provided according to the custom needs of a particular application.

Although a general purpose computing platform such as a laptop or desktop machine may be used, application specific computers offer the ability to completely customize and optimize the appliance. In one embodiment, the computer control, measurement and processing is performed in an embedded single card computer using external connections for display monitor and user interface elements. Computer software or firmware determines how user information is input and how it is used to control aspects of the appliance itself.

In some embodiments, an enclosure or cover can be provided to protect the system from difficult or dirty working conditions. Because the appliance is exposed due to the need for an element of the appliance to penetrate a channel in the part under test, simple covers for the slides are generally all that need to be provided. Clean air can be supplied for cooling and chip clearing of the debris from the machining process. It should be clear that bottled, dry gases such as nitrogen or argon can serve the same purpose if compressed air is not conveniently available.

In sum, the present invention provides systems and methods for analysis of material properties of components and structures using machining processes to enable stress relief in the part under test, including internal surfaces. The advantages of such a system include the ability to improve the state of the art as regards machining accuracy for fixed laboratory use, cut residual stress relief features including all of a hole, an annulus and a slit using a single tool without requiring a tool change, enable automated measurement of the material strain condition and be able to be used in remote locations without significantly changing the performance of the apparatus.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

We claim:

1. A method for measuring residual stress in a component under test (CUT) having one or more strain monitors operationally coupled to a strain or displacement measurement system which generates an output proportional to changes in strain as a stress state of the component under test is changed, the method comprising: locating a machining appliance and the CUT in appropriate relative positions so that cuts to define a feature is made into a surface of the component under test; locating a point determined by placement of the one or more strain or displacement monitors near which material is to be removed from the CUT; using a laser, begin cutting through a hardened surface of the CUT at a predetermined machining point to a first predetermined depth; using the laser, continue cutting into the hardened surface in an incrementally larger orbit until a radius of the orbit is larger than the radius of a machining tool; using the machining tool, machining the feature onto the CUT, wherein the machining includes a plurality of light cuts to a second predetermined depth without introducing additional stress from the machining process; and measuring, using one or more of the strain or displacement monitors a change in strain or displacement resulting from machining for use in calculation.

2. The method of claim 1 wherein the first predetermined depth is less than the second predetermined depth, and wherein the machining tool levels a floor of the feature at the second predetermined depth.

3. The method of claim 1 wherein the machining point on the CUT is identified using an image sensor having a fixed offset relative to a cutting axis of the machining appliance, and wherein the image sensor is positioned to use one or more reference points associated with the one or strain or displacement monitors to identify the machining point on the CUT; and wherein the calculation includes a stored offset calibration factor indicating a position of the image sensor relative to the one or more reference points when the image sensor identifies the machining point.

4. The method of claim 1 wherein the surface of the CUT is profiled and stored and wherein the machining appliance includes a profiling tool with an optically enabled and digitally encoded probe.

5. The method of claim 1 wherein the feature is an annulus surrounding the one or more strain or displacement monitors.

6. The method of claim 1 wherein the feature is a slot cut alongside the one or more strain or displacement monitors.

7. The method of claim 1 wherein the measurement system includes a Wheatstone bridge.

8. The method of claim 1 wherein measuring the change in strain includes using an optical system with a light source and one or more detectors.

9. The method of claim 8 wherein the light source is selectable to be monochromatic or polychromatic.

10. The method of claim 1 wherein the strain measurement system includes an optical system using a camera and performing digital image correlation to determine the strain change.

11. The method of claim 1 wherein an initial light cut of the plurality of cuts is along a length of the feature and an initial cutting depth is within the hardened surface.

12. An appliance for use in residual stress analysis of a component under test (CUT), the CUT having one or more strain monitors operationally coupled to a strain or displacement measurement system which generates an output proportional to changes in strain as a stress state of the CUT is changed, the appliance comprising:

a motion platform having two or more mutually orthogonal axes of motion;

an image sensor, mounted to the motion platform, having a viewing area orthogonal to a cutting axis of a machining tool;

a drive mechanism for each motion axis coupled to a control system, wherein the drive mechanisms are operable to cause the machining tool, under control of the control system, to machine a feature by:

locating a point determined by placement of the one or more strain or displacement monitors near which material is to be removed from the CUT;

using a laser, begin cutting through a hardened surface of the CUT at a predetermined machining point to a first predetermined depth;

using the laser, continue cutting into the hardened surface in an incrementally larger orbit until a radius of the orbit is larger than the radius of a machining tool; and using the machining tool, machining the feature onto the CUT wherein the machining includes a plurality of light cuts to a second predetermined depth without introducing additional stress from the machining process.

13. The appliance of claim 12 wherein the first predetermined depth is less than the second predetermined depth, and wherein the machining tool levels a floor of the feature at the second predetermined depth.

14. The appliance of claim 12 wherein the machining point on the CUT is identified using the image sensor having a fixed offset relative to the cutting axis of the machining appliance, and wherein the image sensor is positioned to use one or more reference points associated with the one or strain or displacement monitors to identify the machining point on the CUT; and wherein the calculation includes a stored offset calibration factor indicating a position of the image sensor relative to the one or more reference points when the image sensor identifies the machining point.

15. The appliance of claim 12 wherein the surface of the CUT is profiled and stored and wherein the machining appliance includes a profiling tool with an optically enabled and digitally encoded probe.

16. The appliance of claim 12 wherein the feature is an annulus surrounding the one or more strain or displacement monitors.

17. The appliance of claim 12 wherein the feature is a slot cut alongside the one or more strain or displacement monitors.

18. The appliance of claim 12 wherein an initial light cut of the plurality of cuts is along a length of the feature and an initial cutting depth is within the hardened surface.

* * * * *